US006282525B1

(12) United States Patent
Kubatzki et al.

(10) Patent No.: US 6,282,525 B1
(45) **Date of Patent: *Aug. 28, 2001**

(54) METHOD AND ARRANGEMENT FOR DATA PROCESSING IN A MAIL SHIPPING SYSTEM HAVING A POSTAGE METER MACHINE WHEREIN A CARRIER-IDENTIFYING MARK IS SCANNED AND PROCESSED

(75) Inventors: Ralf Kubatzki; Wolfgang Thiel, both of Berlin (DE)

(73) Assignee: Francotyp-Postalia AG & Co., Birkenwerder (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,805

(22) Filed: May 2, 1997

(30) Foreign Application Priority Data

May 2, 1996 (DE) .............................................. 196 17 586

(51) Int. Cl.$^7$ ...................................................... G06F 17/00
(52) U.S. Cl. .......................... 705/410; 700/215; 235/375
(58) Field of Search .................................... 705/401, 406, 705/407, 408, 410, 409, 405, 60; 235/375; 700/213, 215, 220, 221, 222, 223, 224, 225, 226, 227

(56) References Cited

U.S. PATENT DOCUMENTS

| | | | |
|---|---|---|---|
| 4,122,532 | 10/1978 | Dlugos et al. | 705/409 |
| 4,430,716 | 2/1984 | Dlugos et al. | 705/409 |

(List continued on next page.)

FOREIGN PATENT DOCUMENTS

| | | |
|---|---|---|
| OS 41 07 030 | 9/1992 | (DE) . |
| OS 44 19 430 | 12/1995 | (DE) . |
| OS 44 22 263 | 1/1996 | (DE) . |
| OS 44 47 404 | 6/1996 | (DE) . |
| 0 493 948 | 7/1992 | (EP) . |
| 0 543 395 | 5/1993 | (EP) . |
| 0 649119 | 4/1995 | (EP) . |
| 2 215 670 | 9/1989 | (GB) . |

OTHER PUBLICATIONS no author, "Pitney Bowes: Pitney Bowes introduces the Eagle 2 Elite automatic mailing system", Business Editors/Computer & Electronics Writers, May 1992, DialogWeb copy pp. 1–2.*

*Primary Examiner*—James P. Trammell
*Assistant Examiner*—Thomas A. Dixon
(74) *Attorney, Agent, or Firm*—Schiff Hardin & Waite

(57) ABSTRACT

In an arrangement and method for data processing in a mail shipping system, a document is supplied to the mail shipping system having information printed thereon identifying a carrier to be used for shipping the document and/or cost center information identifying a cost center which produced the document. The printed information is scanned at the mail shipping system and the scanned information is stored and is used for calculating a fee for shipping the document and for selecting an appropriate print format, respectively allocated to the carrier and/or the cost center identified in the scanned information, and a franking imprint is printed on the document embodying the appropriate fee and print format. Each carrier which is available for use for shipping the document, and each cost center among a number of cost centers which share usage of the mail shipping system, respectively has a carrier identification number or a cost center number allocated thereto. Changes in the print format, or other data changes, can be made by entering the cost center number or the carrier number into a postage meter machine in the shipping system. Accounting information can be generated and supplied, upon request, to a personal computer at any of the cost centers.

126 Claims, 20 Drawing Sheets

U.S. PATENT DOCUMENTS

| | | | | |
|---|---|---|---|---|
| 4,511,793 | | 4/1985 | Racanelli | 705/404 |
| 4,743,747 | | 5/1988 | Fougere et al. | 235/494 |
| 4,800,505 | | 1/1989 | Axelrod et al. | 700/221 |
| 4,800,506 | | 1/1989 | Axelrod et al. | 700/227 |
| 4,853,864 | | 8/1989 | Hart et al. | 705/403 |
| 5,111,030 | | 5/1992 | Brasington et al. | 235/375 |
| 5,117,364 | | 5/1992 | Barns-Slavin et al. | 705/402 |
| 5,257,197 | | 10/1993 | Günther et al. | 705/406 |
| 5,362,947 | | 11/1994 | Dietrich et al. | 235/375 |
| 5,419,440 | | 5/1995 | Picoult | 209/583 |
| 5,490,077 | | 2/1996 | Freytag | 235/375 |
| 5,493,106 | | 2/1996 | Hunter | 235/375 |
| 5,602,743 | | 2/1997 | Freytag | 705/408 |
| 5,606,508 | | 2/1997 | Thiel | 705/410 |
| 5,638,442 | * | 6/1997 | Gargiulo et al. | 380/2 |
| 5,661,653 | * | 8/1997 | Kulik | 705/410 |
| 5,842,186 | * | 11/1998 | Kulik | 705/410 |

* cited by examiner

POSTAL REGISTER VALUES Ri:

| priv.Carrier-Number m→ | 1 | 2 | 3 | 4 | ... | 7 | ... | l | $\sum_{m=1}^{l} R_{i,m}$ |
|---|---|---|---|---|---|---|---|---|---|
| Register $R_1$ | 200 | - | 78 | - | ... | 150 | ... | 34 | |
| $R_2$ | 100 | 50 | 43 | - | ... | 240 | ... | 57 | |
| ↓ i ↓ ........ | | | | | ... | | ... | | |
| $R_{80}$ | 500 | 80 | 40 | - | ... | 360 | ... | 200 | |
| $R_{81}$ | 300 | 160 | 22 | - | ... | 100 | ... | 140 | |
| ........ | | | | | | | | | |
| $R_h$ | 700 | 320 | 28 | - | ... | 121 | ... | 10 | |

Legend:

Register R1 := remaining value (descending register)
Register R2 := accum.used amount (ascending register)
Register R3 := total reset amount (total reset. reg.)
Register R4 := no. of valid imprints (piece count Σ printing with value ≠ zero),
Register R8 := no. of all imprints (R4 + piece count Σ printing with value = zero),
Register Ri for further Register with i = 1 to h priv.Carrier-No.1 := Deutsche Post AG, CIN = 100.000.000.000
priv.Carrier-No.2 := DPD, CIN = 200.000.000.000
priv.Carrier-No.3 := UPS, CIN = 300.000.000.000
priv.Carrier-No.m for further Carrier with m = 1 to l KST-No. 1 := ALPHA_100,
KST-No. 2 := BETHA_200,
KST-No. n for further Cost Center with n = 1 to k

Fig. 7c

USED POSTAGE p:

| priv. Carrier-Number m→ | 1 | 2 | 3 | 4 | ... | 7 | ... | l | $\sum_{m=1}^{l} p_{n,m}$ |
|---|---|---|---|---|---|---|---|---|---|
| KST-No. 1 | 200 | - | 78 | - | ... | 150 | ... | 34 | |
| KST-No. 2 | 100 | 50 | 43 | - | ... | 240 | ... | 57 | |
| ↓ n ↓ ........ | | | | | ... | | ... | | |
| KST-No. 7 | 500 | 80 | 40 | - | ... | 360 | ... | - | |
| KST-No. 8 | 300 | 160 | 22 | - | ... | 100 | ... | - | |
| ........ | | | | | | | | | |
| KST-No. k | 700 | 320 | 28 | - | ... | 121 | ... | 10 | |
| $\sum_{n=1}^{k} p_{n,m}$ | | | | | ... | | ... | | $\sum_{mn}\sum p_{n,m}$ |

USED PIECE COUNT z:

| priv. Carrier-Number m→ | 1 | 2 | 3 | 4 | ... | 7 | ... | l | $\sum_{m=1}^{l} z_{n,m}$ |
|---|---|---|---|---|---|---|---|---|---|
| KST-Nr. 1 | 1 | - | 2 | - | ... | 10 | ... | 2 | |
| KST-Nr. 2 | 1 | 1 | 1 | - | ... | 16 | ... | 3 | |
| ........ | | | | | ... | | ... | | |
| KST-Nr. 7 | 1 | 1 | 1 | - | ... | 24 | ... | - | |
| KST-Nr. 8 | 2 | 4 | 1 | - | ... | 5 | ... | - | |
| ........ | | | | | | | | | |
| KST-Nr. k | 7 | 4 | 1 | - | ... | 7 | ... | 1 | |
| $\sum_{n=1}^{k} z_{n,m}$ | | | | | ... | | ... | | $\sum_{mn}\sum z_{n,m}$ |

Fig. 7d

METHOD AND ARRANGEMENT FOR DATA PROCESSING IN A MAIL SHIPPING SYSTEM HAVING A POSTAGE METER MACHINE WHEREIN A CARRIER-IDENTIFYING MARK IS SCANNED AND PROCESSED

BACKGROUND OF THE INVENTION

1. Field of the Invention

The present invention is directed to a method for data processing in a mail-shipping system with a postage meter machine as well as to an arrangement for implementing the method.

2. Description of the Prior Art

In modern offices, producing documents such as letters ensues at the personal computer. The printed documents are manually placed in envelopes or are automatically stuffed in envelopes in a mail station with an envelope-stuffing system. Such mail stations also have postage meter machines available for use.

A postage meter machine is used for franking postal matter and can be equipped with a control unit, a memory arrangement, an input stage, a modem or other data reception means, an inputoutput control stage, a display and a printer. For example, a stationary print head prints the franking impression column-by-column with simultaneous conveying of the letter past (beneath) the print head. A printing width of approximately 1" is thereby achieved.

If the post meter machine contains a postage calculator, weight information can be entered via a connected scale. In European application 566 225, a method for data input into a postage meter machine disclosed for such a system that employs chip cards, a cellular communication network in order to enter fee schedule changes. Such chip cards, which contain a number of non-volatile memories or, separately accessible memory areas and a microprocessor, are successively plugged into a single write/read unit of the postage meter machine in order to serially transmit data representing different information into the postage meter machine. These data stored in the postage meter machine can then be accessed during the operation thereof. Such a postage meter machine constitutes a stand-alone postage meter machine and is not adapted for integration into a mail-processing system with a number of other devices.

If the scale contains a postage calculator, the postage values determined in the scale are communicated from the scale to the postage meter machine German application (Serial No. P 44 47 404.0-53) discloses a method and an arrangement for data entry into a scale, whereby fee schedule table data of the carrier are communicated to the scale via the postage meter machine so that the postage values can be calculated according to a current fee schedule. The postage meter machine checks whether the fee schedule table data of the carrier stored in the scale are still valid and automatically decides whether a reloading or an updating is required. A switch to normal operation is only made after initialization when the fee schedule table data in the scale are current. The updating ensues after activation, preferably with a chip card, and is dependent on conditions such as, for example, when data of a clock/date module called at the beginning but modified due to the passage of time, are considered to be appropriate by the microprocessor for triggering a reloading requirement. As a result, a communication is conducted with a data control in which fee schedule table data, and possibly further data files, are transmitted to the postage meter machine from the data central as a result of the communicated request. The postage meter machine is equipped with a routine for display and automatic print data input. The modification is displayed as a clear text presentation of the print format. This, however, requires a relatively expensive user interface (keyboard and picture screen) at least in the postage meter machine.

All of the aforementioned, individual solutions for postage meter machines thus require an expensive, separate user interface, or a coupling to a personal computer in order to employ the user interface (keyboard and picture screen) thereof.

European Application 493 948 discloses a coupling to a personal computer in order to use this as an input means. The postage fees are stored in various registers that are allocated to various authorities, however, this publication does not describe whether and how these authorities are selected by the customer or how an allocation ensues. This specific solution for a postage meter machine stores the debiting data for various services. A disadvantage of this known system is the outlay arising due to the need for a separate interface between the postage meter machine and a work station used as the input means. A separate printer is connected to the separate interface in order to print out debiting (accounting) reports.

German OS 39 03 718 also discloses a coupling to a personal computer in order to print out department-related accounting data via a separate printer. A disadvantage is that a control unit must be connected as a separate device between the individual devices such as the scale, the postage meter machine and the personal computer. The employment of manually plugged chip cards in order to enter accounting reports into the personal computer, moreover, represents an impediment for automation of the production of accounting reports.

European Application 600 749 discloses a mail processing machine with a bar code user interface. Commands for controlling the mail processing machine are entered via a bar code reader pen (wand). This, however, requires a catalog having a list of bar code commands, and manual sampling thereof. A manual positioning of a reader pen and sampling for entering commands reduces the input dependability as well as an assumption of responsibility on the part of the user, i.e., one must assume that the user would not undertake any manipulation with fraudulent intent. As a guard against misuse, no commands that could be misused with fraudulent intent can be found in the list. An entry of unlisted commands effecting a falsification, i.e., a correspondingly generated bar code, however, cannot be prevented. Most steps have been taken to insure that the sequence of the bar code inputs can only ensue according to the sequence of pieces of mail supplied.

German OS 40 18 166 discloses that frankings and/or an address printing be undertaken with a franking module integrated in a personal computer. To that end, the franking module is arranged in a slot of a drive insert of a personal computer. Such a solution, however, limits the universal utilization of the personal computer as a result of the occupation of the slot of the drive insert and, moreover does not accommodate other postal matter conveyor means for other envelope formats and is therefore mainly suitable for standard mail in offices with low to moderate mail volume. A number of personal computers equipped in this way would have to be utilized in an office having a higher mail volume. The integration of the franking module in the personal computer, however, is more expensive than a solution in which a commercially available personal computer and a commercially available postage meter machine are coupled to one another via a data line.

U.S. Pat. No. 4,800,506 discloses a mail processing system with a number of devices that operate in a PC-supported manner and already have connected postage meter machines available. The individual devices carry out functions for recompilation of the letters, namely in the sequence of the postal area codes of their addresses. The aforementioned functions includes opening letters, sensing specific locations, possibly reprinting the letter or comments, folding, envelope-stuffing, postage calculation and sorted deposit or, bundling. Some public mail carriers offer discounts for postal matter pre-sorted in this way. This method is complicated insofar as it may require another printout of the letter. Installation of a high-performance computer is required in the mail station, which must be operated by appropriately trained personnel.

German OS 38 08 178 discloses a mail processing system with a first computer that produces the documents on fan-fold paper and that is in communication with a second computer that controls devices in the mail station. The communication is achieved by markings printed on the document and, by a communication element. The envelope stuffing, addressing and franking of the mail can be indirectly controlled by a printed coding identifying the respective piece of mail. Parameter values that are employed for controlling the envelope stuffing, addressing and franking of the mail are allocated to these identification codings in a data bank. The data bank is connected to the second computer to which the respective identification coding of the piece of mail is communicated via a connected sensor means. The address printing in the mail station is emphasized in this document as an advantage in view of the easy, subsequent modification of, among other things, the addressing of stuffed envelopes, and thus avoiding a bill-like appearance of the envelopes that is associated with window envelopes.

Such window envelopes are allegedly not opened, by some recipients because they may contain bills. Apart from the fact that it would be senseless not to open window envelopes because they may contain bills since cost-increasing reminders would be delivered anyway to such companies or persons, window envelopes nonetheless are not favored by many mailers. This disfavor against printing an address when preparing the letter at a location which will be visible through an envelope window, and against employing window envelops per se, leads to the aforementioned equipping of the mail station with complicated technology. When settings must be undertaken in the mail station in order to utilize beneficial services of a different private carrier, however, even the aforementioned equipping of the mail station with complicated technology still proves inadequate because correspondingly more highly qualified employees are then required. The weight and the postage amount are identified before resending postal matter. In conjunction with the increasing proliferation of private carriers competing with one another, beneficial special fee schedules for transport services and service performances related thereto are also being increasingly offered. A reduction of the weight by reducing the number of inserts for the envelope often suffices for meeting the prerequisites for making use of such special fee schedules. A great deal of redundancy and design latitude in the informational offering exists in direct marketing. For example, the format, the number of lines, letter height, etc., could be optimized for cost reasons. The number of pages could also be reduced when preparing the letter. The employees in the mail station, however, are not in a position to undertake such entries or modifications in the data bank. The employees of the mail station would then have to instruct the other employees whose produce the letter contents, or these mail station employees would have to make such changes themselves. Such a procedure, however, would only lead to unnecessary delays in the mail processing.

SUMMARY OF THE INVENTION

An object of the present invention is to overcome the above-discussed disadvantages of the prior art and to provide a more flexible mail processing system with a postage meter machine that, without favoring or disfavoring any type of format of the postal matter, can be expanded to future services of various private mail carriers and also assures a reliable and largely automatic mail processing.

The occurrence of manual input errors into the postage meter machine of the mail station also should be reduced. A further object is thus to provide a mail processing method which upon production of a letter, supplies significant data for subsequent debiting of the postage fee in a postage meter machine before the printout of the letter.

The conducting data processing in a postage meter machine allows an automatic means for setting critical data to be employed as well as an automatic means for the debiting of postage fees ordered according to cost centers, so that it is unnecessary to undertake manual postage meter machine inputs.

Despite a multitude of mail carriers, an accounting should ensue surveyably and reduplicatably in the interest of the customer. An additional object is thus to enable the presentation of accounting statements according to cost centers, as well as according to public and private mail carriers on the basis of displays and print outs.

The invention avoids limitations in the financing and implementation of the mail processing insofar as possible. Window envelopes, standard envelopes, as well as other envelope shapes such as are preferred by private carriers, can be employed in order to implement an envelope stuffing in the office. Moreover, an addressing of the mailings is already implemented in the office. Only the franking ensues as before in the mail station with a postage meter machine, for which the possibility has now been created of generating arbitrary imprints in the way required by private carriers.

A mail carrier selected by user interface of the personal computer is at least displayed, or additionally printed out, as mail carrier information together with a contents of the letter.

A letter produced at a personal computer has a format with an area for a specific, imprinted address. This information about the recipient address is additionally supplemented by cost center information and printed out together with the content of the letter in one embodiment of the invention.

Further versions of this embodiment allow the possibility of using modem office printers to print letter recipient address as well as the cost center and/or carrier information on an envelope.

The invention also encompasses scanning the aforementioned information from the letter or envelope in the mail center (which is remote from the location (desk) at which the document and/or envelope is prepared) with a commercially obtainable scanner and automatically entering this information into the postage meter machine. At least one further scanner is arranged in the mail delivery stream so that different formats can also be scanned.

The postage meter machine automatically checks whether the selected services are available and otherwise undertakes a communication to a remote data center, whereby specific requests data are sent and the required data are received from the data central and the required data are loaded into its memories.

The invention allows loading at least the fee schedule tables of the respective carrier which are valid for the location in the system as needed, and calling them for a particular mail carrier (USPS, UPS, DEUTCHE POST AG or others).

The invention based on the standard, spacial separation of the mail station (mail room) from the remainder of a modern office, whereby the letter contents and mailing information are produced in the office and are administered in department-related manner, i.e., encoded according to cost center numbers. This is particularly advantageous when a number of small companies work in one shared office space or building, these companies operating a shared mail station but having to debit separately according to services of the carriers and independently of the other small companies. A separate cost center number is then allocated to each small company. Debiting related to cost center, or a department-related debiting, ensues automatically in the postage meter machine in the mail station, correspondingly separate accounting reports being produced for the small companies or departments and for the public or private mail carriers.

The operations implemented in the personal computer in the office include the text production and processing, entering the address and allocation of a cost center number for a debiting related to the document producing cost center, as well as menuguided selection of the various carriers which are available.

The operations implemented in the mail station include at least scanning the address field or a mark with cost center and/or carrier information. After the scanning of this information from the letter or from the envelope, the processing of this information ensues in the scale or postage meter machine, as does the franking of mailings.

Of course, a carrier preset in this way can nonetheless be manually changed in the mail station when, for example, the entry was not actuated in the office or some other carrier is more beneficial. By providing the capability of determining when the transmittal of a number of letters produced on the same day to the same postal area code occurs, costs can be saved because it is generally assumed that it is more economical not to use different private carriers but only a single carrier for all such letters.

The method for data processing in a mail shipping system includes steps for the printout of a document together with address field and mark, for scanning the mark in a mail center and for processing the data, as well as for franking with a postage meter machine.

As used herein, "document" means label printings, letters on paper or other print carriers. The mark is a bar code or some other form of marking. The inventive method includes the following steps.

In a first step, a detection of a piece of mail in the transport path to the postage meter machine occurs and a scanning of the address field and/or of the mark in the mailing detection of supplied pieces of mail in the transport path to the print head of the postage meter machine takes place. As a result, information with respect to the carrier or mailing type or category and/or cost center is automatically entered into the postage meter machine, and at least one retrieval of non-volatilely stored setting data ensues for an automatic entry of print data into the postage meter machine;

In a processing routine in a second step, at least one routine for automatic modification of the non-volatilely stored setting data is conducted, for generating carrier-specific print formats upon selection of a predetermined mail carrier number (CIN), for automatic print data entry and checking, as well as for display, and for automatic or manual entries. This processing routine may contain a sub-routine for allocating a cost center number to an imprint number for automatic entry of the input number upon entry of the cost center number.

Lastly, the data are processed in franking mode with a debiting allocated to cost center and/or carrier before the franking.

In the second step with the routine for automatic modification of the non-volatilely stored setting data, a routine can be provided for forming request data for reloading selected carrier data and/or current carrier fee schedules of the selected carrier. In the absence of selected data, or given non-current data, the implementation of a communication with a remote data center is occurs in a third step (before the franking mode step), whereby data files including at least carrier-identifying image data files and current fee schedule data files are transmitted to the postage meter machine from the data center on the basis of the communicated, aforementioned request data.

The improvements achieved in a postage meter machine operating according to the inventive method include a largely automatic processing of the letter while making use of different fee schedule structures of various carriers, and creating flexibility with respect to debiting vis-a-vis different carriers. Given the elimination of the mail monopoly for sending letters, one can expect an increase in mail delivery by regionally, nationally or internationally acting private carriers. It is in fact already known from package shipping systems to prepare accounting statements for various carriers. The accounting statements for various carriers given utilization of packet shipping systems generally ensues with a debit note method, however, such an accounting does not make any automatic processing, postage calculation or security monitoring available to the customer as is prescribed, for example, by postal authorities in the case of a postage meter machine into which a credit was loaded. An accounting vis-a-vis various private carriers is inventively established in the postage meter machine disclosed herein in a postage fee module on the basis of a prepaid or credited amount.

The following method steps describe the inventive solution to the above problem.

First a letter is produced with a text processing system on a personal computer in a known, conventional manner.

The most suitable carrier for sending this letter is then selected. For example, this can be a regional courier service for local, rapid delivery but can also be a national (governmental) postal agency for standard mail. A mark identifying the selected carrier is entered in the address field of the letterhead. This mark can be taken from a data file in which the user, menu-prompted, selects from an offering of carriers; the carrier can also be directly entered via the keyboard. Further, a machine-readable code, for example a bar code and/or a graphic symbol can also be stored for each carrier.

The letter together with address field and a mark is then printed out, thus allowing the information with respect to carrier and/or cost center to be automatically input into the postage meter machine.

The letter then is stuffed manually or by machine into a window envelope. Alternatively to the printout of the carrier mark in the letterhead, a corresponding adhesive-backed sticker that contains this information in pre-printed form can be stuck onto the envelope.

The address field together with the carrier mark then are scanned with a suitable scanner means. This scanner means is either separate from or as is preferable is arranged in the postage meter machine, for example in an automatic delivery means in the mail transport path.

Next, the scanned pixel image is transmitted into a processing means. The carrier mark is decoded therein. This processing means is integrated in the postage meter machine, in a scale or in some other, additional peripheral device, for example in an automatic delivery means.

The carrier information then is transmitted to a postage calculator.

The postage calculator contains the stored postage table associated with the selected carrier. If a carrier or service was newly selected and a postage table for the selected service or carrier thus is not available or does not belong to the permanently stored postage tables due to limited memory capacity, the postage meter machine automatically telephonically dials a data center operated, for example, by the postage meter machine manufacturer and the required postage table is loaded into the memories of the postage meter machine. Each postage table can have a date allocated to it indicating when it takes effect and/or identifying its minimum validity duration. The postage meter machine contains a real-time clock to whose date the minimum validity duration of the corresponding postage table is compared in order to request a new table via the data center, if necessary. A corresponding identifier can be printed in the franking field for identifying the postage table employed.

The specific postage then is calculated on the basis of the data already present such as format and type of mailing as well as on the basis of the weight. Alternatively, it would be possible at any time to modify the postage value with a manual input. To that end, a specific postage table would have to be visually display for the user via a display, with the user subsequently selecting the postage amount, as was disclosed by German OS 42 17 478. If this alternative is employed, however, no strict linking to the fee schedule, and thus no accounting dependability would be achieved.

Lastly, the charge to the user with the specific postage amount is debited on the postage account of the carrier that is likewise automatically set. This is possible in a debit note method as well as in a pre-paid method. In the debit note method, a debit account is read, whereby the stored value is incremented by the postage value to be franked. In the pre-paid method, a pre-paid amount is maintained in the credit account of the postage meter machine as an electronic credit. Another accounting version is to undertake the accounting on a specific chip card (similar to a telephone card or credit card) brought into contact with the postage meter machine that each carrier has edited or produced. Because the selection of the carrier that has already been undertaken, however, a universal carrier card can be employed instead of a credit card issued by a single carrier, such as a universal card having therein a memory area for each carrier, in which the accounting data for that carrier only are stored.

By employing of a modem, an electronic communication of accounting data to the remote data center can ensue at time intervals, the remote data center implementing the accounting with the carrier on commission from the customer. Alternatively, the data center, after an inquiry at the customer's bank to confirm the solvency of the customer, can grant the customer a credit and communicate a credit. Data about the appertaining type of accounting and the respective logo that identifies the employment of a current carrier fee schedule are related to the selected carrier. The aforementioned data and their allocation are stored in the postage meter machine for each selectable carrier.

As needed, a document showing the successful recrediting (i.e., a receipt) can be printed out with the print head of the postage meter machine for each mail carrier after a recrediting procedure has been executed. The becomes possible by switching the postage meter machine to an internal printing mode. It is also provided that a listing regarding the totality and/or individual financial recrediting data within a time span and other register or service data are printed out as a document by the print head of the postage meter machine when this is desired.

DESCRIPTION OF THE DRAWINGS

FIG. 7*c* illustrates a format for carrier-related accounting data in the postal registers in accordance with the invention.

FIG. 7*d* illustrates a format for a two-dimensional cost center/carrier matrix in accordance with the invention.

DESCRIPTION OF THE PREFERRED EMBODIMENTS

Figure 1:
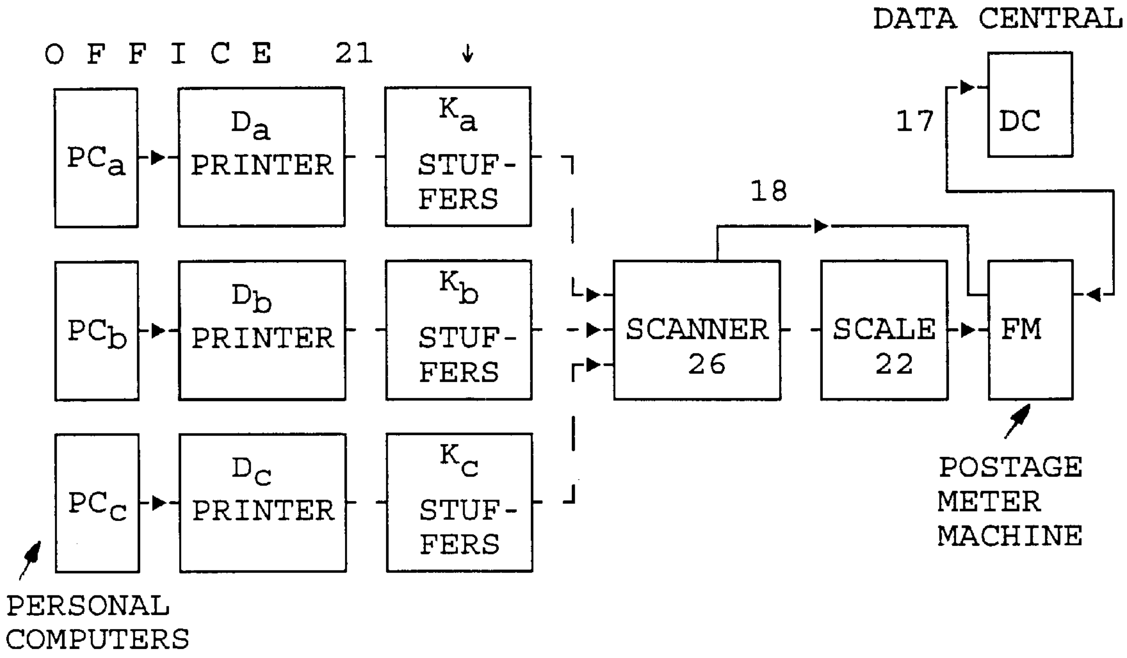
FIG. 1 is a block circuit diagram of a mail processing system with a postage meter machine constructed and operating in accordance with the principles of the present invention.

The block circuit diagram shown in FIG. 1 for a mail processing system with a postage meter machine shows the transport flow of mail from a modem office 21 to a mail center. In at least one such office 21, letters are produced on a number of personal computers $PC_a$, $PC_b$, $PC_c$, . . . , with associated printers $D_a$, $D_b$, $D_c$, . . . , and, possibly other periphery devices.

A mail carrier can be selected and at least displayed with a user interface at each of the personal computers $PC_a$, $PC_b$, $Pc_c$ . . . . In the preferred version, the selected mail carrier information is additionally printed out in the address area with the letter contents and a window envelope is employed for stuffing which takes place at respective automated or manual stuffing locations $K_a$, $K_b$, $K_c$ . . . . As warranted, the information about the selected mail carrier can be pasted on the envelope in the form of a sticker within the framework of this manual envelope stuffing. A version is also possible wherein pre-printed or prepared envelopes are employed for the identification of a private carrier. The printer, in particular, can be a commercially available printer equipped for printing envelopes that is connected to the personal computer. In the mail station, at least one scanner scans the carrier and/or cost center information that is at least printed on in the address field that can be scanned through a window of a window envelope. The scanner is electrically connected to the postage meter machine via a data line 18. Moreover, an additional scale can be arranged in the transport path to the postage meter machine in order to determine at least the weight data of the letter. Such a scanner 26, for example, can be arranged in the delivery path to a scale 22. The scanner 26 and possibly the scale 22 as well can be components of an automatic delivery station that is arranged in front of the postage meter machine FM in the mail center at the start of the letter transport path. The postage meter machine FM can communicate as needed with a remote data center DC via a suitable communication path 17.

Figure 2:
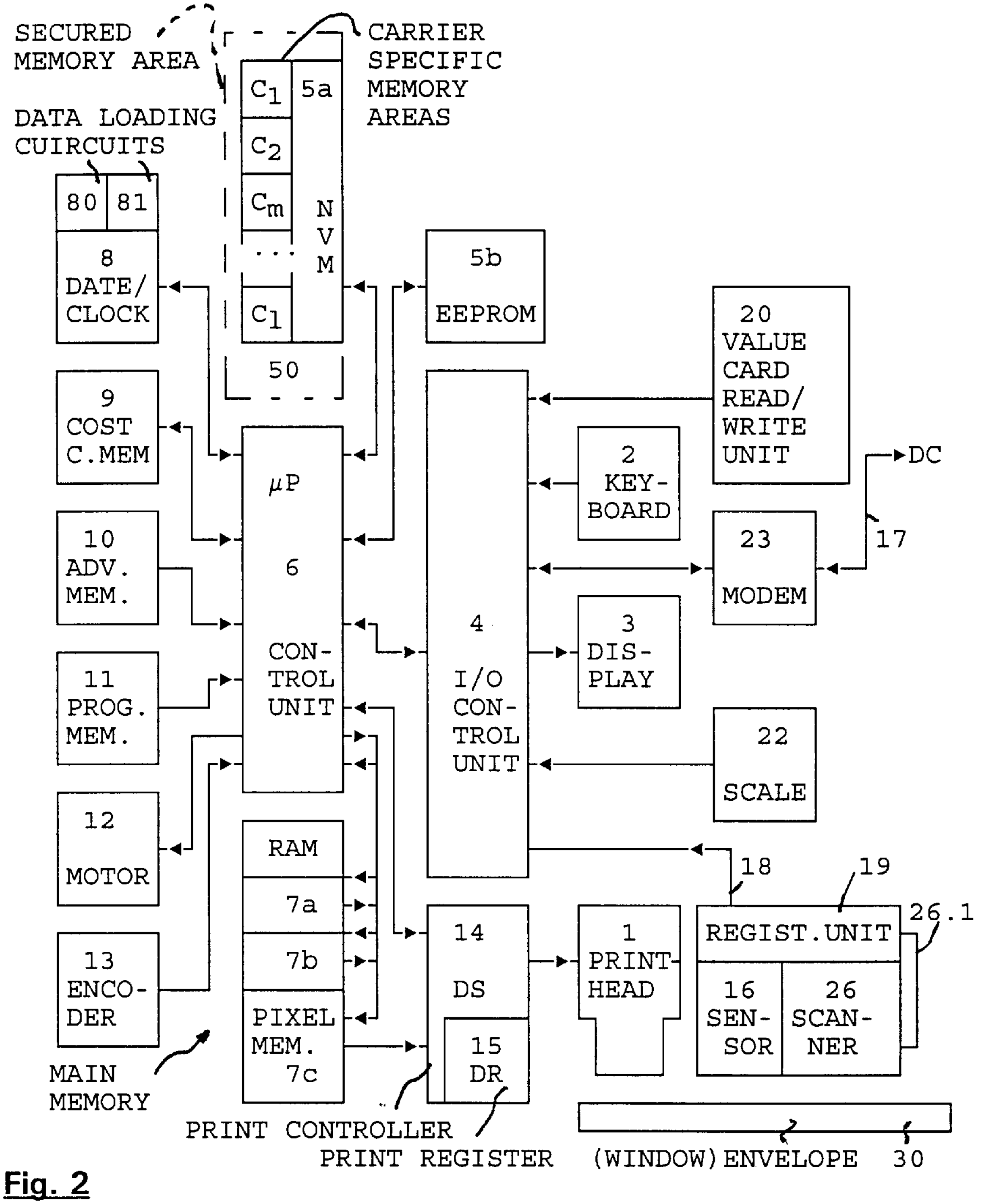
FIG. 2 is a block circuit diagram of a postage meter machine constructed and operating in accordance with the principles of the present invention with automatic data processing, in a first embodiment.

The block circuit diagram of a postage meter machine shown in FIG. 2 has a programmable processor system that is connected to at least one scanner 26 and a modem 23, a scale 22, a chip card write/read unit 20 and/or other, corresponding reception means or input means. The scanner 26 is positioned at the start of the secure wheel gap in the mail center. When the postage meter machine is equipped with an internal, dynamic scale 22 and when the internal mail path cannot be influenced from the outside, then the scanner 26 can also be arranged at a suitable location in the mail path preceding the postage meter machine. This latter requirement is necessary as a result of uniform mail regulations for the position of the address. Cost finding programs for the position of the address and of the other information exist in memories of the respective personal computers PCa, PCb or PCc in the office 21 that drive a printer in common, or separate printers, according to the aforementioned areas to be printed. An additional line is provided on the cover or in the address field of the cover as an area to be printed. A correspondingly different positioning of, if necessary, a further scanner 26.1 results for different formats of the envelope. The scanners are connected together to a first mail sensor 16 with a register unit 19 that intermediately stores data and implements a parallel-to-serial conversion. For serial data transmission, the register unit 19 is electronically connected via the data line 18 to an inputoutput control unit 4 of the postage meter machine.

In the postage meter machine housing, input and output units such as a keyboard 2, a display 3, a chip card write/read unit 20, a scale 22 and a modem 23 are connected via the inputoutput control unit 4 to a processor system having a postal-oriented security region 50, by a direct connection or via a bus (not shown). The processor system is composed of at least one memory means having a non-volatile memory (NVM) 5*a*, with carrier specific memory areas $C_i$, $C_m$, and an EEPROM 56, a clock/date module 8 and a processing unit (CPU) functioning as a control unit 6 and, possibly a specific circuit or program source 80 and/or 81 for automating the loading of data from a data central via modem or chip card, or some other suitable transmission means. The special circuit and/or program source 80 and 81 are preferably a component part of a battery-supported, non-volatile memory (CMOS-NV-RAM) in the clock/date module 8. Further supporting programs can be present in the program memory 11 and/or in a non-volatile EEPROM stored in the memory 5*b*. A print controller 14 is fashioned, for example, as an ASIC and is matched to the respective, preferably digital, printing process, and operates with a print register 15.

The input/output control unit 4 may include the print controller 14 and be connected in to the control unit 6 of the postage meter machine via a bus and, for example, can be fashioned as an ASIC. A print head 1 is connected to the print controller 14.

The various memories are usually composed of a number of permanent and temporary, non-volatile memories. Together with the control unit 6, one part of the memories forms a postage calculator in a known way an another part forms a protected postal region within the processor system. Work is carried out with the non-volatile memories of the aforementioned, other part of the memories for accounting. It is particularly provided that the protected postal region 50 be equipped with a specific accounting unit that works in a completely counterfeit-proof way and relieves the control unit 6 of this task job. The protected postal region 50 of the processor system of the postage meter machine can be fashioned as a hardware-controlled accounting unit in the form of a special circuit module or, for example, as an ASIC, so that the executive sequence during accounting cannot be manipulated in an unauthorized way, as disclosed in German patent application 196 03 467.1, corresponding to co-pending U.S. application Ser. No. 08/788,188, filed Jan. 24, 1997 entitled “Postage Meter Machine.”

In addition, an area organized according to carrier and cost centers can be provided in a special cost center memory 9 in order to execute operations related to the cost center or cost centers. Additional cost centers can thus being established or deleted without the reliability against manipulation be diminished. The protected postal region 50 within the processor system can only be read, but not overwritten. During the service life of the postage meter machine, data such as the number of pieces franked and total amount used for franking with a postage value can always only be incremented but never decremented. In particular, the postage calculator can be formed of the control unit 6 and memory areas of the EEPROM 5*b* and/or other non-volatile memories. Some of the memory areas of the EEPROM 5*b* are intended for the acceptance of fee schedule tables of the individual carriers.

Differing therefrom, individual costs and their data (number of pieces, total amount used) in the cost center memory 9 can be reduced by a predetermined amount, or can be set to zero at the start of an accounting period. The correspondingly actuated keys of the keyboard 2 and/or other input means produce a connection to external memories in order to execute operations related to cost centers.

The program memory 11 of the memory means of the postage meter machine contains programs for initiating and conducting a communication via interfaces in the inputoutput control unit 4 with the scanner 26 and with input units 20 through 23. Other peripheral inputoutput means (not shown in detail) can be connected to the processor system of the postage meter machine. At least one parallel interface to the display unit 3 and, in conjunction with the print controller 14, at least one serial interface for print data control and data transmission to the drive electronics arranged on the print head 1, can be provided in the input/output control unit 4. A further serial interface can be connected via the aforementioned register unit 19 to a number of scanners or sensors. At least one scanner 26 is a pixel sensor with a high resolution. Its data bits are output in parallel and are converted into serially fetchable data bits with a sensor shift register in the register unit 19 driven by the input/output control unit 4. The input/output control unit 4 is preferably fashioned such that a number of sensors or actuators with one or more connected sensors or actuator shift registers can be connected via a shared serial interface data line 18 to a single shared shift register in an actuator/sensor controller in the input/output control unit 4, as disclosed in greater detail in the German application No. P 44 45 053.2, corresponding to co-pending U.S. application Ser. No. 08/568,019 ("internal Postage Meter Machine Interface Circuit" Rieckhoff et al) filed Dec. 6, 1995 and assigned to the same assignee as the present application.

The base (not shown in detail) of the postage meter machine is composed of the print head 1 and a power electronic/sensorlactuator module 12 that contains an energy supply and control for the drives (paper transport, printer, tape, tape dispenser) and the required drive motor. The print head and the module 12 and an encoder 13 for acquiring the transport speed of the piece of mail lie in the base and are coupled to the processor system directly and/or to the scale 22 and, possibly to other peripheral input/output means in the mail station or in the office 21 via the input/output control unit 4 via appropriate interfaces.

The postage meter machine has a reception means such as an external modem 23 and a modem interface in the postage meter machine for the external modem 23 or for an internal modem. A communication with the remote data center DC is enabled via modem. An electronically stored credit thus can not only be replenished in the postage meter machine, but also current fee schedule table data and other data can be communicated.

In another version, a telecommunication network is provided that externally contains a memory with the fetchable data and/or flags for reloading of auxiliary functions and information into the postage meter machine. The external memory is supplied with updating data from the public postal authority and/or private carriers, preferably via the aforementioned data center DC.

Alternatively, an external memory with required updating data can be provided in a mobile radiotelephone communication network and can be addressed by a corresponding communication connection and communication means. An intermediate storage in the transmission means ensues, and data packets are then transmitted under the control of the postage meter machine and an automatic transfer of the current fee schedule by the postage meter machine is thereby potentially assured. The storing the fee schedules ensues according to various public mail carriers or private carriers in separate memory areas of the aforementioned postage calculator.

Specific inputs can be undertaken with an alternative input means, particularly a chip card. This is brought into contact with the chip card write/read unit 20 serving as an input means. The interface board of the chip card write/read unit 20 is connected to a serial interface of the postage meter machine. The contacting means in the write/read unit 20 comprises at least six contacts and the data exchange between the unprotected and/or the protected card memory area and a non-volatile memory of the program memory 11 of the postage meter machine is automatically serially undertaken in the framework of a communication protocol as soon as the chip card has been plugged into the plug-in slot of the write/read unit 20.

Such a special mail station chip card for the employees in the mail station can be advantageously utilized for entering location data. A correspondingly programmed chip card is delivered to the user after authorization of a new location or a change in location. Before the machines of the mail station are transported to a new location, it is necessary to turn them off. A location-specific initalization of the postage meter machine automatically ensues after turn-on. So that the postage meter machine need not be switched on or off often at the same location, a standby mode is provided.

With the same chip card delivered to the user, a corresponding postmark imprint text part for t he modified name of the municipality and, if needed, for the modified postal zip code is loaded into the postage meter machine in addition to the setting in order to be able to modify the print image data already stored in conformity with the change in location, as is disclosed by European Application 566 225.

Every allocation of semi-variable print image data (window data) that fill up a specific window in the print format (frame data) is stored in specific memory areas of, for example, the EPPROM 5*b* and/or of another non-volatile memory of the postage meter machine FM.

In the franking mode a cost-center-dependent accounting of the automatically or manually set postage value ensues before the printout of the franking format, this being explained in greater detail in connection with FIGS. 7*a* through 7*d*. It is also provided that a printout can be produced for the cost-center-dependent accounting by the postage meter machine, as was already disclosed in German OS 42 24 955. In the inventive mail processing system, a print requirement upon introduction of a sheet of paper into the printing region is recognized by a standard, second mail sensor 16.1 and, as a reaction to a preceding, manual input including entry of the cost center number in conjunction with a function key, the postage meter machine then produces a printout. The postage values that have been used are listed individually and cumulatively related to various carriers. The cost center printout is regularly sent to the appertaining department in the office 21 or in response to a specific request.

As needed, data for a carrier are also produced, for whom the postage values of all cost centers serviced by this carrier are compiled. This is meaningful when the departments are fiscally independent units, i.e., when a number of small companies use an office 21 and the mail station in common but must carry out separate accounting at the carriers.

The communicated listing can also be compared in a personal computer of the office 21 to an internally stored listing. Only modifications of the setting of the carrier are undertaken by the mail center in order, for example, to use favorable offers to obtain rebates from carriers, so that this can be checked by such a comparison.

Figure 3:
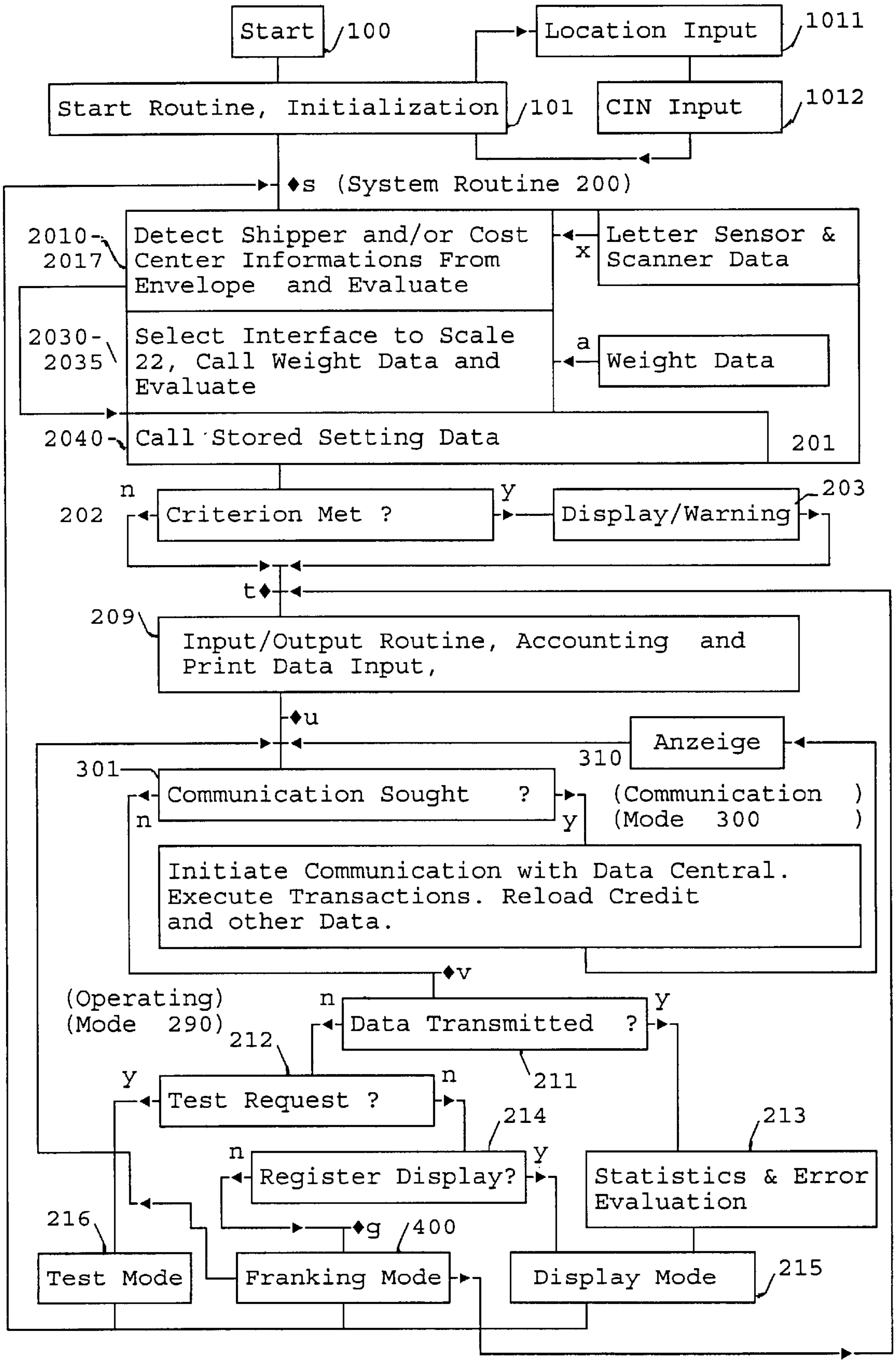
FIG. 3 is an overall flowchart of a postage meter machine with integrated postage calculation and with automatic data processing according to the first embodiment.

The overall flowchart for the postage meter machine of FIG. 2 is shown in FIG. 3. After a start 100, a start and initialization routine 101 is executed which includes a sub-step 1011. After turn-on, a communication requirement is formed in the sub-step 1011 in order to initiate an automatic communication with the data center, for example, via modem 23, and in order to implement a corresponding data transmission wherein the municipality name in the date stamp is modified corresponding to the current location.

The location-specific offering of data ensues optionally or corresponding to the existing postage meter machine type with a card-like transmission means or with corresponding reception means, ensuing from an external memory via a communication network (modem, mobile radiotelephone).

Given a location input with a chip card via a chip card readerwrite unit 20, authorization must be obtained in advance. This is in fact more time-consuming but allows a location registration for the respective mail processing system in the data center DC.

In another version, an entry of the location is undertaken, for example, by the keyboard 2 instead of with a remote data transmission or instead of chip card when the postage meter machine is turned on, for example, by a new user after a change in location. After the turn-on, such an input possibility is afforded in sub-step 1011 of step 101 of the initialization, namely by entering the postal zip code into the postage meter machine.

During the initialization routine 101, there is also the possibility in addition to the input of the location to change the previous carrier constellation by definition of a new set of mail carriers, for example with an input of a carrier identification number (CIN) corresponding to the name of the mail carrier in sub-step 1012, as disclosed in European application No. 95 250 313.4, corresponding to U.S. application Ser. No. 08/579,059 filed Dec. 26, 1995 entitled "Method for Entering Data Into A Scale." When one of the carriers has been selected from the afore-mentioned set of mail carriers at a later time, only the carrier identification number (CIN) need be automatically communicated to the postage meter machine and the data stored in non-volatile fashion under the carrier identification number (CIN) in step 1012 need be accessed.

After the initialization routine 101, the program branches to a first step 201 a system routine 200 in order to at least call non-volatilely stored settings for the postage meter machine in sub-step 2040 when no piece of mail is detected in the mail delivery path.

A piece of mail possibly supplied in the meantime remains in a waiting period, preferably at the start of the delivery path, or possibly in the delivery path on the scale 22 until all manually required inputs have been actuated in the second step 209. The franking mode 400 is reached after further steps of the overall flowchart have been executed. It is recognized therein that the manual input has been terminated by a comparison of the loop traversals after the last input to a predetermined plurality of loop traversals, or a time duration is compared to a predetermined time duration after the last input. A switch is then first made into the standby mode before returning to the system routine 200 at S.

Inventively, data scanned the scanner 26 positioned in the mail delivery path to the postage meter machine FM can be entered into the postage meter machine during the activated operating or standby condition of the postage meter machine when a first postal matter sensor 16 has detected a piece of mail that is being transported to the print head 1. A first flag is thereby set. A second flag is also set when the first postal matter sensor 16 is actuated. When, however, only the second postal matter sensor 16.1 by itself is actuated, or is actuated before the first postal matter sensor 16, this can be determined in an interrogation step 211 which then in turn leads to a branch into the error interpretation mode 213. When, for example, the postage meter machine is in the standby condition and only the second postal matter sensor 16.1 is activated, this does not lead to a franking however, an internal cost center printout or a printing of service data or of an advertising slogan can still be undertaken.

The interfaces in the input/output control unit 4 are selected in order to recognize the connected peripheral means and in order to switch the postage meter machine as warranted into a required, pre-programmed operating mode that enables the collaboration and communication with the aforementioned peripheral means. For example, a detection of the scanned data can trigger a conveying of the piece of mail in the direction of the print head 1. The interface to the scanner 26 is selected in order to detect at least one cost center and/or carrier identifier in sub-steps 2010 through 2017 (explained in connection with FIG. 6) in order to read valid data into the memory areas of the non-volatile memory of the postage meter machine provided for that purpose, so that a manipulation-proof, automatic setting can be achieved, which is also preserved in case of an outage of the operating voltage. In sub-steps 2020 through 2035 (also shown in FIG. 6), the interface to the scale 22 is then selected, whereby a mode switching ensues if a scale 20 is connected for weight input. The postage meter machine FM is then in a slave condition in order to receive data from the peripheral means, i.e. the scanner 26 and the scale 22. The new setting for the automatically entered weight value is likewise non-volatilely stored, with the old setting data being overwritten.

In at least one following step 202, an interrogation is carried out to determine whether the scanned data yield meaningful information to determine at least one limit value is exceeded, i.e., whether a criterion was met that leads to a warning in a following step, for example a display that warns the user or displays an error. After a number of interrogations in further steps 202, 209, 301, 211, 212 and 214 have been executed in the program, the postage fee determined in the step 209 for a weighted piece of mail, or according to the setting, is accounted for or debited in the franking mode 400. Print data for printing are now offered from the pixel memory 7*c* in the RAM 7.

Moreover, an automatic print data generation with protected data also already ensues in the initialization routine 101 for preparing for a printout, as disclosed in greater detail in co-pending U.S. application 08/525,923 ("Method For Improving The Security Of Postage Meter Machines," Windel et al filed Sep. 8, 1995 and assigned to the present application ). Further security criteria can be interrogated at least in step 202 and can be displayed in the step 203 or can be edited for signaling. Even when no further inputs are undertaken, a stamp imprint can be generated and printed from the stored data protected against manipulation. The following, inventive, second step 209 is directed to a specific input and display routine. In the aforementioned step 209, the previously non-volatilely stored data can be overwritten or modified with the input means of the postage meter machine or other inputs can be manually actuated and displayed. A print data input is also provided for corresponding sub-images (window pixel data). The transport of the postal matter in the direction of the print head 1 may then be interrupted so that the input can be completed. When, however, no manual intervention ensues, the mail processing and franking is executed fully automatically.

After the second step 209, the point u, i.e., the beginning of a communication mode 300, is reached and an interrogation is made in a third step 301 to determine whether a transaction request is present. This is the case when request data were formed or when an input was undertaken for the purpose of reloading credit. When this is not the case, the communication mode 300 is exited and point v, i.e., the actual operating mode 290 of the postage meter machine, is reached. When relevant data were communicated in the communication mode, then a branch is made to the step 213 for data interpretation. A statistics and error evaluation is implemented in step 213 in order to acquire further current data that, after branching to the system routine 200, can likewise be called in the sub-step 2040 of the first step 201. Or, when the non-communication of data was found in at least step 211 following the communication mode in the third step 300, a branch is made to the next interrogation in step 212. A check is made in step 212 to determine whether corresponding inputs had been actuated in order to proceed into the test mode 216 given a test request, otherwise to proceed into a display mode 215 when a check 214 of the register status is intended. When this is not the case, the point g, i.e., the franking mode 400, is automatically reached. In the franking mode 400, a number of security interrogations are provided and the cost-center-related accounting only ensues shortly before the beginning of the printout of the franking format, with memory address data being employed that were already previously formed after their entry on the basis of a change in the cost center number. A higher security against manipulation is achieved with the aforementioned sequence of interrogations. With the program routine of the postage meter machine, the branch is then made from the franking mode 400 to point u when a number S of credit items has been used. A communication with the data central DC is automatically undertaken in order to be able to continue to frank. A branch is repeatedly made to point d from the franking mode 400 in order, in the second step 209, to enable a data input with the postage meter machine keyboard 2. In a practical fashion, such manual inputs ensue when a signal for a print output request was not yet generated, this being derived from a corresponding postal matter sensor signal. When, however, postal matter was recognized and the print output request was generated after a predetermined time delay, a cost-enter-dependent accounting and a franking of a piece of mail are implemented by program and a branch is then made back to point s.

Figure 4A:
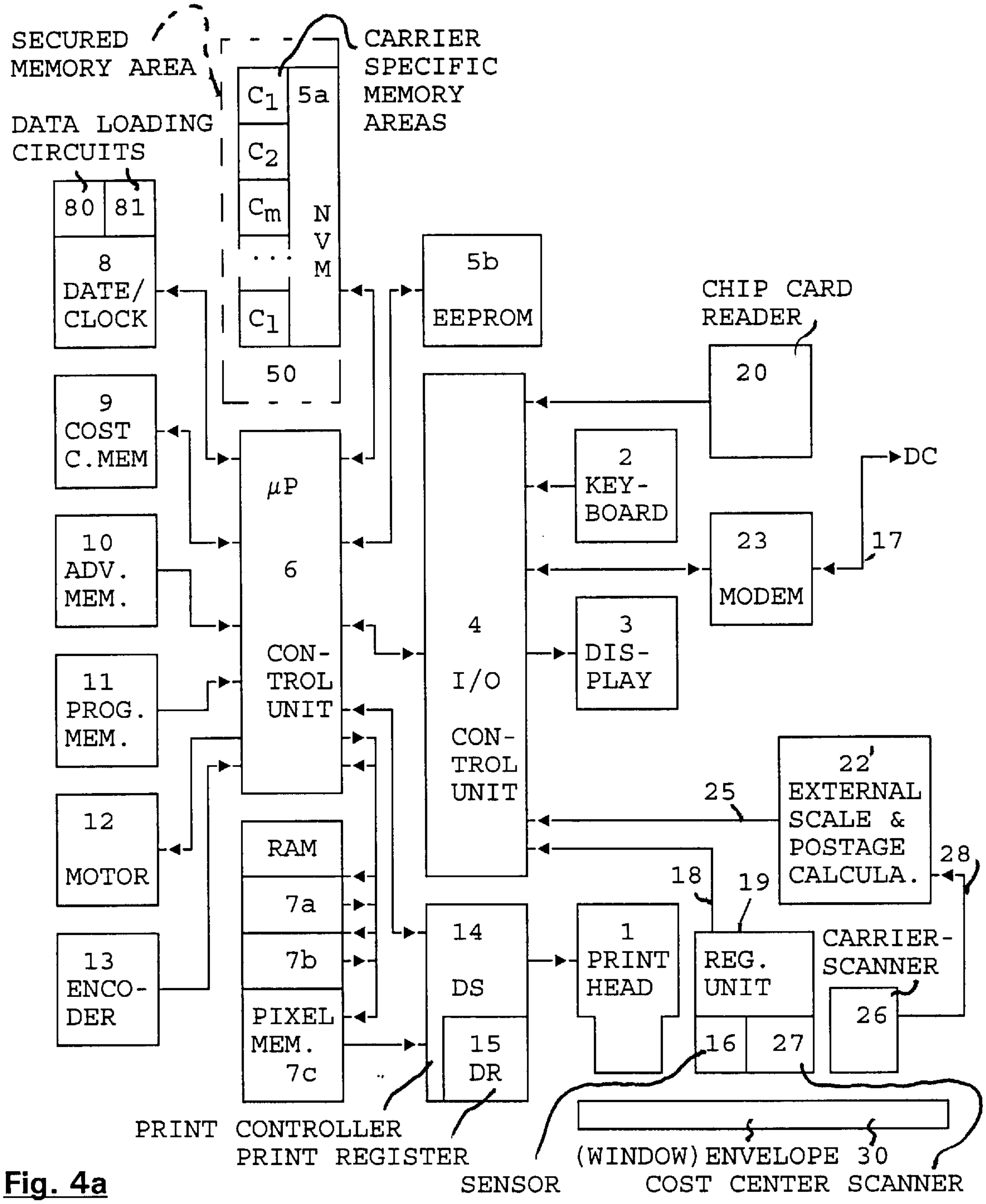
FIG. 4*a* is a block circuit diagram of a postage meter machine constructed and operating in accordance with the principles of the present invention with external scale for a postage calculation and with automatic data processing according to a second embodiment.

The block circuit diagram of a postage meter machine shown in FIG. 4*a* differs from that shown in FIG. 2 on the basis of an external scale for the postage calculation. The data input of the carrier information ensues so that at least one scanner 26, via a line 28, supplied scanned information initially into the external scale 22, differing from the exemplary embodiment shown in FIG. 2. The external scale 22 communicates the calculated postage value via a line 25 to the postage meter machine which is thus relieved of calculating the postage. The data input in fact fundamentally ensues according to the first version of the mail processing system only on the basis of the scanning; however, no cost center information can be entered. To this end, at least one second scanner 27 is arranged in the delivery path to the postage meter machine, positioned separately or arranged in the external scale 22' and electronically connected to the postage meter machine via a line 29. The invention is not limited to this embodiment since, of course, the scale 22' or other peripheral input/output means can be connected to a shared, serial interface via the register unit 19 and the data line 18.

Corresponding scanners 26.1 and 26.2 for carrier information are arranged in the mail delivery path for other envelope formats or corresponding scanners 27.2, and 27.2 for cost center information are arranged in the mail delivery path of the postage meter machine, this having not been shown in FIG. 4*a* for clarity.

Figure 4B:
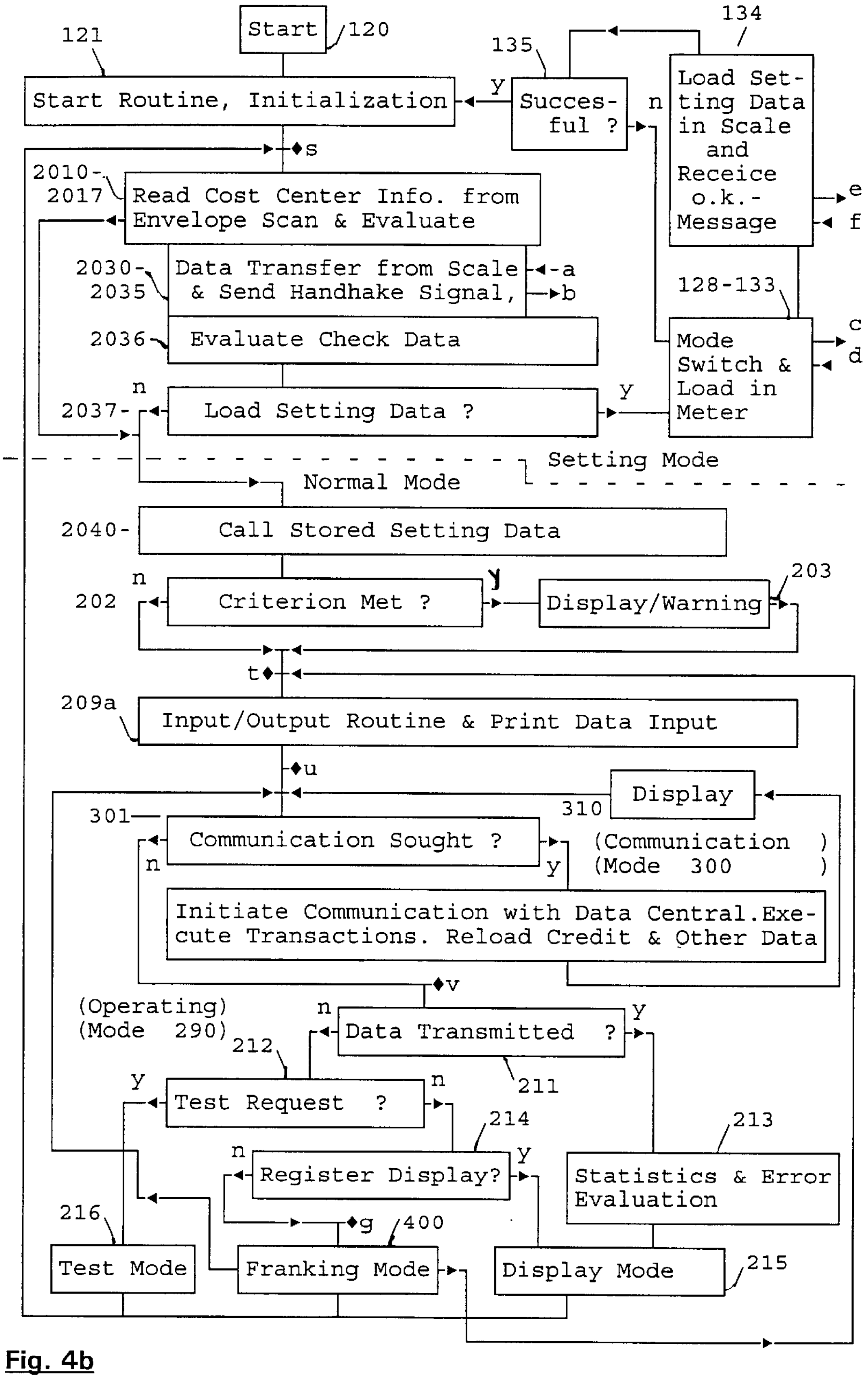
FIG. 4*b* is an overall flowchart for a postage meter machine with external scale for a postage calculation and with automatic data processing according to the second embodiment.

The overall flowchart for a postage meter machine with an external scale 22' for postage calculation shown in FIG. 4*b* contains an automatic data input according to a second version. After initialization in step 121, an updating mode (steps 128 through 135) may possibly ensue, this being followed by a normal mode disclosed in European application Serial No. 95 250 313.4, corresponding to the aforementioned co-pending U.S. application Ser. No. 08/579,059. In addition to sub-steps 2010 through 2017 in order to detect sensor signals, the first step 201 of a system routine 200 also includes sub-steps 2030 through 2035 for the reception of data that are communicated from the scale and further sub-steps 2036 through 2037 for interpretation as well as sub-step 2040 for calling data, including scale input data, which here include selected imprint, postage fee and carrier type.

The aforementioned further steps 2036 through 2037 for interpretation are required in order, if necessary, to update the fee schedule table data for individual carriers stored in the postage calculator of the scale 22'. A switch is then made from sub-step 2037 to the updating mode (steps 128 through 135). A communication of the corresponding check data that are communicated to the postage meter machine for checking the currentness of the carrier-related data stored in the external scale ensues during the scale communication mode (substeps 2030 through 2035). When the postage fee is calculated in the scale 22', carrier-specific data must be communicated to the scale 22' and stored therein. As was already explained with reference to FIGS. 2 and 3 and as disclosed in European application No. 95 250 313.4, corresponding to the aforementioned co-pending U.S. application Ser. No. 08/579,059 it is thus possible to transmit fee schedule table data of selected carriers into the scale from an external memory for carrier data via the postage meter machine so that postage values can be determined in a current way corresponding to the respectively selected carrier. In the updating mode, steps 120 through 135 are executed in order to check the currentness of the fee schedule tables stored in the scale 22' and, if necessary, to restore them. In sub-step 2036, the postage meter machine first checks whether check data were communicated from the scale to the postage meter machine. Otherwise, given non-communication, a branch is made back to the start via a sub-step 2060 for an error message. When the substep 2036 for evaluating communicated check data has been successfully opened, a switch is made for forming request data in the postage meter machine, this having already been explained in greater detail in conjunction with the first version in FIG. 3. A determination as to whether the fee schedule table data of the selected carrier are still valid, and whether a reloading or updating is required, must ensue before a switch can be made to normal operation. When request data were formed in sub-step 2036, then new updating data are to be loaded and a branch is made from the interrogation sub-step 2037 to steps 128 through 133 in order to undertake a mode switching of the postage meter machine into the master status and to load the required updating data into the postage meter machine according to the request data. In the following step 134, a transmission of the updating data required by the scale 22' ensues to the scale 22. Whether updating of the data stored in the scale 22' was successful is determined in step 135 and a branch is then made back to the initialization routine, and the mode switching is canceled. In sub-steps 2010 through 2037, the postage meter machine is again in the slave status.

The scale input data communicated to the postage meter machine in sub-step 2033 relates to imprint selection, carrier identification number CIN, possibly to the minimum validity duration of the postage fee schedule table belonging to the CIN and the identified postage fee for a weighed piece of mail as well as, possibly, the measured weight value. When the minimum validity duration of the postage fee schedule table belonging to the CIN is present stored in the postage meter machine allocated to the CIN, the minimum validity duration need not be communicated from the scale. After a transmission of the selected CIN from the scale 22' to the postage meter machine an updatable allocation table realized in the memory units 5*a* and/or 5*b* or the module 8 is retrieved in order to determine the minimum validity duration or the validity time span, this being interpreted in step 2036 by comparison to the currently set date, or to the date stored in non-volatile fashion in the clock/date module 8. After an interrogation has been carried out in step 2037, and if no updating data are to be loaded, the normal mode is reached.

At the start of the first step 201 of the system routine 200, an execution of substeps 2010 through 2017 again inventively ensues for scanning the cost center information from the letter through the window of a window envelope, or directly from the envelope, as was described in greater detail in conjunction with FIG. 3 before the scale communication mode (sub-steps 2030 through 2035) is reached.

In the modified embodiment according to FIG. 4*b*, the postage meter machine is operated in the slave status in which it waits for a further automatic input. The serial interface to the scanner 27 is therefore selected in the first step 201. After a corresponding scanning, automatically entered data bits with respect to the cost center information are interpreted and the recognized cost center number is non-volatilely stored and likewise offered as further setting data in addition to the setting data that are already non-volatilely stored. If an unknown cost center number is read in, or some other malfunction is caused, this can be identified on the basis of steps 202 and 203 that have already been explained, and an appropriate error message can be displayed.

Figure 5A:
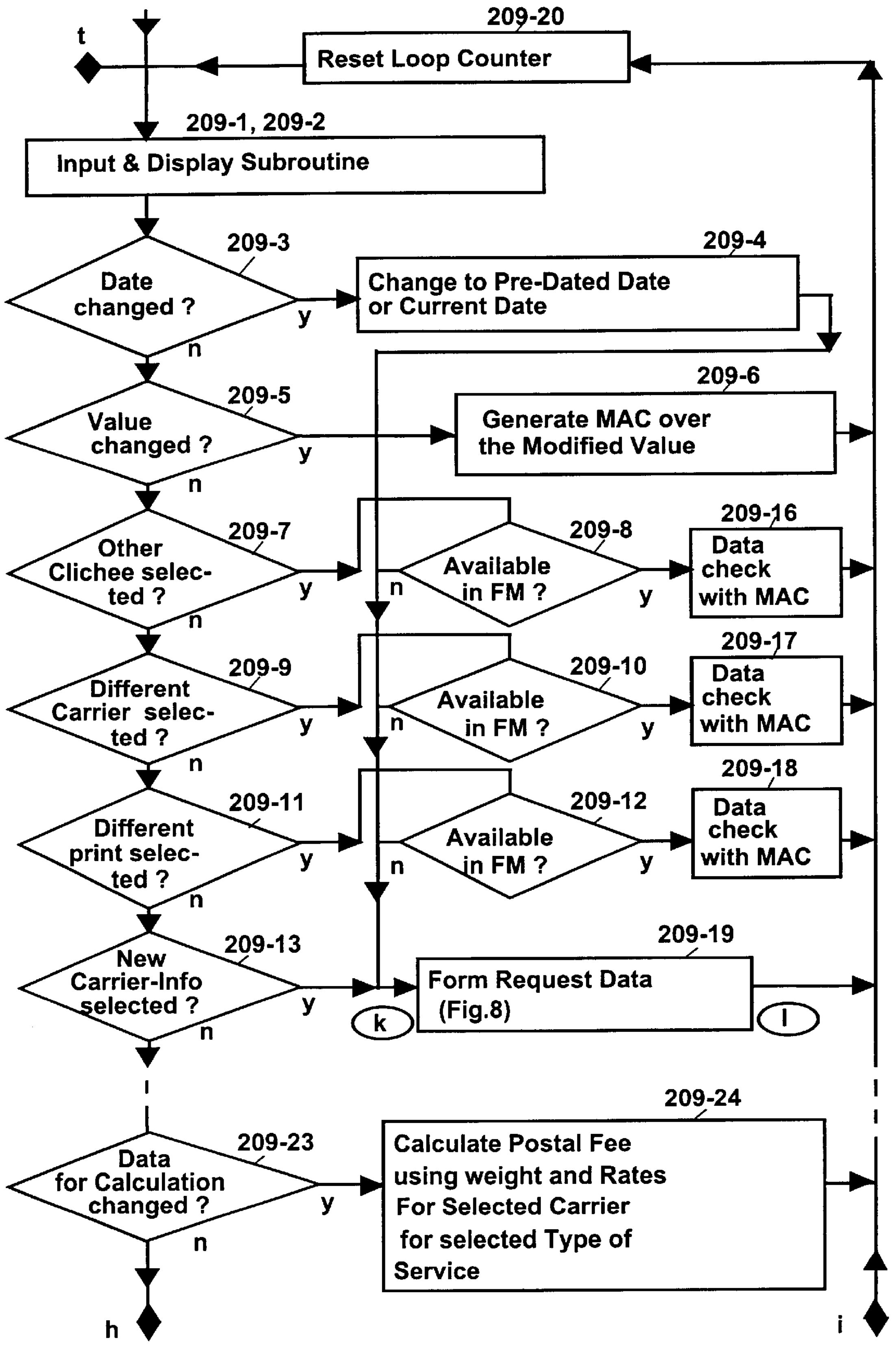
FIGS. 5*a*–5*c* together for a flowchart of evaluation of a data entry for the postage meter machine constructed and operating in accordance with the principles of the present invention in the framework of an input/display routine according to the first embodiment.

As shown in FIG. 5*a*, the modification of the setting with respect to the imprint, the mail carrier and the services, or selected imprints thereof is undertaken by entry of an allocated number, with the respective functions being called by the actuated elements of the keyboard 2 in a sub-step 209-1 and determined in interrogation sub-steps 209-7, 209-9, 209-11. The formation of the request data is connected to the aforementioned modification of the setting of the mail carrier and/or connected with those data of the clock/date module 8 called in the step 201 but modified due to the passing of time. The modification can be identified by the control unit 6 in the sub-step 209-3. In the communication mode, the request data lead to the reloading of sub-image data or files pixel image data files that are either embedded as window pixel data into the frame data or modify the frame data of the franking format itself in a carrier-specific fashion.

It is also provided that the communicated sub-image data files, allocated to a carrier identification number (CIN) corresponding to the respectively selected mail carrier, are non-volatilely stored in the postage meter machine in order, given selection of a predetermined mail carrier number or CIN, to generate specific print formats. Moreover, the communicated sub-image data files, pixel image data files and the modified data generated by automatic or manual input are stored in non-volatile memory areas of write/read memories 5*a* and 6*b* and/or the module 8.

As already explained, the data can be overwritten or, respectively, modified or other inputs can be manually actuated and displayed in step 209 with the input means of the postage meter machine.

Figure 5B:
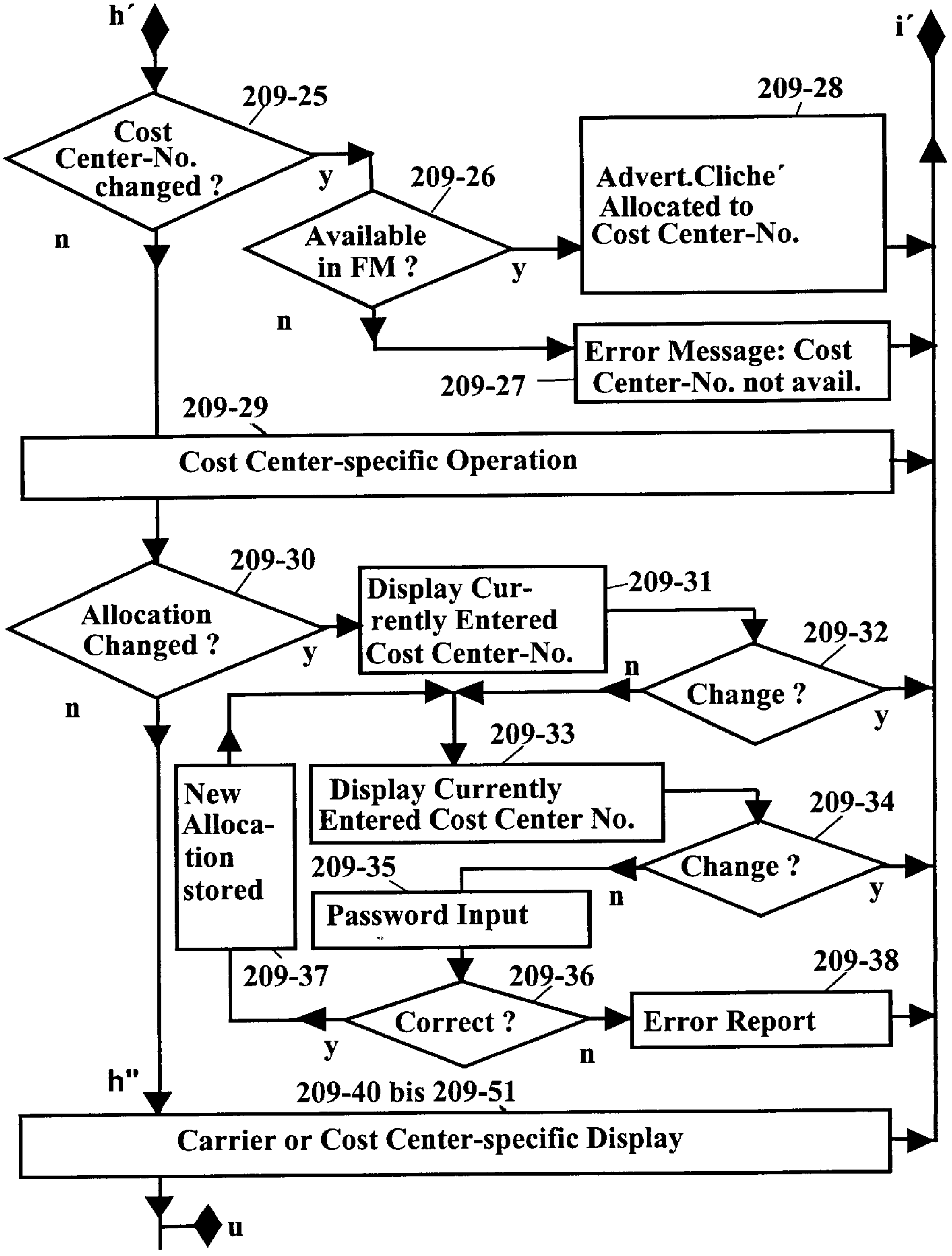

The input of the cost center information in the first step 201 of the system routine 200 can, in the second step 209, additionally lead to a routine in sub-step 209-28 for entry of an advertising slogan number on the basis of the cost center information, as shall be explained in greater detail in conjunction with FIG. 5*b*. Corresponding allocations of advertising slogan numbers to cost center information are non-volatilely stored in the postage meter machine.

Figure 4C:
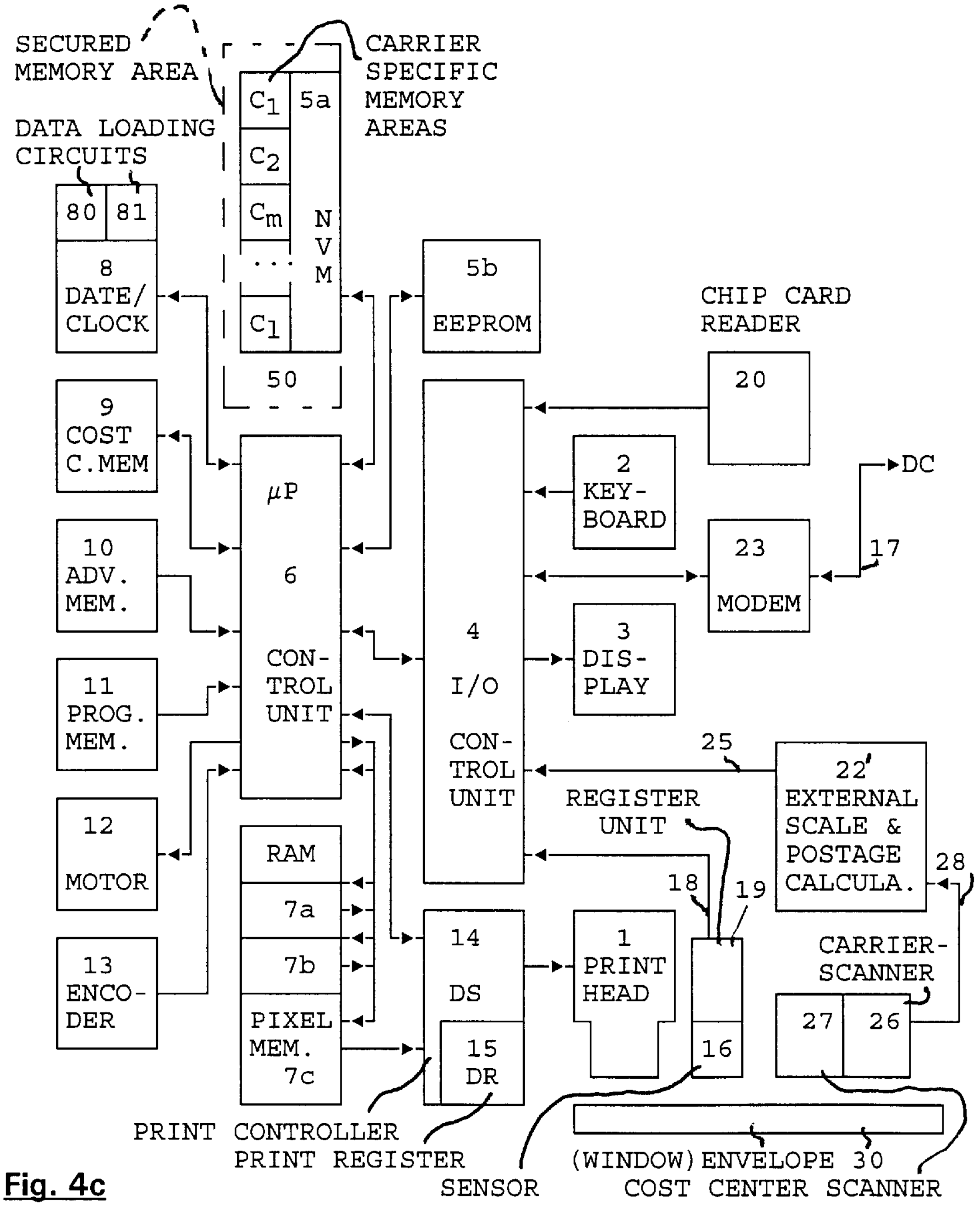
FIG. 4*c* is a block circuit diagram of a postage meter machine constructed and operating in accordance with the principles of the present invention according to a third embodiment with cost center/carrier scanner connected to the external scale for a postage calculation.

FIG. 4*c* shows a further block circuit diagram of a postage meter machine according to a third embodiment differing from the second embodiment according to FIG. 4*a*. The cost center/carrier scanners are thereby connected to the external scale 22'. The cost center scanner (or scanners) 27 or the carrier scanner (or scanners) 26 have an electronic circuit for image evaluation. Such a mark reader means with subsequent image evaluation can be realized such as disclosed for example, in German OS 43 44 471.

It is provided in an alternative version that the external scale 22' itself has an electronic circuit and a program for image evaluation. Whereas the cost center scanner 27 supplies information that is required only in the postage meter machine, the carrier scanner 26 supplies the required information for the postage calculation in the external scale 22'. It is self-evident that such a scale 22' must be equipped with corresponding programs for image interpretation in order to recognize the corresponding carrier information from a mark.

FIG. 4*c* shows a circuit with a serial interface 18 with data division to the register unit 19 in the base of the postage meter machine. In a further version (not shown) this register unit 19 has no lefter sensor 16. In this further version, the lefter is likewise connected to the external scale 22'. Alternatively, all data can be acquired by a common scanner, processed in the scale 22', and thus looped through the scale 22' to the postage meter machine interpreted or not interpreted.

Figure 4D:
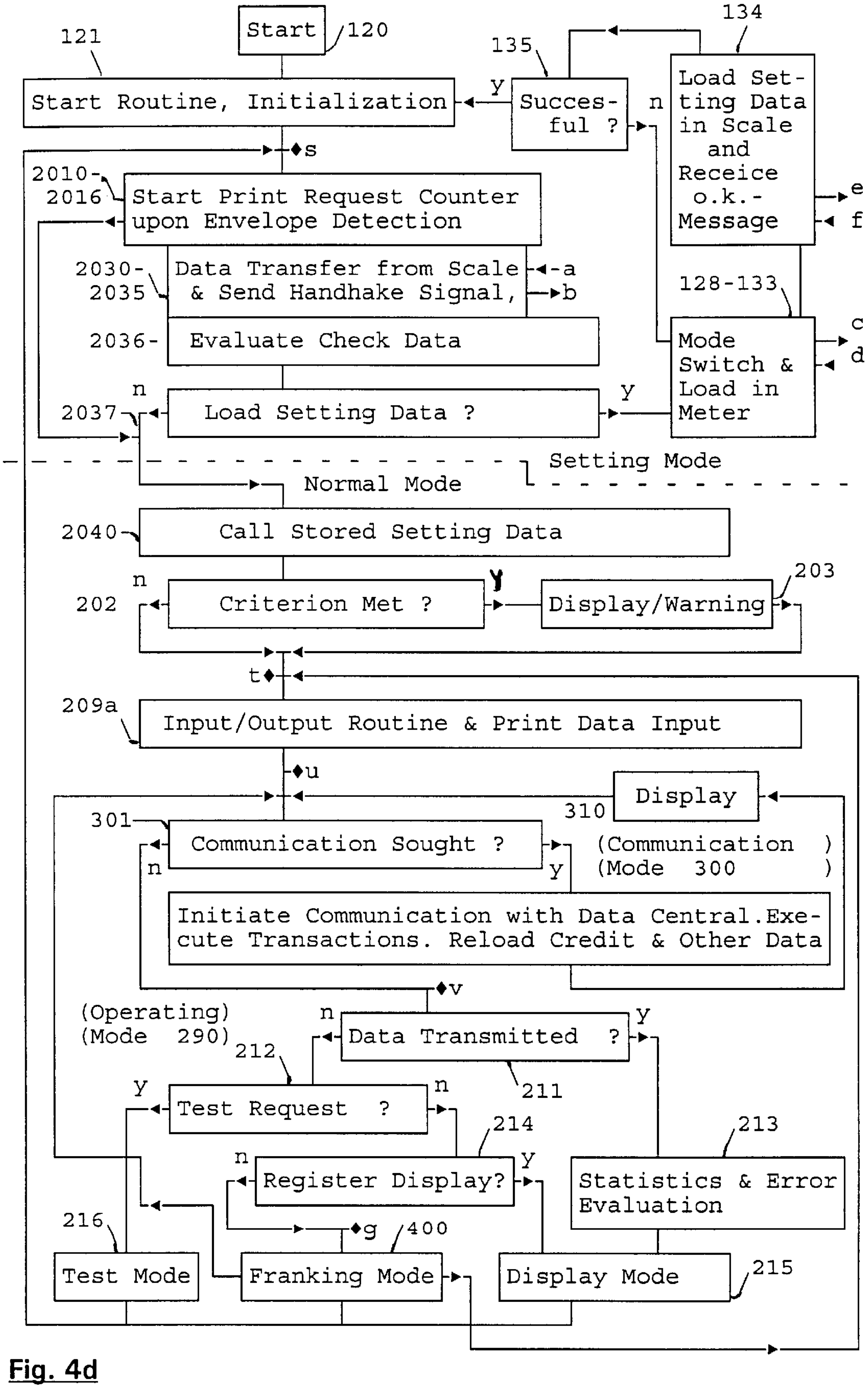
FIG. 4*d* is an overall flowchart for a postage meter machine according to the third embodiment.

FIG. 4*d* shows an overall flowchart for a postage meter machine according to the aforementioned third embodiment. The particular characteristic compared to the overall flowchart shown in FIG. 4*b* for the second embodiment is the elimination of an evaluation of the cost center mark in the postage meter machine. The sub-step 2017 is thus eliminated in the first step 201. A communication of the externally determined cost center and carrier number ensues together with further data that are communicated for checking the currentness of the carrier-related data stored in the external scale 22' during the scale communication mode (steps 2030 through 2035).

The arrangement for data entry into a postage meter machine includes input and output means that are connected to a processor system, and at least a first scanner 26 that is indirectly or directly connected to the external scale 22' or to the postage meter machine in order to enter carrier information into the scale 22' or into the postage meter machine in automatic fashion, this being required for the carrier-specific fee calculation, and the processor system of the postage meter machine contains a control unit (microprocessor) 6 that is programed with a routine stored in a memory area 81 of the clock/date module 8 in order, as needed, to correspondingly load the data of the automatically set, new mail carrier in automatic routines.

Processing means for the scanned information are integrated into the postage meter machine or, into the scale or into some other additional, peripheral device, for example in an automatic feeder, in order to determine the carrier and/or the cost center. The cost center scanner 27 or carrier scanner 26 can include an electronic circuit for image evaluation, however, in another version the electronic circuit in the scanner merely supports an image interpretation which ensues in a peripheral device or in the postage meter machine.

Additionally, the control unit 6 is programmed with a further routine in order, after turn-on, to initialize the postage meter machine with a specific location and, as needed, in order to load further data into the postage meter machine. Also included are basic franking image data prescribed or required by the carrier, analogous to the sovereignty characters of the national, governmental mail carriers, as was described in detail in German application 195 49 305.2, corresponding to co-pending U.S. application Ser. No. 08/1770,525 ("Method and Arrangement for Entering Data Into a Postage Meter Machine," Guenther et al) owned by the same assignee as the present application.

This type of reloading is particularly provided for digital printing processes that allow a program-controlled embedding of variable or semi-variable window pixel field data in constant frame pixel field data. Such a method for controlling the column-by-column printing of a postage stamp character image in a postage meter machine is disclosed, for example, in European Application 578 042.

The arrangement for data entry into a postage meter machine having input means and output means that are connected to a processor system includes the following.

The postage meter machine contains an inpuVoutput control unit 4 connected to at least one internal or external scale 22 or 22' for weight input, a register unit 19 for automatic input of data and for controlling connected periphery devices, as well as means such as a chip card write/read unit 20 and/or a modem 23 for communication to a remote data central DC.

The input means include first actuation means in order to set the postage meter machine to a different mail carrier, and second actuation means for the specific setting of a new mail carrier.

A processor system contains a control unit 6 that is programmed with a routine in order to correspondingly load the data of the set, new mail carrier in automatic routines 1000 of the communication mode 300 and in order to generate a modification in the print format, whereby the generated change data are stored non-volatilely under a number and allocated to the respective mail carrier or are stored non-volatilely allocated to a carrier identification number (CIN) corresponding to the selected mail carrier.

It is also provided that at least one first scanner 26 is connected to the external scale 22' in order to read a carrier information into the scale 22' which implements the carrier-specific fee calculation and to input the calculated postage value into the postage meter machine via a data line 25 and the input/output control unit 4. Moreover, at least one second scanner 27 can be connected to the register unit 19 and to the postage meter machine via a data line 18, in order to automatically enter cost center information into the postage meter machine, this being required for cost-center-specific accounting.

FIG. 5*a* shows a flowchart of a data entry for the postage meter machine according to the first embodiment. In the second step 209 for an input and display routine, specific interrogation steps are also utilized in addition to the standard ones. In the second step 209, for example, a pre-dating for future mail with the input means of the postage meter machine causes the previously non-volatilely stored date to be overwritten and displayed. To that end, the date displayed in the sub-step 209-2 is overwritten on the basis of a data input undertaken in the sub-step 209-1 with the input means before a corresponding, sub-step 209-3 for interrogation is reached. When a different date than that prescribed by the clock/date module 8 was set, then this is identified in the interrogation step 209-3 and a branch is made to the sub-step 209-4 in order to implement the change to a pre-dated date or the current date. After a rebranch, the new date is displayed in the second sub-step 209-2. Such a method for data setting for electronically controlled postage meter machines can ensue in a standard way. The second step 209 for an input and display routine has been supplemented by specific interrogation steps. Thus, a branch from the sub-step 209-4 for date change is made via further sub-steps, particularly a sub-step 209-19 in order to form request data and, via a sub-step 209-20 in order to reset the loop counter, to a point t at the input of the input and display routine (second step 209). A preferred method for data input into a postage meter machine was disclosed in detail in the aforementioned German application 195 49 305.2 and corresponding U.S. application Ser. No. 08/770,525.

When it is found in the interrogation in the sub-step 209-3 that no other date data were selected, the next interrogation in the sub-step 209-5 is reached. An interrogation is thereby made as to whether a different value was selected in the input. If this is the case, i.e., when a different value was selected in input, then a branch is made to the sub-step 209-6 in order to generate an encoded check code (MAC) over the selected value. A preferred method for securing data and program code has been disclosed in detail in German application No. 195 34 530.4, corresponding to co-pending U.S. application Ser. No. 08/525,923 filed Sep. 8, 1995, entitled "Method For Improving The Security of Postage Meter Machines."

After the aforementioned sub-step 209-6, a branch is made back via the sub-step 209-20 in order to reset the loop counter to the point t at the input of the input and display routine (second step 209). If, however, this is not the case, further interrogation sub-steps 209-7 through 209-50 are sequenced. A direct value input via the keyboard 2 is possible, for example entering known fee schedules, with the sub-step 209-1 even when no scale is connected. The basis for this form of presentation of the respective carrier-associated stamp format is a carrier-associated control data file that is suitable for determining or for modifying an allocation of sub-images to other variable image data files (window image data) or invariable sub-images image data files (frame image data). Such image data and control data files are presented in detail in European Application No.95 114 057.3, corresponding to co-pending U.S. application Ser. No. 08/706,504, filed Sep. 5, 1995, entitled "Method for Generating A Print Format That is Printed Onto A Carrier in a Postage Meter Machine."

A check is made in the sub-step 209-7 to determine whether a different cliche' was selected in the input in the sub-step 209-1. A check is made out in the sub-step 209-9 to determine whether a different carrier was selected automatically in step 201 (FIG. 4*a*) or during the input in first sub-step 209-1. A check is made in the sub-step 209-11 to determine whether a different selective imprint was selected during the input in the sub-step 209-1, this, of course, only representing a carrier-associated service performance in addition to special delivery, air mail, printed matter, return receipt, etc. The setting of the service performances can be automatically communicated to the postage meter machine as shipping data, just like the carrier data, and the setting data are preferably displayed in the display field for the selected imprint of the postage stamp and require further interrogation steps for manual modification, that have not been shown in FIG. 5*a* for clarity.

It is advantageous when an ongoing adaptation of the user specific input set to the user thereof is undertaken, as disclosed by German OS 42 17 478 and when a clear text illustration of the stamp to be printed ensues in the display, by means of a branch back to the display to the second sub-routine 209-2. A modification of the stamp format that has been undertaken can thus be easily monitored, particularly when change inputs relating to a different imprint, a different carrier or to a different selective imprint are manually or automatically undertaken.

In FIG. 5*a,* an interrogation criterion according to a carrier change is inventively satisfied in the sub-step 209-9 when a corresponding scanning of the mail has ensued during the framework of the input routine (first step 201 in FIG. 3) or when the calculated postage value and appertaining data about the carrier type are supplied by the external scale 22' (first step 201 in FIG. 4*b*), and thus a modified carrier information for accounting purposes was automatically entered into the postage meter machine.

A corresponding automatic input in the first step 201 (FIGS. 3, 4*b,* 4*d*) or manual input in the sub-step 209-1 being assumed, a branch is made to sub-step 209-10 when the sub-step for checking for carrier input (209-9) is reached in order to check the availability of the data in the postage meter machine. The absence of a concordance with respect to the data sets stored in the personal computers PCa, PCb, . . . PCm in the office 21 relative to the individual carriers can be determined with this check in sub-step 200-10. The data of the missing carrier or of a new carrier, can be stored in the postage meter machine after they are communicated.

Correspondingly, a branch is made from the sub-step 209-7 for checking for slogan input, or from the sub-step 209-11 for checking for selected imprint input respectively to sub-step 209-8 or sub-step 209-10 for checking the availability of the data in the postage meter machine. Within the framework of an automatic entry in the first step 201 (FIGS. 3, 4*b,* 4*d*) of a cost center number, an advertising slogan allocated to the cost center can likewise be automatically selected. It thus still remains up to the employee in the mail center to manually modify the selected imprint when this seems necessary from his other point of view and falls within the scope of his or her responsibility.

Given available data, a branch is made from the sub-steps 209-8, 209-10 and 209-12 for slogan, carrier or selected imprint input checking respectively to the allocated security checking steps 209-16, 209-17, 209-18, whereby an automatic print data input is undertaken given validity. A data check on the basis of an encoded check sum (MAC) prevents a manipulation with fraudulent intent, as was disclosed in detail in German application Serial No. 195 34 530.4, corresponding to the aforementioned co-pending U.S. application Ser. No. 08/525,923.

If, however, the other hand, the necessary data are not available in the postage meter machine, a branch is made at a point k to the nineteenth sub-step 209-19 in order to form request data. If actuation means for a new input of a carrier were actuated during the input routine (sub-step 209-1), this is identified in an interrogation step (sub-step 209-13) and a branch is likewise made to point k of the sub-step 209-19 in order to form the request data. The aforementioned sub-step 209-19 shall be explained in greater detail below in conjunction with FIG. 8.

A number of interrogation steps that are not shown can lie between the interrogation step 209-13 and a point h in order to further interpret inputs such as, for example, those relating to service performances, shipping types, shipping forms or mail classes. If it is then found in a interrogation step 209-23 that the data required for a postage calculation are presently modified, a branch ensues to a sub-step 209-24 for calculating the postage value according to the fee schedule of the selected carrier for the selected service performances and other relevant inputs. Subsequently, a branch is made back via the substep 209-20 to the point t. The postage value modified on the basis of the postage calculation is again determined in the sub-step 209-5 and a branch is then made to the sub-step 209-6 for the purpose of generating an encoded check sum (MAC) over the modified postage value. This postage value secured in this way is now storable manipulation-proof together with the MAC and can be employed for accounting within the framework of the franking mode 400 that sequences chronologically later (7*b*). In such versions according to FIGS. 4*a* through 4*d* with external postage calculation, the interrogation sub-step 203-23 is eliminated, as is the associated sub-step 209-24 for the internal postage calculation.

User-specific or department-specific accounting requires cost center information in order to properly assign these accounting data. The cost center information scanned from the piece of mail or communicated from the personal computer in the aforementioned way can be utilized for a cost-center-dependent, automatic allocation of the accounting data, as well as for a cost-center-dependent, automatic setting of an advertising slogan in the franking format, shown in FIG. 5*b.* The user-relevant settings of the cost center and the advertising slogan via the keyboard 2 of the postage meter machine that are otherwise respectively required are thus advantageously eliminated. A prerequisite for this is the capability for non-volatile storage of a number of advertising slogans in the postage meter machine. A fixed number of advertising slogans, for example, can have been already non-volatilely stored by the factory of the manufacturer in an internal user memory 10 (EEPROM). This is a non-volatile memory for storing a number of advertising slogans, with each advertising slogan being respectively allocated to a cost center of the department. Alternatively, a number of advertising slogans can be subsequently loaded. The chip card write/read unit 20 enables a more frequent slogan change, by card, for a number of inputs. A further possibility is, for example, a password-protected function for deleting predecessor data for parts of the print format, or the allocation thereof to the cost center. The postage meter machine is therefore equipped with a corresponding program as well as with input and display means. A corresponding executive sequence for loading data or for updating is stored in further circuit or an area in the program memory 11 and in the non-volatile memory areas of the clock/date module 8 and/or in the memories 5*a* and 5*b* in order to load successor data into these memory areas previously occupied by deleted predecessor data, as well as in order to redefine their allocation to the cost center, as shall be described in greater detail below in conjunction with FIG. 5*b*.

In FIG. 5*b,* an interrogation criterion about a change of cost center number is inventively satisfied in the sub-step 209-25 when a corresponding scanning of the mail within the framework of the input routine has ensued in order (first step 201 in FIGS. 3, 4*b,* 4*d*) to enter cost center information for calculating purposes automatically into the postage meter machine. As a result of the interrogation in the sub-step 209-25, a sub-step 209-26 is reached when the cost center was modified. The availability of the cost center number is checked here. It is possible that a cost center number was deleted. Then a corresponding error message ensues in a sub-step 209-27 and a branch is subsequently made back via the sub-step 209-20 to the point t. Otherwise, a branch is made from the 26th sub-step 209-26 to a sub-step 209-28 when the availability of the cost center number is established. An advertising slogan allocated to the cost center number is automatically set in the sub-step 209-28. Cost-center specific operation 209-29 then is conducted.

An interrogation about a requested change of the allocation between cliche' and cost center number ensues in a sub-step 209-30. If such a change has occurred, a branch is made to a sub-step 209-31 for displaying the currently input cost center number and, after the confirmation thereof, a branch is made to an interrogation step 209-32. If no confirmation previously ensued, then a branch is automatically made back via the sub-step 209-20 to the point t after a time lapse. There is then the possibility in the sub-step 209-7 of selecting a different imprint with the input of an imprint number before the aforementioned interrogation steps are run again up to the interrogation in the sub-step 209-30. Given confirmation with, for example, a specific acknowledgment key of the cost center number, a branch is made from the interrogation step 209-32 to the sub-step 209-33. The previously allocated cliche' number is displayed in the substep 209-33, which identifies the semi-variable window data for an advertising slogan to be embedded into carrier-dependent frame data. After confirmation, a sub-step 209-35 is reached if, in an interrogation step 209-34, it was not found that a change was not acknowledged, this in turn then again automatically leading to the branch back to the point t via the sub-step 209-20 after a time lapse. This makes it possible to again select another imprint in the sub-step 209-7 (FIG. 5*a*). After executing the sub-steps 209-8 and 209-16, 209-20 209-1 through 209-23 that leads to the point h or h' in FIG. 5*b,* and after the sub-step 209-25 with the interrogation criterion about a change in cost center number—which of course, is not met—the sub-step 209-30 is again reached for asking about a desired change of the allocation between imprint and cost center number. After executing the sub-steps 209-31, 209-32, 209-33 and 209-34, a sub-step 209-35 comprising a password input routine is reached when the imprint setting in the 33$^{rd}$ sub-step 209-33 was confirmed after the display of the imprint number.

If an incorrect password was entered in the aforementioned sub-step 209-35, this is determined in the interrogation step 209-36 and, after an error message, a branch is made back to the point t in an interrogation step 209-38. If, however, it is found in the interrogation step 209-36 that the password input was correct, then a substep 209-37 is reached in order to then store the new allocation and to then branch to the imprint number display in the sub-step 209-33 or to the imprint number display in a separate sub-step (not shown) in order to then branch back via the sub-step 209-20 for resetting the loop counter to the point t. The new allocation to the cost center number has thus been entered into the postage meter machine and now continues to be available.

A number of other interrogation steps that must be executed before the point u is reached are arranged between the interrogation sub-steps 209-25 and 209-30 shown in FIG. 5*b;* for reasons of space, however, these have been shown as only sub-step 209-29 in FIG. 5*b.* A program and memory regions for executing cost-center-related operations is provided in an area of the special cost center memory 9. Thus, in addition to a basic cost center with the number zero allocated to the respective carrier, additional cost centers can also be setup or deleted under numbers other than zero. Values and piece numbers of individual cost centers other than that with the number zero can be edited or deleted without the security against manipulation being thereby affected. The carrier-related basic cost center with the number zero contains a sum of values of cost centers.

Figure 5C:
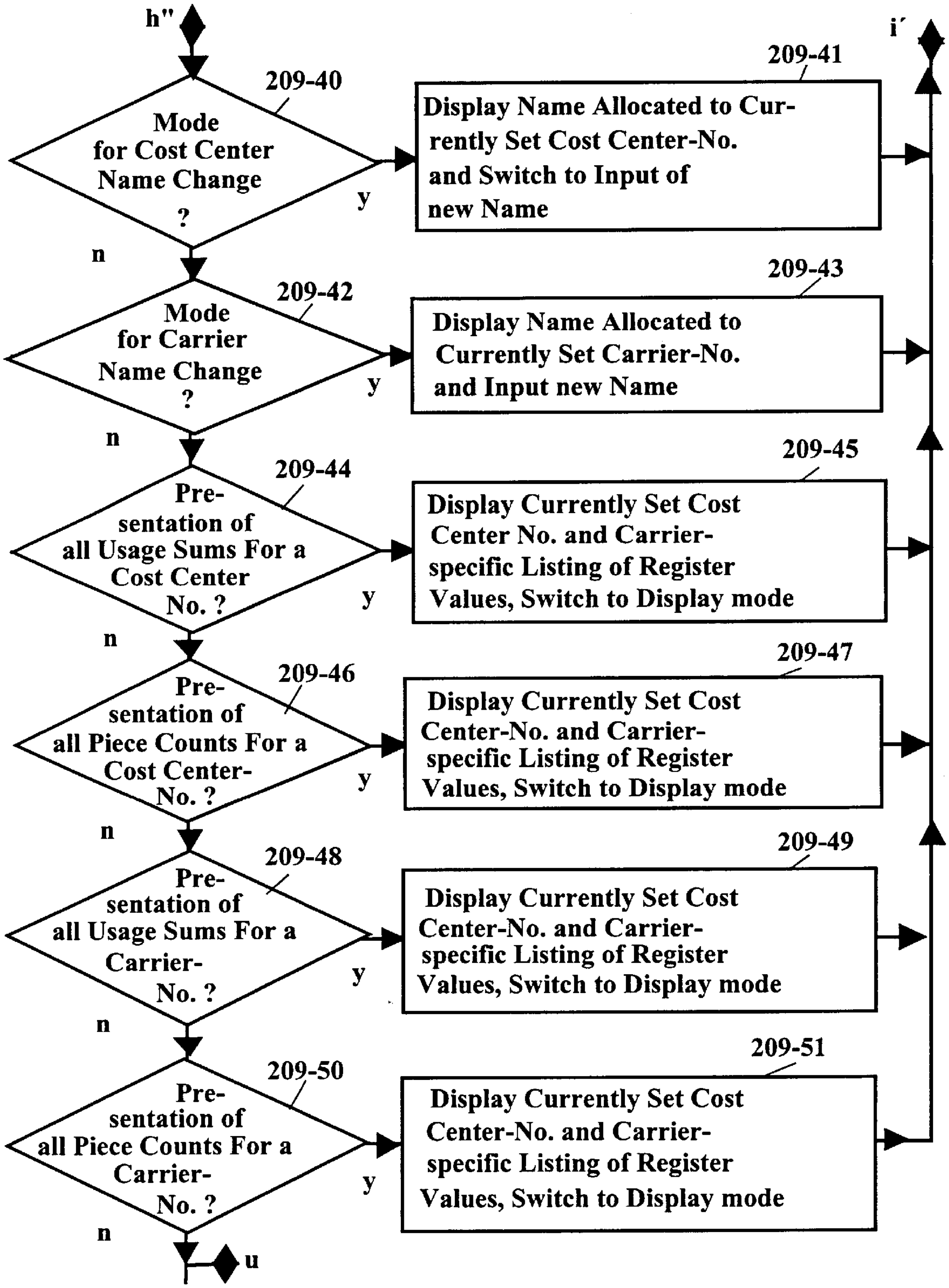

A number of further interrogation steps that must be executed but that were shown as sub-steps 209-40 through 209-51 in FIG. 5*c* for space reasons is arranged between the point h" of the interrogation step 209-30 shown in FIG. 5*b* and point u.

For simpler input, an allocation of numbers to the names of cost centers, or carriers ensues, as shown in FIG. 7*c.* Inventively, the name of the cost center which is standard among the departments of the office 21 can be modified if this should become necessary. When a corresponding input ensues, then this is recognized in the interrogation sub-step 209-40 and, after display of the allocated, currently set number, a switch is made to the input routine of the new name (sub-step 209-41). The carrier names which are standard among the carriers can also be modified if this should become necessary. When a corresponding input ensues, then this is recognized in the interrogation step 209-42 and, after display of the allocated, currently set number, a switch is made to the input routine of the new name (sub-step 209-43). The advantage is particularly useful given a large number of cost center names and/or carrier names.

Inputs in conjunction with operations related to cost centers can be interrogated in the aforementioned sub-step 209-29 in a way that is not shown in FIG. 5*b.* After selection of registers, a display of the stored values or item numbers ensues in the display mode 215 (FIGS. 2, 3, 4*b,* 4*d*).

Further, the display of all used sums for an individual cost center can be useful in order to allow an overview given a plurality of private carriers. A production of the listing ensues for preparation of the display in the display mode 215. The listing ensues on the basis of a corresponding input. The storage thereof in the pixel memory 7*c* ensues for an internal printout of the postage meter machine. The printout likewise ensues on the basis of a corresponding, other input that, however, need not be explained in detail here.

A presentation or display of all carrier-related used sums for the cost center number that has been set is preceded by a corresponding input. When a corresponding input ensues, then this is recognized in the interrogation sub-step 209-44, and, after display of the allocated, currently set cost center number, a switch is then made to the listing routine for the selected register (sub-step 209-45).

A presentation or display of all carrier-related piece numbers for the cost center umber that has been set is again preceded by a different, corresponding input. When a corresponding input ensues, then this is recognized in the interrogation sub-step 209-46, and after display of the allocated, currently set cost center number, a switch is then made to the listing routine for the selected register (sub-step 209-47).

A presentation or display of all carrier-related used sums is likewise enabled for all available cost center numbers when an interrogation sub-step 209-48 and a sub-step 209-49 are executed or, a presentation or display of all carrier-related piece numbers is enabled when an interrogation step 209-50 and a sub-step 209-51 are executed.

When an interrogation criterion is satisfied, a branch is made back via the aforementioned sub-step 209-20 to the point t at the input of the second step 209. In the sub-step 209-2, a display with an input possibility in the first sub-step 209-1 subsequently ensues, whereby a user specific input set can be advantageously utilized in order to enable a number of different inputs. A suitable user specific input set is disclosed in the aforementioned European application 94 120 314.3.

Figure 6:
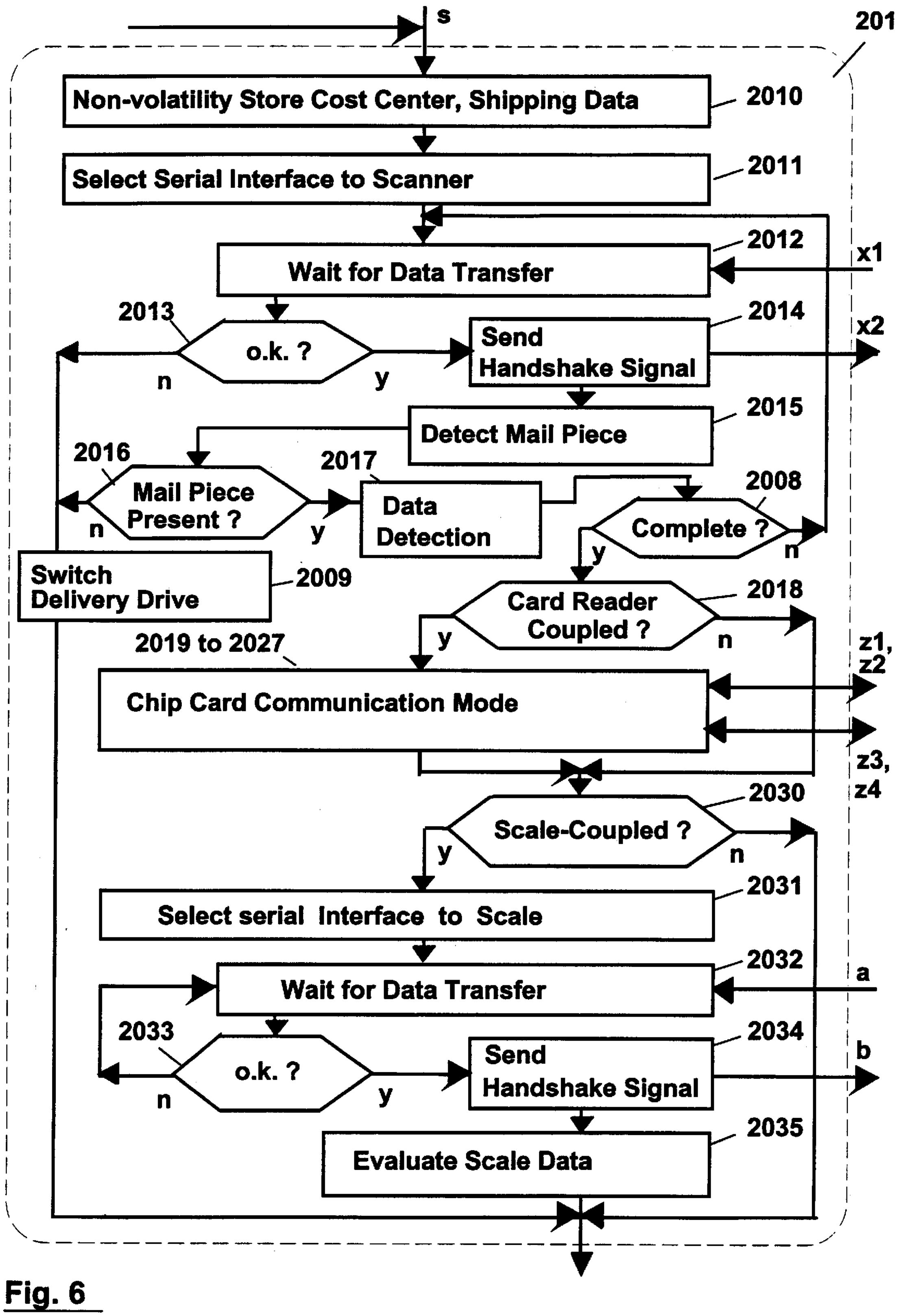
FIG. 6 is a flowchart for an automatic data entry in accordance with the invention on the basis of the scanned cost center and/or carrier information.

FIG. 6 shows a sub-flowchart for an automatic data entry on the basis of the scanned cost center and/or carrier information. The first step 201 of the postage meter machine system routine 200 can be subdivided into a number of a communication modes. A chip card communication mode (sub-steps 2019 through 2027) that is not shown in detail in FIG. 6 can also be included, whereby the chip card, for example, is employed as a key card. According to a first and second version at least the sub-steps 2010 through 2017 for a scanner communication mode and the sub-steps 2031 through 2035 for a scale communication mode are executed in the first step 201.

First, a routine ensues in the sub-step 2010 that non-volatilely stores the cost center and/or shipping data, including carrier data, as prior data so that these data are available as comparison data when a decision is to be made whether a modification of individual data has ensued on the basis of an automatic data input. A deletion of the old, aforementioned data in the main memory of the postage meter machine takes place in connection therewith. In the following sub-step 2011, a serial interface is selected in order to then receive data ×1 from one of the scanners (postal matter sensor 16) in the following sub-step 2012 before a branch is made to an interrogation sub-step 2013. In the interrogation step 2013, a branch is made to a sub-step 2014 when a data transmission has ensued in order to send a handshake signal to the aforementioned register unit 19 to which the aforementioned sensor together with other sensors is connected. From the interrogation step 2013, a branch is made via the sub-step 2009 to the sub-step 2040 when no sensor data were received. After sending the handshake signal to the aforementioned sensor, a detection of a piece of mail ensues in sub-step 2015. When the sensor 16 functions according to a mechanical working principle, the appertaining bit merely has to be stored in the simplest case. If the sensor 16 works according to an optical principle, this can ensue on the basis of a relatively simple image evaluation. When a recognition of a piece mail which is present in the delivery path has ensued, a branch is potentially made from the interrogation step 2016 to a sub-step 2017 for evaluating the other scanned data (except in the version according to FIGS. 4*c* or 4*d* wherein the sub-step 2017 is omitted). It can be required given a marking in the form of a bar code, to move the piece of mail further forward before an evaluation succeeds. Particularly given a version with a complete or partial image evaluation (bar code) in the postage meter machine, the completeness of the scanned data must be assured before an evaluation. If the data required for the detection, i.e., for finding and evaluating, are incomplete—this being determined in interrogation sub-step 2008-, a branch is made back to sub-step 2012 as a reaction thereto in order to wait for a further data transmission from the sensors via register unit 19 and data line 18. Otherwise, a branch is made directly to the next interrogation sub-step 2018.

In the first embodiment according to FIGS. 2 and 3, the detection of the other scanned data ensuing in sub-step 2017 includes the detection of the cost center and carrier information.

In the second embodiment according to FIGS. 4*a* and 4*b*, the detection of the other scanned data ensuing in sub-step 2017 only includes the detection of the cost center information.

If a recognition has not ensued, i.e., given the lack of a piece of mail in the delivery path, a branch is made from the interrogation sub-step 2016 to the sub-step 2040 for the purpose of calling stored, current data. Neither a chip card communication mode nor a scale communication mode is then executed. Further, a sub-step 2009 is executed in order to switch the delivery drive (not shown) off, i.e., to control motors in the delivery means (not shown) such that these motors are shut off as warranted when a piece of mail to be transported is not found in the delivery path given another run of the system routine 200. Only the input/display routine with print data input is then active and this enables a manual input or presetting of the postage meter machine. At the beginning of the first step 201 of the system routine 200, a number of sub-steps 2001 through 2007 (not shown separately) is again provided so that the operation of the peripheral devices in the mail center and parts of the appertaining conveyor means in the base can sequence controlled by the postage meter machine.

In all of the aforementioned versions, sub-steps 2031 through 2035 are executed for a scale communication mode when a scale coupling is found in the leading interrogation step 2030. A serial interface is selected in sub-step 2031 in order to then wait for a data transmission a from the scale 22 in the following sub-step 2032 before a branch is made to an interrogation step 2033. When a data transmission has ensued, a branch is made in the interrogation step 2033 to a sub-step 2034 in order to send a handshake signal to the aforementioned scale 22. Without the handshake signal, the scale 22 automatically repeats the data transmission. A branch is made from the interrogation step 2033 to the sub-step 2032 to wait for the renewed data transmission. After the transmission of the handshake signal to the scale 22, an evaluation of the scale data ensues in sub-step 2035.

If, however, the flowchart shown in FIG. 6 is to be utilized for an automatic data input in step 201 according to one of the aforementioned versions of a mail processing system that operates without chip cards, suitable commands must be utilized in order to insure that the chip card communication mode is not run. This can ensue in an initialization of the postage meter machine at the dealership. When, for example, no flag for a chip card reader coupling is set in an initialization of the postage meter machine, the sub-steps 2019 through 2027 for the chip card communication mode are not run after interrogation of the flag in step 2018. Instead, a branch is immediately made from the scanner communication mode to the scale communication mode.

Figure 7A:
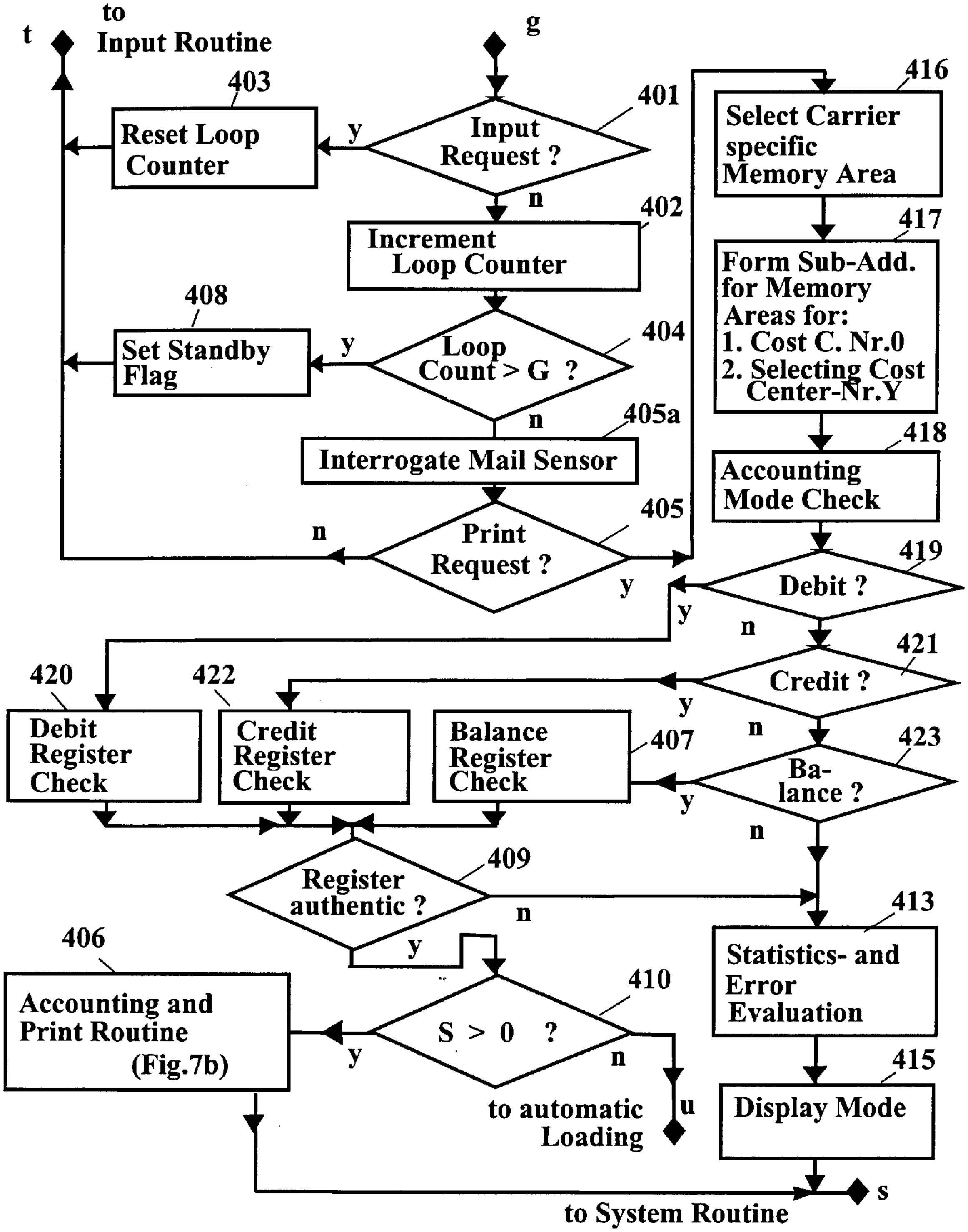
FIG. 7*a* is a flowchart for the franking mode with a carrier and cost-center-related processing of accounting data in a postage meter machine constructed and operating in accordance with the principles of the present invention.

FIG. 7*a* shows a flowchart for the franking mode given carrier-related and cost-center-related processing of accounting data. When no determination of a keyboard actuation or some other input request ensues in sub-step 401, a loop counter is incremented in sub-step 402 and an interrogation step 404 is reached. When a predetermined limit number G is reached by the loop counter, then a standby flag is set.

The standby mode is reached when no input or print request ensues over a predetermined time. The latter is the case when a known letter sensor (not shown in detail) does not detect a next envelope to be franked. The step 404 (shown in FIG. 7*a*) in the franking mode 400 therefore also includes a further interrogation for a time lapse that, when the time (based on a loop count) is exceeded, ultimately leads back to the point t, and thus to the input routine according to the step 209. When the interrogation criterion is satisfied, a standby flag is set as in step 408 and a branch is made back to the point t without running the accounting and printing routine in step 406. The standby flag is interrogated later in the step 211 (see, for example, FIG. 4*d*) and, after the check sum inspection in step 213, is reset if no manipulation attempt was recognized. The interrogation criterion in step 211 therefore is expanded by the question as to whether the standby flag is set, i.e., whether the standby mode has been reached. In this case, a branch is likewise made to step 213. The advantage of this procedure is that every attempt at manipulation is statistically acquired in step 213 before a branch is made back to the system routine at point s.

It is thus assured that the last input quantities are also preserved when the postage meter machine is shut off, so that, after it is again turned on, the postage value in the value stamp is automatically prescribed according to the last input before the postage meter machine was shut off and the date is automatically prescribed in the postmark according to the current date.

When a scale 22 that calculates the postage value is connected, the postage value is taken, for example, from a memory area of the EEPROM 5*b*. A check is made in step 401 to determine whether an input is present. Given a renewed input request in step 401, a branch is made back to step 209.

Otherwise, a branch is made via the steps 402 and 404 for incrementing a loop counter and for checking the number of runs through steps 405*a* and 405 in order to interrogate the print output request that is recognized by a standard mail sensor 16.1 upon introduction of a sheet of paper into the printing region upon a printer request. This mail sensor 16.1, for example, is connected to the register unit 19, just like the sensor 16, but is mechanically arranged in the proximity of the printing area and is also interrogated later in the sequence of method steps than the sensor 16. The letter to be franked is detected with the aforementioned mail sensor 16.1 and a print request is triggered after a time lapse. A branch can thus be made to the accounting and printing routine in step 406. When no print output request (step 405) is present, a branch is made back via the steps that lie at the start of the system routine, i.e., the between the point s and the point t, to the step 201 lying after the point t.

A communication request can be made or some other input according to the steps for data modification 209, test request 212, register check 214 as well as input request 401 at any time before the step 301 is reached. As shown in the version of FIG. 7*a,* steps 401 through 404 are again run. Given a predetermined number of runs, a branch is made from the step 404 to the step 408. The alternative interrogation criterion can be interrogated in the step 405 in order to set a standby flag in the step 408 if a print output request is not yet present after a predetermined time. As already explained above, the standby flag can be interrogated in the step 211 following the communication mode 300. A branch is thus not made to the franking mode 400 before the check sum review has yielded the completeness of all or of at least selected programs.

When a print output request is recognized in the step 405, further interrogations are actuated in the following steps 401 through 420 as well as in step 406. For example, the presence of authentic register values is interrogated in step 409, and reaching a further piece number S criterion is interrogated in step 410, and the registered data involved in a known way for accounting are interrogated in the step 406. As already explained with reference to FIG. 5*a,* moreover, a securing of selected registers in the NVRAM of the postage meter machine is implemented by MAC formation. When the number of items predetermined for franking was used in the preceding franking, i.e., the number of pieces S is equal to 0, a branch is automatically made from step 410 to the point u in order to enter into the communication mode 300 so that a new, predetermined piece number S can be credited from the data center. When, however, the predetermined number of pieces was not yet used, a branch is made from the step 410 to the accounting and printing routine in step 406. A special sleeping mode counter is initiated to count one counting step more in step 406, i.e., during the accounting routine ensuing immediately before printing. The number of printed letters and current values in the postal registers are likewise registered in non-volatile memories 5*a* and 5*b* of the postage meter machine according to entered cost center in the accounting routine 406, and are available for a later interpretation.

The register values can be interrogated as needed in the display mode 215. It is likewise provided that the register values or other service data can be printed out with the printer head 1 of the postage meter machine for accounting or monitoring purposes. This, for example, can likewise ensue like the normal printing of the postage stamp, with, however, a different frame for fixed image data being selected at the start. The variable data according to the register values stored in the non-volatile memories 5*a* or 5*b* in the cost center memory 9 being inserted into this frame, similar to that already disclosed in German OS 42 24 955 for the formation and presentation in three multi-line information groups, or for a required switching into a corresponding mode. If a rotated presentation is requested, the data, contrary to the specific teaching in German OS 42 24 955, can already be directly deposited turned in the volatile memory, as required for the printing. The time-consuming routine of rotating the print data is only implemented once by the manufacturer for an additional picture element data file when the slogan/advertisement memory 10 is programmed, this merely requiring more memory space but no enhanced calculating performance in the postage meter machine.

The carrier and cost center information are employed for accounting in the franking mode 400 shown in FIG. 7*a.*

When a print output request is recognized in step 405, the carrier-specific memory area is selected (step 416), and step 417 is then reached in order to form sub-addresses for the memory areas of, first, a cost center number 0 and, second, the selected cost center number that was set different from 0 (such as cost center No. Y) for the department-related accounting. An accounting without being split into individual cost centers or departments ensues under the cost center number 0 for the sum of all cost centers for the respectively selected, individual carrier m (with m=1 through l).

The step 417 for forming sub-addresses is required for selecting the memory areas during the accounting. An MAC protection is placed over all postal registers to be updated in each accounting, this being required in order to decide in the interrogation step 409 run later whether the register values are authentic. Since such a check is extremely time-consuming, particularly when the DES algorithm is employed for encoding the check sum, the only purpose for which this check is always implemented is for the accounting of the postal registers to be updated. This check therefore ensues in the aforementioned interrogation step 409 parallel to proceeding steps, the step 420 for a debit register check, the step 422 for a credit register check or the step 407 for a balance register check. Such a balance register check is disclosed in German application No. 195 34 530.4, corresponding to the aforementioned co-pending U.S. application Ser. No. 08/525,923. A further step (not shown) for checking the value card register can likewise possibly be included among the aforementioned, parallel preceding steps.

The debiting on a special chip card (similar to a telephone card or credit card) brought into contact with the postage meter machine FM and edited by a number of carriers takes place in another accounting version. Here, a prepaid amount is maintained as an electronic balance in the balance account of the chip card and is reduced by the postage value to be franked in the case of an intended franking. At the same time, a transfer of the debited postage value ensues into the accounting unit of the postage meter machine. The debiting with such a value card, which functions as an electronic purse, can ensue until the electronic purse is empty. The refilling of the value card ensues in special bank terminals in a remote credit institute up to a predetermined amount. When the refilled value card is brought into contact with the write/read unit of the postage meter machine, a communication with a special program module of the postage meter machine ensues. Both program module and value card generate crypto codes that are exchanged. The crypto codes are communicated from the postage meter machine to a data center of the postage meter machine manufacturer by modem. At the end of the day, preferably during the night, both of the aforementioned crypto codes and the data sets for every individual entry are communicated for checking to an inspection group of the remote credit institute.

The accounting mode is checked in a step 418 in order to form sub-addresses following the aforementioned step 417. If an accounting on the basis of a debit balance is present, then a branch is made from interrogation step 419 to a step 420 for debit register checking, when an accounting on the basis of a credit balance is present, then a branch is made from the interrogation step 421 to a step 422 for credit register checking. When, however, a standard crediting on the basis of a prepaid balance is present, then a branch is made from the interrogation step 423 to the step 407 for balance register checking. When, alternatively, an accounting on the basis of a prepaid balance in a value card is present, then a branch is correspondingly made from an interrogation step 425 to a corresponding step 426 for balance register checking in a value card. A check preferably ensues on the basis of the co-stored MAC. Interrogation step 409 is then reached and a branch is made if necessary to error interpretation step 413. A manipulation with fraudulent intent can only be precluded given authentic register data. Via step 410, the step 406 with the accounting and printing routine is then reached.

Figure 7B:
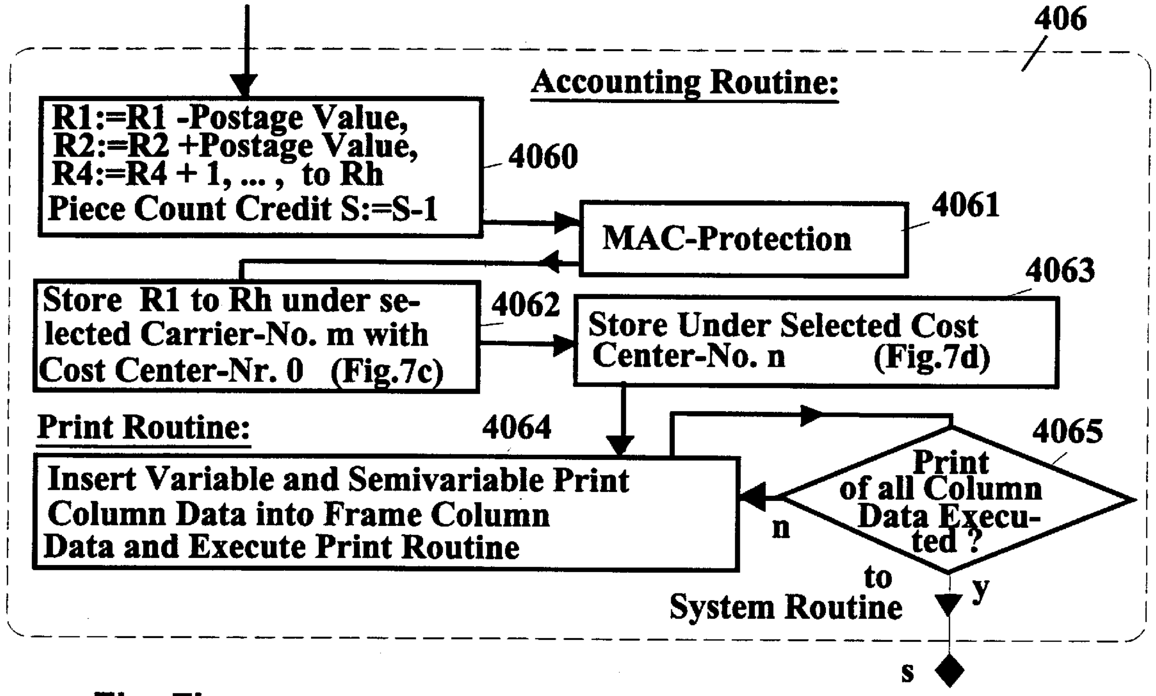
FIG. 7*b* is a flowchart for the accounting and printing routine in franking mode with carrier and cost-center-related accounting in a postage meter machine constructed and operating in accordance with the principles of the present invention.

The sub-flowchart for the accounting and printing routine in franking mode with carrier-related and cost-center-related accounting is shown in greater detail in FIG. 7*b*. A MAC protected postage value can be checked on the basis of the appertaining MAC in franking mode 400 at the beginning of the accounting routine (FIG. 7*a*). A check sum formation over the postage value and the encoding thereof then ensues. When the result is identical to the MAC value, one can assume the validity of the postage value and the actual accounting procedure can then be started. With an accounting unit that cannot be manipulated, a register R2 is incremented by the postage value in sub-step 4060 and another register R1 is reduced by the postage value. A comparable accounting ensues with the piece number data. An attachment of the MAC protection in sub-step 4061 also ensues after the accounting. In sub-step 4062 a storing then ensues under the selected carrier number and the cost center number 0. The storing under the department-related, selected cost center number n (with n=1 through k) additionally ensues in the cost center memory 9 in sub-step 4063. Only then is the printing routine with the sub-steps 4064 and 4065 reached.

FIG. 7*c* shows the result of the carrier-related accounting in the postal registers implemented in the manipulation-proof accounting module. In FIG. 7*c* (and in FIG. 7*d* as well) the designation "KST" stands for "cost-center." A listing of postal register values R1 (with i=1 through h) for each carrier m (with m=1 through l) which is present in the memory area. When, for example, the postage meter machine operator has selected an accounting version with value card, an amount is first transferred from the value card into one of the registers R80 and the piece number for the bookings is counted in one of the registers R81 proceeding from 0. Independently of the selected cost center number, a booking in the registers R80 and R81 is undertaken in a carrier-related manner in addition to the value card registers, whereby the amount from the value card is correspondingly reduced. When, however, the standard accounting from the balance loaded via the data center DC, for example by modem, is selected, then, independently of a selected cost center number, an accounting first ensues in the registers R1 through R8, correspondingly accumulated and related to a selected carrier. A group (not shown) from the number of registers is allocated to the registration of cost-incurring transactions that have ensued, including the balance recreditings. They can be interrogated periodically or at arbitrary points in time and supply an overview about the financial operations that have been carried out with respect to individual carriers. The sum from these registers over all carriers can likewise be interrogated periodically or at arbitrary points in time and supplies and overview of the current financial situation in toto. Further, it is provided as needed that a listing already total of and/or individual financial recrediting data is printed out within a time span and other register or service data are printed out by the print head of the postage meter machine as a document.

The carriers have a name to which a number is allocated in order to call or set this more easily by pressing a key. The carriers also are identifiable by the carrier identification number (CIN) that is a multi-placed number for exact, automatic identification of the carriers, particularly during a communication with a data center of the postage meter machine manufacturer. This CIN makes it possible to load a set of carrier data into the postage meter machine. Further, a number for each cost center is likewise provided in order to call or set this independently of its name by pressing a key.

FIG. 7*d* shows a two-dimensional cost center/carrier matrix for the used sum amount (postage consumption p) respectively allocated to the cost centers in the ascending register R2 and for the used piece number z respectively allocated to the cost centers in the piece count register R4. A resetting to 0 both for the postage use p as well as for the piece count z ensues periodically or at freely selectable time spans after an accounting and output of a listing for a cost center. The output of such a listing can, for example, ensue as a cost center printout or as a carrier-related printout on a tape by the postage meter machine.

Figure 8:
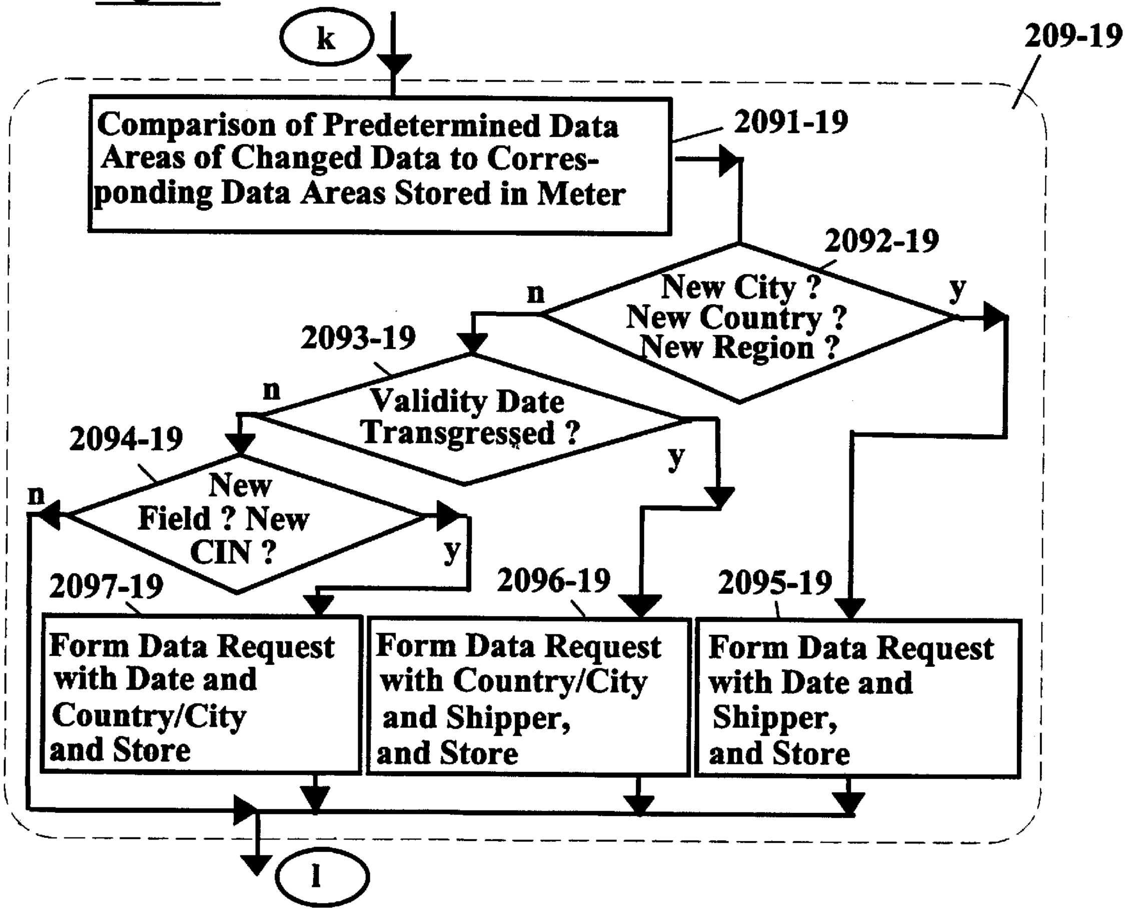
FIG. 8 is a flowchart for forming request data for a data transmission from a data center in accordance with the invention.

The routine 209-19 (shown in FIG. 5*a*) for checking stored data and for forming request data for a data transmission of fee schedule tables and auxiliary data from the data center DC to the postage meter machine is explained in greater detail with reference to FIG. 8. A comparison of predetermined data areas for checking data on the basis of predetermined, corresponding comparison data stored non-volatilely ensues in sub-step 1262 of FIG. 8 in order to be able to identify modifications that have occurred, or have been entered. Specific interrogations ensue in the following sub-steps 2092-19, 2093-19 and 2094-19 in order to form specific request data in the appertaining sub-steps 2093-13 through 2097-13. If the location was changed, whereby the country, the region and/or locality were newly entered, a branch is made from sub-step 2092-13 to the sub-step 2095-13 in order to form and store request data together with the current date and carrier. Transgression of the validity date that is allocated to every carrier-specific table is checked in sub-step 2093-19 in order to then form request data together with the current location and carrier and to store these items. A new entry of a field name is evaluated in sub-step 2094-19, where with tables and information are specifically identified before a branch is made to sub-step 2097-19 in order to specifically form and store request data. A branch is made directly to point l only when no changes were detected in the interrogations 2092-19 through 2094-19.

Figure 9:
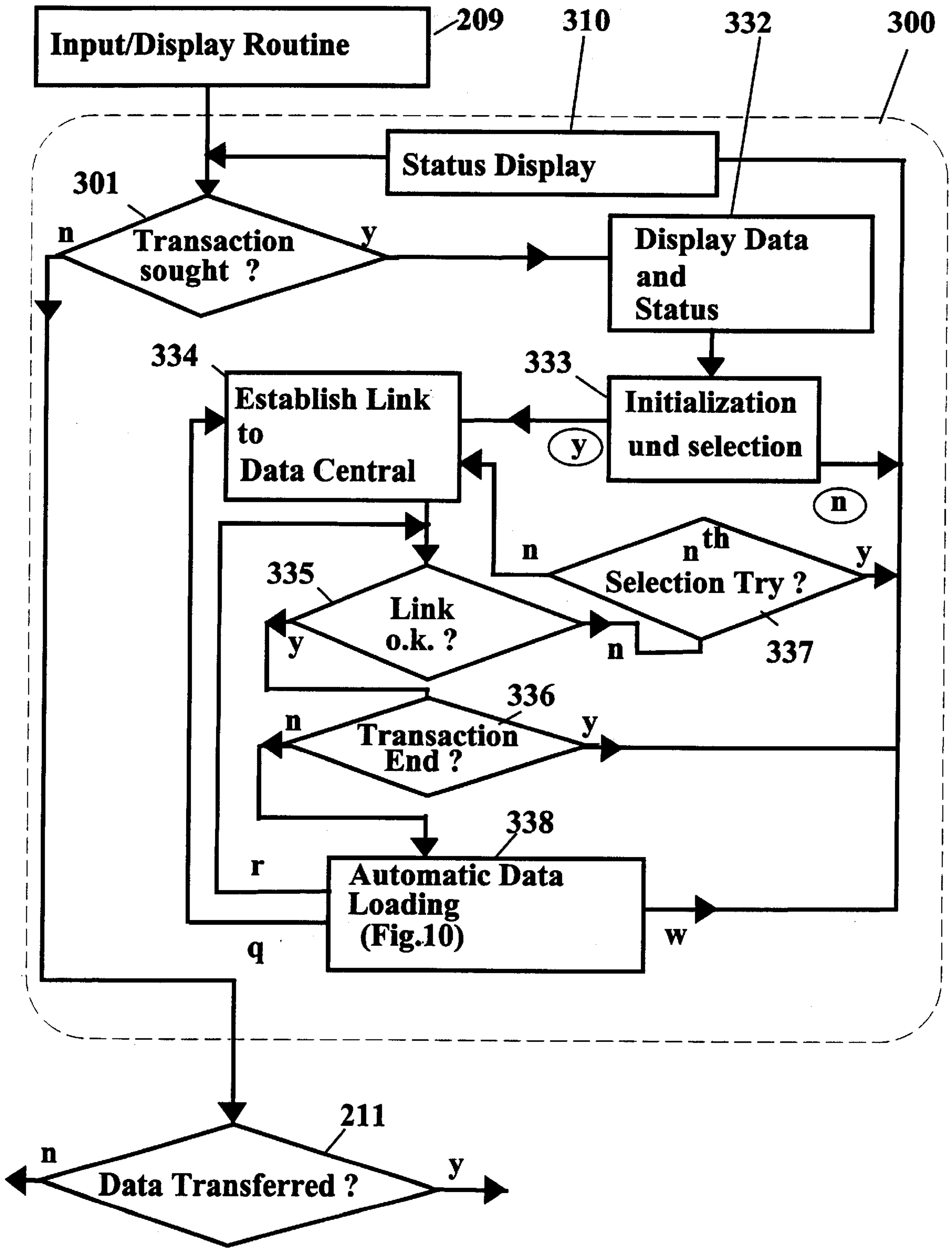
FIG. 9 is a flowchart for the communication mode for a postage meter machine constructed and operating in accordance with the principles of the present invention in order to implement a data transmission.

Such request data can be automatically formed in a constantly run step 209 (FIGS. 3 or 4*b,* 4*d* or, respectively 5) in front of point t and the request data are interpreted in step 301 according to FIGS. 3, 4*b* or 4*d* as communication requests in order to enter into a communication mode. FIG. 9 shows the communication mode for the postage meter machine that is required in order to implement a data transmission that sequences largely automatically by modem. A recognized transaction request in sub-step 301 of step 300 leads to the display of data and of the status in the sub-step 332 in order, after an initialization of the modem and a selection of the data center (telephone number), to subsequently branch in the sub-step 333 to a sub-step 334 for setting up the connection to the data center. When an initialization of the modem and selection in sub-step 333 cannot be successfully implemented, a branch is made back via sub-step 310 for displaying the status to sub-step 301. A branch is likewise made back to sub-step 301 if it is found in a sub-step 335, after the sub-step 334, that the connection step up did not ensue properly and a determination is made in sub-step 337 that the connection subsequently still can not be setup after the $n^{th}$ redialing.

When, however, the call setup ensues properly and it is found in sub-step 336 that one of the transactions has not yet been terminated, an automatic reloading with data ensues in sub-step 338. Corresponding to the modification of the CIN that is stored in the postage meter machine, a reloading now ensues. If the CIN was not modified by the minimum validity duration for the fee schedules stored in the postage meter machine is transgressed or when a different set of mail carriers was defined, the data center is likewise automatically selected and an updating is accomplished.

A determination is made in sub-step 338 as to whether an error status has occurred that can be eliminated by a renewed connection setup to the data center in order to branch back via point q to the sub-step 334. A further determination is made in sub-step 338 as to whether an error status has occurred that cannot be eliminated in order to branch back via point w to the sub-step 310 for the purpose of a status display. If a transaction has been implemented, subsequent transactions then can be implemented, whereby a branch is made back via point r to the sub-step 335. When the connection is still intact, a check is made in sub-step 336 to determine whether all transactions have been implemented, or to determine whether the last transaction was ended in order to then branch back via the sub-step 310 to the sub-step 301. The flag for a transaction request is reset in sub-step 338 at the end of the last transaction. A branch is thus made from sub-step 301 to step 211 in order now to store and interpret the selected data communicated to the postage meter machine. The value of the transmitted CIN can be automatically classified (according to frequency or priority) in a predetermined way in the interpretation. The type of classification can be set. At least one actuation means is provided in order to set the type of classification. The automatic reloading with data in sub-step 338 includes at least one handling routine that is explained in greater detail in conjunction with FIG. 10.

Figure 10:
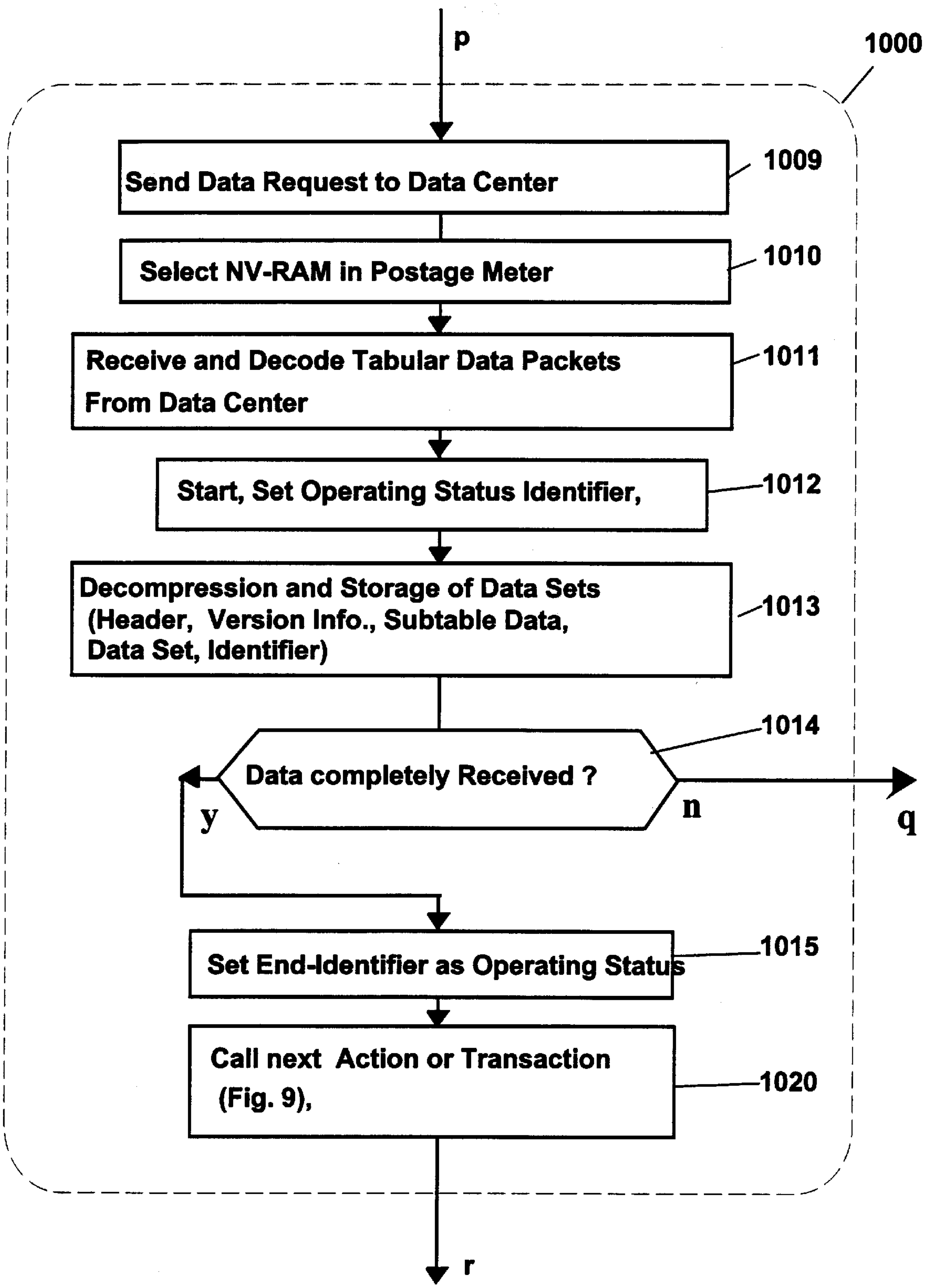
FIG. 10 is a flowchart for a routine for receiving and handling communicated service performance data in a postage meter machine constructed and operating in accordance with the principles of the present invention.

The routine 1000 shown in FIG. 10 for handling communicated table data in the postage meter machine includes a sub-step 1009 for sending request data to the data center. A sub-step 1010 is then implemented in order to select a non-volatile memory area in the postage meter machine in which the requested data can be intermediately stored later. After the sub-step 1010, a branch is made via the sub-step 1011 for receiving and decoding the data packet communicated from the data center to a sub-step 1012 in which a start processing status is set for a data processing. A first processing of the data then ensues in the sub-step 1013. The intermediate storage of the data is advantageous when data are communicated in a number of transactions or when a transaction must be repeated. After departing the communication mode 300, a determination is made in the interrogation step 211—shown in FIGS. 3, 4*b,* and 4*d*—that data were communicated and a branch is then made to the statistics and error evaluation mode 213. Given freedom from error and validity of the communicated data, a non-volatile storage in the postage meter machine ensues in the aforementioned evaluation mode. After intermediate storage and, if necessary, after a following decompression given packed data in the sub-step 1013 and after executing further sub-steps 1014, 1015 and 1020, a storage of the data set that belongs to a complete postage fee set of a mail carrier ensues. Such a data set includes a header, version information, sub-table data and an end data set identifier DEK.

In the sub-step 1014 for checking for complete reception of the communicated data packet, a branch is made to a sub-step 1015 given completeness in order to set an end identifier as the processing status. Such identifiers are required in order, even given a program abort, for example due to an interruption of operating voltage, to continue the program at this point after the voltage returns. In the following sub-step 1020, the next transaction or action is called, and thus a branch is made to the further execution of the executive sequence shown in FIG. 9 in order to non-volatilely store the intermediately stored updating data in a step 213 that follows later.

Given an improper execution, which is determined in sub-step 1014, the point q is reached. By branching to the sub-step 334 according to FIG. 9, a further attempt can be started in order to transmit the required sub-table data. The sub-steps 335 through 336 are thereby run and the point p according to FIG. 10 is reached.

Automatic reloading with data in the sub-step 338 includes specific handling routines that go beyond those explained in greater detail in conjunction with FIG. 10. This method disclosed in the aforementioned German application Serial No. 195 49 305.2 and corresponding U.S. application Ser. No. 08/770,525, supplies a location-specific offering of window data for the postage stamp or of auxiliary functions for the postage meter machine, as well as offering current information for permanent and/or temporary configuration of the postage meter machine on the basis of a communication network that contains a memory with the callable data blocks for reloading auxiliary functions and information into the postage meter machine, as well as updating data.

Figure 11:
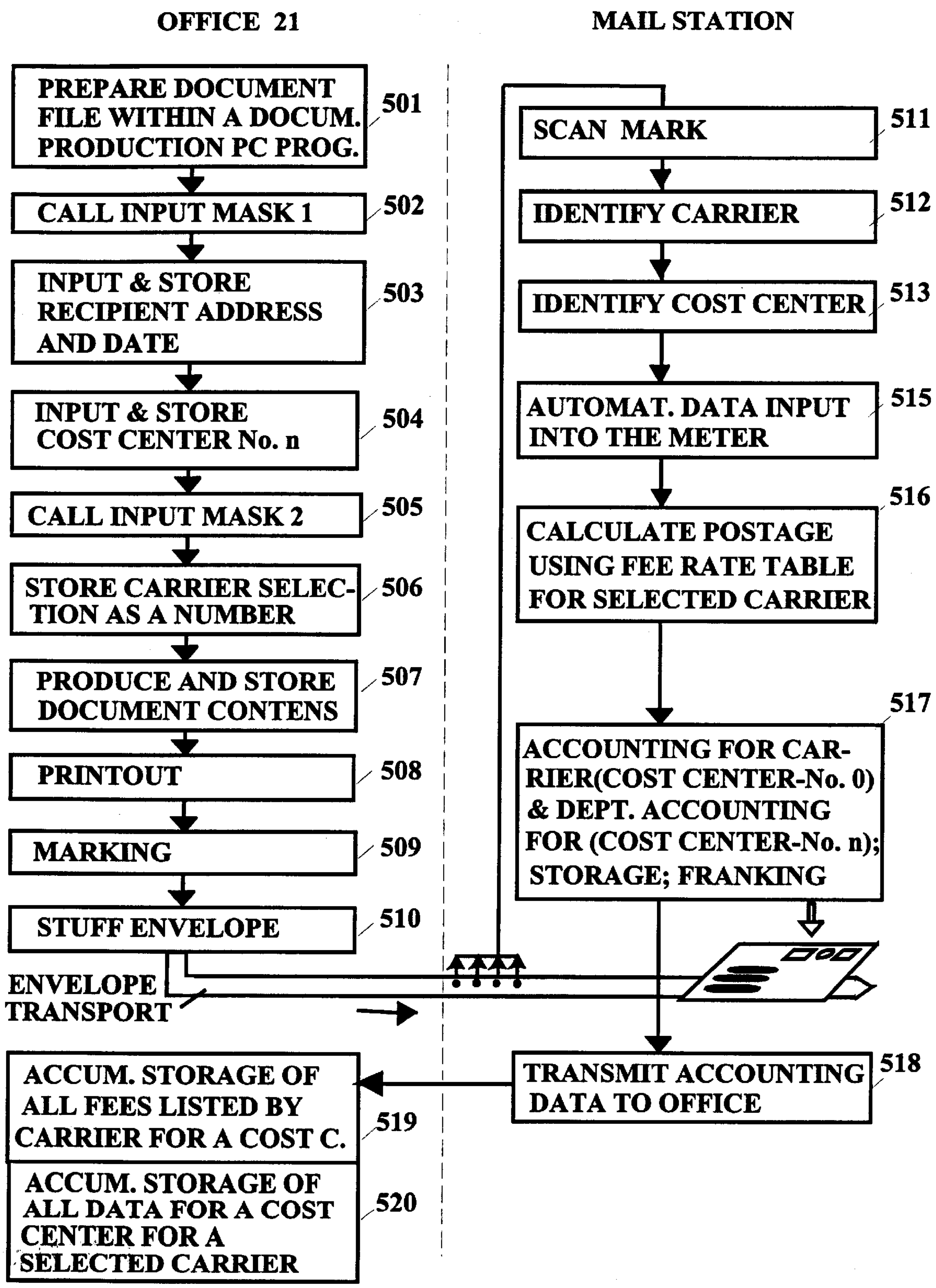
FIG. 11 is a flowchart for a method for operating a mail processing system employing the first embodiment of the inventive postage meter machine.

FIG. 11 shows a method according to a first embodiment of the inventive mail processing system. The method for data processing in a mail shipping system includes a number of steps that are implemented on a personal computer in the office 21 for preparing the printout of a letter together with address field and mark. These steps are as follows:

Step 501: creating a letter file within the framework of a letter production program;

Step 502: call first input mask;

Step 503: input and storing of the recipient address and of the date;

Step 504: input and store cost center number;

Step 505: call second input mask;

Step 50: store carrier selection as number;

Step 50: producing and storing a letter content;

Step 508: printout of the letter and, potentially, of the address of the recipient of the letter on the envelope;

Step 509: marking the letter or cover with a mark;

Step 510: stuffing the letter into an envelope.

In a version of this embodiment a program routine for automatic entry of the cost center number sequences in conjunction with the first input mask in step 504. In another version, step 504 is entirely eliminated. Only the carrier selection is then stored as number and applied on the document, label, letter or envelope.

The addressing ensues either on the letter given printout of the letter in step 508, or in the following step 509. The marking in step 509 includes the calling of programs for the position of the address and/or information corresponding to the postal regulations for the position of the address and/or other information.

Corresponding programs are loaded in the memories of the respective personal computer PCa, PCb or PCc that are located in the office 21. In steps 508 and 509, a printer that is shared or separate printers, are correspondingly operated to print the aforementioned areas.

In another version alternative editing steps are implemented in order to enable the employment of stickers or of pre-printed letter envelopes.

The following steps are executed when scanning the mark in a mail center and when processing the data as well as when franking with a postage meter machine.

Step 511: scanning the mark;

Step 512: identify carrier number;

Step 513: identify cost center number;

Step 515: automatic data input for processing in the postage meter machine, comprising cost center and carrier information as well as a measured weight of the piece of mail;

Step 516: employ postage fee table of the selected carrier for calculating the postage value;

Step 517 first accounting according to a selected carrier m for a plurality of carriers under the cost center number 0 and department-by-department accounting classified according to selected cost center number n.

A step 518 is optionally provided in order to send accounting data to the office 21 in response to a request.

The method for data processing in a mail shipping system further includes the following optional steps that are implemented on a personal computer in the office 21 at the end of a period or as needed after the franking of a letter.

Step 519: accumulative storing of the overall fees and listed according to carriers for a selected cost center, Step 520: accumulative storing of the cost-center-related accounting data for a selected carrier.

Figure 12:
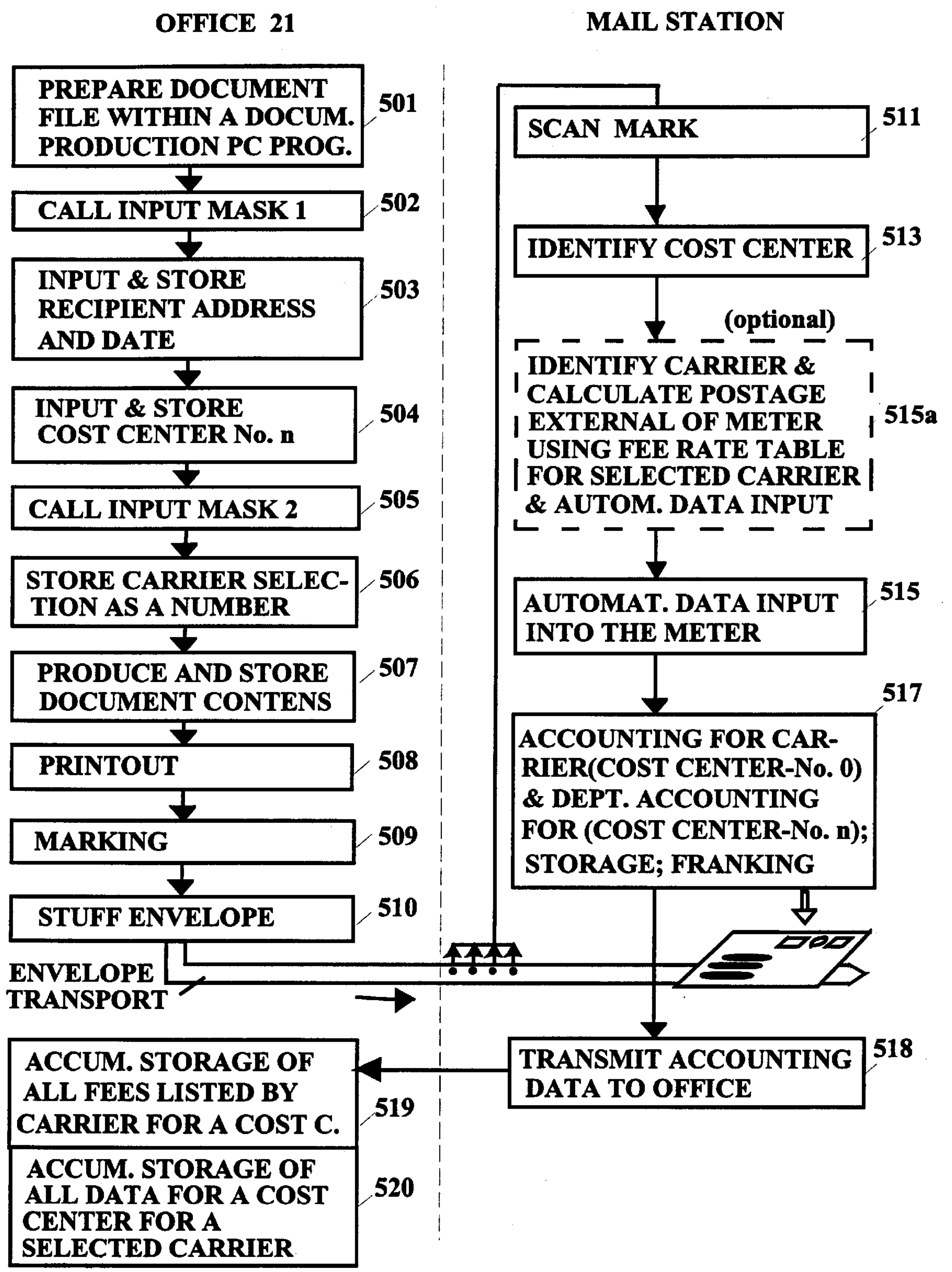
FIG. 12 is a flowchart for a method for operating a mail processing system employing the second embodiment of the inventive postage meter machine.

FIG. 12 shows a method according to the second embodiment of the mail processing system. In this second embodiment with external postage calculation as was described, for example, in the exemplary embodiment of FIGS. 4*a* and 4*b*, the method for data input into a mail shipping system again includes preparatory steps implemented on a personal computer in the office 21 for preparing the printout of a letter together with an address field and mark as well as steps that are sequenced when scanning the mark in a mail center and when processing the data as well as when franking with a postage meter machine. In the latter, however, the step 512 for identification of the carrier number and the step 516 for employment of the postage fee table of the selected conveyor internally in the postage meter machine are eliminated because these are carried out in the external scale 22'. This embodiment includes the following steps.

Step 511: scanning the mark;

Step 513: identify cost center number;

Step 515: automatic data input for processing in the postage meter machine, comprising cost center information and externally determined carrier identification number as well as the externally calculated postage value;

Step 517: first accounting according to a selected carrier m from a plurality of carriers under the cost center number 0 and department-by-department accounting classified according to selected cost center number n.

Figure 13:
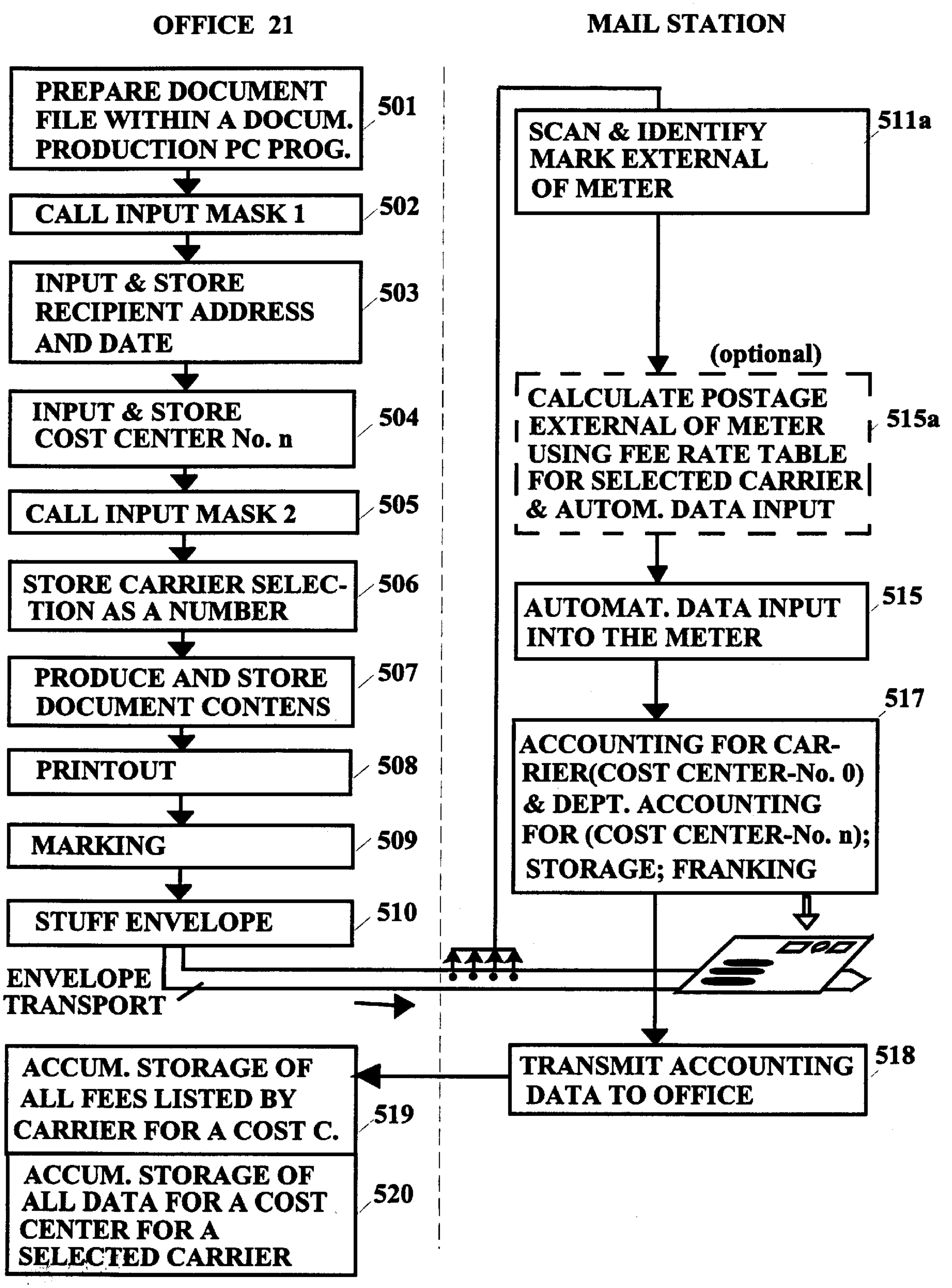
FIG. 13 is a flowchart for a method for operating a mail processing system employing the third embodiment of the inventive postage meter machine.

FIG. 13 shows a method according to the third embodiment of the mail processing system. In this third embodiment with external postage calculation, as was described, for example, in the exemplary embodiment of FIGS. 4*c* and 4*d*, the step 512 for the identification of the carrier number, the step 513 for the identification of the cost center number and the step 516 for the employment of the postage fee table of the selected carrier internally of the postage meter machine are omitted in the latter because these steps are carried out in the external scale 22'. This third embodiment of the method includes the following steps.

Step 511: scanning the mark and identification externally from the postage meter machine;

Step 515: automatic data input for processing in the postage meter machine, comprising the externally determined cost center information, carrier identification number and the externally calculated postage value;

Step 517: first accounting according to a selected carrier m from a plurality of carriers under the cost center number 0 and department-by-department accounting classified according to selected cost center number n.

An optional step 518 is likewise provided in order, in response to a request, to send accounting data to a personal computer in the office 21. In a further step 519 in the personal computer, an accumulative storage of the overall fees and listed according to carriers ensues for a selected cost center and/or, in a further step 520, accumulative storage of the cost-center-related accounting data ensues for a selected carrier.

Although modifications and changes may be suggested by those skilled in the art, it is the intention of the inventor to embody within the patent warranted hereon all changes and modifications as reasonably and properly come within the scope of her contribution to the art.

We claim as our invention:

1. A method for data processing in a mail shipping system having a postage meter device with a transport path leading thereto, comprising the steps of:

printing out a document having an address field and a mark thereon identifying a carrier to be used for shipping of said document;

causing said document to enter into said transport path of said postage meter device and detecting a presence of said document in said transport path;

upon detection of said document in said transport path, scanning said address field and said mark and automatically entering information corresponding to the carrier identified in said address field and mark into said postage meter device;

entering and non-volatilely storing setting data into said postage meter device for generating a plurality of carrier-specific print formats respectively for said plurality of carriers, and automatically calling a stored print format for the carrier identified in said address field and mark of said document;

allocating a predetermined carrier identifier uniquely to each carrier and, for inspection or modification of a print format, entering a carrier identifier into said postage meter device;

conducting an accounting in said postage meter device by modifying an account, accessible by said postage meter device, uniquely related to the carrier identified in said address field and mark by an amount corresponding to a cost of shipping said document using the carrier identified from said mark; and producing a franking imprint on said document after conducting said accounting using said carrier-specific print format for the carrier identified from said mark.

2. A method as claimed in claim 1 comprising the additional steps of:

calling one of said settings for one of said carriers when no document is detected in said transport path, said setting for said one of said carriers comprising old data;

identifying said address and mark on said document by scanning said document in said transport path and overwriting said old data with new data comprising the print format for the carrier identified by said scanning; and displaying the print format with the new data for the carrier allocated to the entered carrier identifier.

3. A method as claimed in claim 1 wherein said mail processing system includes a scanner, a chip card reader and a scale, each of which can communicate with said postage device, and said method comprising the steps of executing a scanner communication routine, a chip card communication routine and a scale communication routine in said postage meter device to determine which of said scanner, said chip card reader and said scale will interface with said postage meter device.

4. A method as claimed in claim 1 wherein the step of printing out a document having said address field and said mark thereon comprises printing said address field and said mark, using a personal computer remote from said postage meter machine, on a label and adhesively attaching said label to said document.

5. A method as claimed in claim 1 wherein the step of printing out a document having said address field and said mark thereon comprises printing said address field and said mark, using a personal computer remote from said postage meter machine, on a letter envelope comprising said document.

6. A method as claimed in claim 1 comprising the additional steps of:

dependent on the carrier identified in said address field and mark, calculating a postage fee for shipping said document using said carrier identified in said address field and said mark; and if necessary, modifying the setting data for said carrier identified in said address field and mark for producing said print format.

7. A method as claimed in claim 1 wherein said mail shipping system is used by a plurality of independent cost centers, and said method comprising the additional steps of:

storing data identifying each cost center in said postage meter device;

identifying a cost center which produced said document;

in said accounting, debiting an account of said cost center, accessible by said postage meter device, which produced said document by said cost of mailing; and allowing for modification of said cost center data in said postage meter device upon a change relating to one of said cost centers.

8. A method as claimed in claim 1 comprising the additional step of checking data in said print format for said carrier identified in said address field and mark with an encoded check sum when said setting data for print format for the carrier identified in said address filed and mark are called in said postage meter device.

9. A method as claimed in claim 1 wherein said mail shipping system is used with a data center remote from said mail shipping system, and said method comprising the additional steps of:

if sufficient data are not available in said postage meter device for generating said print format for said carrier identified in said address field and mark, forming a data request to said remote data center for data needed to complete generation of said print format;

establishing a communication between said postage meter device and said remote data center and transmitting said data request from said postage meter device to said remote data center; and transmitting said data needed to complete said print format from said remote data center to said postage meter device, and generating said print format using said data needed to complete said print format in said postage meter device.

10. A method as claimed in claim 9 wherein said print format includes frame data and pixel data, and wherein the step of generating said print format using said data transmitted from said remote data center to complete said print format comprises modifying at least one of said frame data and said pixel data.

11. A method as claimed in claim 1 wherein said mail shipping system is used by a plurality of independent cost centers, said method comprising the additional steps of:

respectively allocating a cliché number to each cost center;

respectively allocating a cost center number to each cost center;

providing an input unit in communication with said postage meter device by which a cost center number can be entered into said postage meter machine; and entering a cost center number into said postage meter device via said input unit and automatically, in said postage meter device, entering the cliché number associated with the entered cost center number.

12. A method as claimed in claim 11 wherein each cost center has a name associated therewith, and said method comprising the additional step of allowing, via said input unit, for modification of a name of a cost center allocated to a cost center number.

13. A method as claimed in claim 1 wherein each of said carriers has a name associated therewith, and said method comprising the additional steps of:

providing an input unit in communication with said postage meter device; and allowing for modification of a name of a carrier via said input unit.

14. A method as claimed in claim 1 comprising the additional steps of:

respectively allocating a carrier identification number to each carrier;

non-volatilely storing each carrier identification number in said postage meter device;

providing an input unit in communication with said postage meter device via which a selected carrier identification number can be entered;

entering a selected carrier identification number via said input unit into said postage meter device and thereby causing, in said postage meter device, selection of the print format associated with the carrier corresponding to the entered carrier identification number; and allowing for modification of said carrier identification number and the carrier-specific print format corresponding to the carrier to which said carrier identification number is respectively allocated.

15. A method as claimed in claim 1 wherein said mail shipping system is used by a plurality of independent cost centers, and said method comprising the additional steps of:

respectively allocating a cost center number to each cost center;

providing an input unit in communication with said postage meter device via which a selected cost center number can be entered into said postage meter device; and upon entry of a cost center number into said postage meter device via said input unit, displaying at said postage meter device all shipping costs respectively associated with each carrier used by said cost center.

16. A method as claimed in claim 1 wherein said mail shipping system is used by a plurality of independent cost centers, said method comprising the additional step of:

storing a matrix in said postage meter machine identifying, for each cost center, a running total of the shipping costs incurred by the cost center for each carrier, and a running total of a number of documents shipped by the cost center using each carrier.

17. A method as claimed in claim 16 comprising the additional steps of:

printing out said matrix after said accounting for each cost center; and after printing out said matrix, resetting each of the running total of the shipping costs and the running total of the number of shipped documents, for the cost center which the accounting was conducted, to zero.

18. A method as claimed in claim 17 further comprising periodically conducting an accounting for a cost center and printing out said matrix.

19. A method as claimed in claim 17 comprising conducting an accounting for a cost center and printing said matrix at a freely selectable time.

20. A method as claimed in claim 17 comprising the additional steps of:

for each cost center, storing any financial reloading data; and printing out said financial reloading data for a cost center together with the matrix for that cost center.

21. A method as claimed in claim 17 wherein each cost center has a personal computer and a connected computer printer associated therewith, and comprising the additional step of producing, at the personal computer for a cost center, a request for a printout of said matrix for the cost center associated with the personal computer, and wherein the step of printing out said matrix comprises printing out said matrix at the computer printer associated with the personal computer which produced said request.

22. A method as claimed in claim 17 wherein the step of printing out said matrix comprises printing out said matrix at a printhead of said postage meter device.

23. A method for data processing in a mail shipping system having a postage meter device with a transport path leading thereto, comprising the steps of:

printing out a document having an address field and a mark thereon identifying a carrier to be used for shipping of said document;

causing said document to enter into said transport path of said postage meter device and detecting a presence of said document in said transport path;

upon detection of said document in said transport path, scanning said address field and said mark and automatically entering information corresponding to the carrier identified in said address field and mark into said postage meter device;

entering and non-volatilely storing setting data into said postage meter device for generating a plurality of carrier-specific print formats respectively for said plurality of carriers;

allocating a predetermined carrier identifier uniquely to each carrier and, for inspection or modification of a print format, entering a carrier identifier into said postage meter device;

conducting an accounting in said postage meter device by modifying an account, accessible by said postage meter device, uniquely related to the carrier identified in said address field and mark, by an amount corresponding to a cost of shipping said document using the carrier identified from said mark; and producing a franking imprint on said document after conducting said accounting using the carrier-specific print format for the carrier identified from said mark.

24. A method as claimed in claim 23 comprising the additional steps of:

calling one of said settings for one of said cost centers when no document is detected in said transport path, said setting for said one of said cost centers comprising old data;

identifying said address and mark on said document by scanning said document in said transport path and overwriting said old data with new data comprising the print format for the cost center identified by said scanning; and displaying the print format with the new data for the cost center allocated to the entered cost center identifier.

25. A method as claimed in claim 23 wherein said mail shipping system includes a scanner, a chip card reader and a scale, each of which can communicate with said postage meter device, and said method comprising the steps of executing a scanner communication routine, a chip card communication routine and a scale communication routine in said postage meter device to determine which of said scanner, said chip card reader and said scale will interface with said postage meter device.

26. A method as claimed in claim 23 wherein the step of printing out a document having said address field and said mark thereon comprises printing said address field and said mark on a label using a personal computer at the cost center identified in the address field and mark remote from said postage meter device, and adhesively attaching said label to said document.

27. A method as claimed in claim 23 wherein the step of printing a document having said address field and said mark thereon comprises printing said address field and said mark on a letter envelope comprising said document using a personal computer at the cost center identified in the address field and mark remote from said postage meter device.

28. A method as claimed in claim 23 comprising the additional steps of:

also including in said address field and mark an identification of one of a plurality of available carriers for shipping said document;

dependent on the carrier identified in said address field and mark, calculating a postage fee for shipping said document using said carrier identified in said address field and said mark; and if necessary, modifying the setting data for said carrier identified in said address field and mark for producing said print format.

29. A method as claimed in claim 23 comprising the additional step of:

in said accounting, debiting an account of said cost center, accessible by said postage meter device, which produced said document by said cost of shipping said document.

30. A method as claimed in claim 23 comprising the additional step of checking print data in said print data format for the cost center identified in said address field and mark with an encoded check sum when said setting data for the cost center identified in said address field and mark print format data are called in said postage meter device.

31. A method as claimed in claim 23 wherein said mail shipping system is used with a data center remote from said mail shipping system, and said method comprising the additional steps of:

if sufficient data are not available in said postage meter device for generating said print format for said cost center identified in said address field and mark, forming a data request to said remote data center for data needed to complete generation of said print format;

establishing a communication between said postage meter device and said remote data center and transmitting said data request from said postage meter device to said remote data center; and transmitting said data needed to complete said print format from said remote data center to said postage meter device, and generating said print format using said data needed to complete said print format in said postage meter device.

32. A method as claimed in claim 31 wherein said print format includes frame data and pixel data, and wherein the step of generating said print format using said data transmitted from said remote data center to complete said print format comprises modifying at least one of said frame data and said pixel data.

33. A method as claimed in claim 23 comprising the additional steps of:

respectively allocating a cliché number to each cost center; providing an input unit in communication with said postage meter device by which a cost center number can be entered into said postage meter device; and entering a cost center number into said postage meter device via said input unit and automatically, in said postage meter device, entering the cliché number associated with the entered cost center number.

34. A method as claimed in claim 33 wherein each cost center has a name associated therewith, and said method comprising the additional step of allowing, via said input unit, for modification of a name of a cost center allocated to a cost center number.

35. A method as claimed in claim 33 wherein each of said carriers has a name associated therewith, and said method comprising the additional step of:

providing an input unit in communication with said postage meter device; and allowing for modification of a name of a carrier via said input unit.

36. A method as claimed in claim 23 for shipping via a selected one of a plurality of carriers, and comprising the additional steps of:

respectively allocating a carrier identification number to each carrier;

non-volatilely storing each carrier identification number in said postage meter device;

providing an input unit in communication with said postage meter device via which a selected carrier identification number can be entered;

entering a selected carrier identification number via said input unit into said postage meter device and thereby causing, in said postage meter device, selection of the print format associated with the carrier corresponding to the entered carrier identification number; and allowing for modification of said carrier identification number and the carrier-specific print format corresponding to the carrier to which said carrier identification number is respectively allocated.

37. A method as claimed in claim 23 comprising the additional steps of:

providing an input unit in communication with said postage meter device via which a selected cost center number can be entered into said postage meter device; and upon entry of a cost center number into said postage meter device via said input unit, displaying at said postage meter device all shipping costs respectively associated with each carrier used by said cost center.

38. A method for data processing in a mail shipping system used by a plurality of independent cost centers for respectively shipping documents using a selected one of a plurality of carriers, said mail shipping system having a postage meter device with a transport path leading thereto, comprising the steps of:

printing out a document having an address field and at least one mark thereon identifying a carrier to be used for shipping said document and a cost center which produced said document;

causing said document to enter into said transport path of said postage meter device and detecting a presence of said document in said transport path;

upon detection of said document in said transport path, scanning said address field and said mark and automatically entering information corresponding to the carrier and the cost center identified in said address field and mark into said postage meter device;

entering and non-volatilely storing setting data into said postage meter device for each of said carriers and cost centers and automatically calling setting data for the carrier and cost center identified in said address field and mark of said document and generating a print format for the carrier and cost center identified in said address field and mark from said setting data;

allocating a predetermined cost center identifier uniquely to each cost center and for inspection or modification of said print format, entering a cost center identifier into said postage meter device;

conducting an accounting in said postage meter device by modifying an account, accessible by said postage meter device, uniquely related to the cost center identified in said address field and mark by an amount corresponding to a cost of shipping said document using said carrier identified in said address field and mark; and producing a franking imprint on said document after conducting said accounting using said print format for the carrier and cost center identified in said address field and mark.

39. A method as claimed in claim 38 comprising the additional steps of:

calling one of said settings when no document is detected in said transport path, said one of said settings comprising old data;

identifying said address and mark on said document by scanning said document in said transport path and overwriting said old data with new data comprising the print format for the carrier and cost center identified by said scanning; and displaying the print format with the new data for the cost center allocated to the entered cost center identifier.

40. A method as claimed in claim 38 wherein said mail processing system includes a scanner, a chip card reader and a scale, each of which can communicate with said postage meter device, and said method comprising the steps of executing a scanner communication routine, a chip card communication routine and a scale communication routine in said postage meter device to determine which of said scanner, said chip card reader and said scale will interface with said postage meter machine.

41. A method as claimed in claim 38 wherein the step of printing out a document having said address field and said mark thereon comprises printing said address field and said mark on a label using a personal computer at the cost center identified in the address field and mark remote from said postage meter device, and adhesively attaching said label to said document.

42. A method as claimed in claim 38 wherein the step of printing out a document having said address field and said mark thereon comprises printing said address field and said mark on a letter envelope comprising said document using a personal computer at the cost center identified in the address field and mark remote from said postage meter device.

43. A method as claimed in claim 38 comprising the additional steps of:

dependent on the carrier identified in said address field and mark, calculating a postage fee for shipping said document using said carrier identified in said address field and said mark; and if necessary, modifying the setting data for said carrier identified in said address field and mark for producing said print format.

44. A method as claimed in claim 38 comprising the additional step of:

in said accounting, debiting an account of said cost center, accessible by said postage meter device, which produced said document by said cost of mailing.

45. A method as claimed in claim 38 comprising the additional step of checking print data in said print format for said carrier and cost center identified in said address field and mark with an encoded check sum when said setting data for said print format data are called in said postage meter device.

46. A method as claimed in claim 38 wherein said mail processing system is used with a data center remote from said mail processing system, and said method comprising the additional steps of:

if sufficient data are not available in said postage meter device for generating said print format for said carrier and cost center identified in said address field and mark, forming a data request to said remote data center for data needed to complete generation of said print format;

establishing a communication between said postage meter device and said remote data center and transmitting said data request from said postage meter device to said remote data center; and transmitting said data needed to complete said print format from said remote data center to said postage meter device, and generating said print format using said data needed to complete said print format in said postage meter device.

47. A method as claimed in claim 38 wherein said postage meter device includes a clock/date module which emits signals identifying a current time and date, and wherein said method includes the step of including said current time and date in said print format supplied by said clock/date module.

48. A method as claimed in claim 38 comprising the additional steps of:

respectively allocating a cliché number to each cost center;

providing an input unit in communication with said postage meter device by which a cost center number can be entered into said postage meter device; and entering a cost center number into said postage meter machine via said input unit and automatically, in said postage meter device, entering the cliché number associated with the entered cost center number.

49. A method as claimed in claim 48 wherein each cost center has a name associated therewith, and said method comprising the additional step of allowing, via said input unit, for modification of a name of a cost center allocated to a cost center number.

50. A method as claimed in claim 48 wherein each of said carriers has a name associated therewith, and said method comprising the additional steps of:

providing an input unit in communication with said postage meter device; and allowing for modification of a name of a carrier via said input unit.

51. A method as claimed in claim 38 comprising the additional steps of:

respectively allocating a carrier identification number to each carrier; non-volatilely storing each carrier identification number in said postage meter device;

providing an input unit in communication with said postage meter device via which a selected carrier identification number can be entered;

entering a selected carrier identification number via said input unit into said postage meter device and thereby causing, in said postage meter device, selection of the print format associated with the carrier corresponding to the entered carrier identification number; and allowing for modification of said carrier identification number and the carrier-specific print format corresponding to the carrier to which said carrier identification number is respectively allocated.

52. A method as claimed in claim 38 comprising the additional steps of:

providing an input unit in communication with said postage meter device via which a selected cost center number can be entered into said postage meter device; and upon entry of a cost center number into said postage meter device via said input unit, displaying at said postage meter device all shipping costs respectively associated with each carrier used by said cost center.

53. A method for data processing in a mail shipping system used by a plurality of independent cost centers for respectively shipping documents using a selected one of a plurality of carriers, said mail shipping system having a postage meter device with a transport path leading thereto, comprising the steps of:

printing out a document having an address field and at least one mark thereon identifying a carrier to be used for shipping said document and a cost center which produced said document;

causing said document to enter into said transport path of said postage meter device and detecting a presence of said document in said transport path;

upon detection of said document in said transport path, scanning said address field and said mark and automatically entering information corresponding to the carrier and the cost center identified in said address field and mark into said postage meter device;

entering and non-volatilely storing setting data into said postage meter device for each of said carriers and cost centers and automatically calling setting data for the carrier and cost center identified in said address field and mark of said document and generating a print format for the carrier and cost center identified in said address field and mark from said setting data;

allocating a predetermined carrier identifier uniquely to each carrier and entering said carrier identifier into said postage meter device;

conducting an accounting in said postage meter device by modifying an account, accessible by said postage meter device, uniquely related to the cost center identified in said address field and mark by an amount corresponding to a cost of shipping said document using said carrier identified in said address field and mark; and producing a franking imprint on said document after conducting said accounting using said print format for the carrier and cost center identified in said address field and mark.

54. A method as claimed in claim 53 comprising the additional steps of:

calling one of said settings when no document is detected in said transport path, said one of settings comprising old data;

identifying said address and mark on said document by scanning said document in said transport path and overwriting said old data with new data comprising the print format for the carrier and cost center identified by said scanning; and displaying the print format with the new data for the carrier allocated to the entered carrier identifier.

55. A method as claimed in claim 53 wherein said mail shipping system includes a scanner, a chip card reader and a scale, each of which can communicate with said postage meter device, and said method comprising the steps of executing a scanner communication routine, a chip card communication routine and a scale communication routine in said postage meter device to determine which of said scanner, said chip card reader and said scale will interface with said postage meter device.

56. A method as claimed in claim 53 wherein the step of printing out a document having said address field and said mark thereon comprises printing said address field and said mark on a label using a personal computer at the cost center identified in the address field and mark remote from said postage meter device, and adhesively attaching said label to said document.

57. A method as claimed in claim 53 wherein the step of printing out a document having said address field and said mark thereon comprises printing said address field and said mark on a letter envelope comprising said document using a personal computer at the cost center identified in the address field and mark remote from said postage meter device.

58. A method as claimed in claim 53 comprising the additional steps of:

dependent on the carrier identified in said address field and mark, calculating a postage fee for mailing said document using said carrier identified in said address field and said mark; and if necessary, modifying the setting data for said carrier identified in said address field and mark for producing said print format.

59. A method as claimed in claim 53 comprising the additional step of:

in said accounting, debiting an account of said cost center, accessible by said postage meter machine, which produced said document by said cost of shipping.

60. A method as claimed in claim 53 comprising the additional step of checking data in said print format for said carrier and cost center identified in said address field and mark with an encoded check sum when said setting data for said print format are called in said postage meter device.

61. A method as claimed in claim 53 wherein said mail shipping system is used with a data center remote from said mail shipping system, and said method comprising the additional steps of:

if sufficient data are not available in said postage meter device for generating said print format for said carrier identified in said address field and mark, forming a data request to said remote data center for data needed to complete generation of said print format;

establishing a communication between said postage meter device and said remote data center and transmitting said data request from said postage meter device to said remote data center; and transmitting said data needed to complete said print format from said remote data center to said postage meter device, and generating said print format using said data needed to complete said print format in said postage meter device.

62. A method as claimed in claim 61 wherein said print format includes frame data and pixel data, and wherein the step of generating said print format using said data transmitted from said remote data center to complete said print format comprises modifying at least one of said frame data and said pixel data.

63. A method as claimed in claim 53 comprising the additional steps of:

respectively allocating a cliché number to each cost center;

respectively allocating a cost center number to each cost center;

providing an input unit in communication with said postage meter device by which a cost center number can be entered into said postage meter machine; and entering a cost center number into said postage meter machine via said input unit and automatically, in said postage meter device, entering the cliché number associated with the entered cost center number.

64. A method as claimed in claim 63 wherein each cost center has a name associated therewith, and said method comprising the additional step of allowing, via said input unit, for modification of a name of a cost center allocated to a cost center number.

65. A method as claimed in claim 63 wherein each of said carriers has a name associated therewith, and said method comprising the additional steps of:

providing an input unit in communication with said postage meter device; and allowing for modification of a name of a carrier via said input unit.

66. A method as claimed in claim 53 comprising the additional steps of:

non-volatilely storing each carrier identification number in said postage meter device;

providing an input unit in communication with said postage meter device via which a selected carrier identification number can be entered;

entering a selected carrier identification number via said input unit into said postage meter device and thereby causing, in said postage meter device, selection of the print format associated with the carrier corresponding to the entered carrier identification number; and allowing for modification of said carrier identification number and the carrier-specific print format corresponding to the carrier to which said carrier identification number is respectively allocated.

67. A method as claimed in claim 53 comprising the additional steps of:

respectively allocating a cost center number to each cost center;

providing an input unit in communication with said postage meter device via which a selected cost center number can be entered into said postage meter device; and upon entry of a cost center number into said postage meter device via said input unit, displaying at said postage meter device all shipping costs respectively associated with each carrier used by said cost center.

68. A method for processing data in a mail shipping system comprising the steps of:

(a) creating a document file in a document producing program in a personal computer;

(b) calling a first input mask in said personal computer;

(c) entering and storing in said personal computer an address of a recipient of said document and a date of said document using said first input mask;

(d) calling said second input mask in said personal computer;

(e) selecting from said second input mask a carrier for shipping said document and storing said carrier as a number in said personal computer;

(f) producing and storing contents of said document in said personal computer;

(g) printing out said document and providing said document with an envelope and printing said address of said recipient of said document on at least one of said document and said envelope;

(h) printing a mark on at least one of said document and said envelope, said mark identifying said carrier, and (i) inserting said document into said envelope.

69. A method as claimed in claim 68 wherein said mail shipping system is used by a plurality of independent cost centers, said personal computer and said printer being located at one of said cost centers, and said method comprising the additional steps of:

respectively allocating said cost center numbers to said cost centers; and automatically entering and storing a cost center number allocated to the cost center at which said personal computer and said printer are located into said personal computer using said first input mask, after step (b).

70. A method as claimed in claim 68 wherein mailing of said document is regulated by a postal authority, and said method comprising the additional steps of:

loading a program into said personal computer for automatically positioning said address and said mark on at least one of said letter and said envelope in accordance with regulations established by said postal authority; and automatically printing said address of said recipient on at least one of said letter and said envelope and printing said mark on at least one of said letter and said envelope in accordance with said postal regulations in said personal computer.

71. A method as claimed in claim 68 wherein step (h) comprises printing said mark on at least one of said document and said envelope using said printer at said personal computer.

72. A method as claimed in claim 68 wherein step (h) comprises printing said mark on at least one of said document and said envelope using a further printer, connected to said personal computer, separate from said printer used in step (g) for printing said document.

73. A method as claimed in claim 68 wherein said envelope comprises a window envelope, wherein step (g) comprises printing said address of said recipient only on said document, wherein step (h) comprises printing said mark only on said document, and wherein step (i) comprises inserting said document into said window envelope with said address of said recipient and said mark visible through said window envelope.

74. A method for data processing in a mail shipping system used by a plurality of independent cost centers, comprising the steps of:

respectively allocating a cost center number to said cost centers;

respectively allocating a carrier number to carriers available to said cost centers for shipping mail;

preparing a document at a personal computer located at one of said cost centers;

printing out an address field for a recipient of said document on a label including an identification of a carrier for shipping said document and said one of said cost centers at which said document was produced;

supplying said document in an envelope to a postage meter device with said label on one of said document and said envelope and scanning said label at said postage meter device;

from said scanning identifying the cost center number allocated to said one of said cost centers at which said document was produced;

from said scanning, identifying the carrier number of said carrier for shipping said document;

measuring a weight of said document in said envelope and making a fee table available to said postage meter machine for each of said carriers;

automatically calculating in said postage meter device a fee for shipping said document using the fee table for the carrier having the identified carrier number, and printing a franking imprint on said envelope corresponding to the calculated fee; and conducting an accounting for said fee in said postage meter device both for said carrier for shipping said document and for the cost center which produced said document.

75. A method as claimed in claim 74 comprising the additional steps of:

establishing a communication between said postage meter device and said personal computer;

transmitting said fee from said postage meter device to said personal computer; and maintaining a running total of all fees for all carriers in said personal computer for documents produced using said personal computer.

76. A method as claimed in claim 75 wherein the step of maintaining a running total comprises maintaining a running total, separated by respective carriers, for fees for all documents produced at said personal computer.

77. A method as claimed in claim 74 comprising the additional steps of:

maintaining a running total in said postage meter device for all fees incurred by each cost center separated by carrier; and upon a request from a requesting cost center, making the running total for the requesting cost center available to the requesting cost center.

78. A method as claimed in claim 74 wherein the step of preparing a document at a personal computer comprises preparing said document at said personal computer using a document production program, wherein the step of printing out said address field and said mark comprises printing out said address field and said mark at a printer connected to said personal computer, and allocating contents of said document to said address field and said mark using said document production program.

79. A method as claimed in claim 74 wherein the step of preparing a document comprises preparing said document using a document production program at said personal computer and calling an input mask in said document production program for automatically entering said cost center number for the cost center at which said personal computer is located, for printing out said cost center number with said document.

80. A method for data processing in a mail shipping system used by a plurality of independent cost centers, comprising the steps of:

respectively allocating a cost center number to said cost centers; respectively allocating a carrier number to carriers available to said cost centers for shipping mail;

preparing a document at a personal computer located at one of said cost centers;

printing out an address field for a recipient of said document and an identifier identifying a carrier for shipping said document and said one of said cost centers at which the document was prepared;

scanning said mark;

supplying said document in an envelope to a postage meter device;

from said scanning identifying the cost center number allocated to said one of said cost centers at which said document was produced;

from said scanning, identifying the carrier number of said carrier for shipping said document external of said postage meter device;

measuring a weight of said envelope including the document external of said postage meter device;

automatically calculating external of said postage meter device a fee for shipping said document using the identified carrier number and said weight, and printing a franking imprint on said envelope corresponding to the calculated fee; and conducting an accounting for said fee in said postage meter device both for said carrier for shipping said document and for the cost center which produced said document.

81. A method as claimed in claim 80 comprising the additional steps of:

establishing a communication between said postage meter device and said personal computer;

transmitting said fee from said postage meter device to said personal computer; and maintaining a running total of all fees for all carriers in said personal computer for documents produced using said personal computer.

82. A method as claimed in claim 81 wherein the step of maintaining a running total comprises maintaining a running total, separated by respective carriers, for fees for all documents produced at said personal computer.

83. A method as claimed in claim 80 comprising the additional steps of:

maintaining a running total in said postage meter device for all fees incurred by each cost center separated by carrier; and upon a request from a requesting cost center, making the running total for the requesting cost center available to the requesting cost center.

84. A method as claimed in claim 80 wherein the step of preparing a document at a personal computer comprises preparing said document at said personal computer using a document production program, wherein the step of printing out said address field and said mark comprises printing out said address field and said mark at a printer connected to said personal computer, and allocating contents of said document to said address field and said mark using said document production program.

85. A method as claimed in claim 80 wherein the step of preparing a document comprises preparing said document using a document production program at said personal computer and calling an input mask in said document production program for automatically entering said cost center number for the cost center at which said personal computer is located, for printing out said cost center number with said document.

86. A method for data processing in a mail shipping system comprising the steps of:

respectively allocating a carrier number to carriers available to a plurality of cost centers for shipping mail;

preparing a document at a personal computer located at one of said cost centers;

printing out an address field for a recipient of said document and a mark identifying a carrier for shipping said document on a medium selected from the group consisting of said document, an envelope to contain said document, and a label affixable to one of said document or said envelope;

supplying said document in said envelope to a postage meter device and scanning said mark at said postage meter device;

identifying the carrier number of said carrier for shipping said document;

measuring a weight of said document in said envelope and making a fee table available to said postage meter device for each of said carriers;

automatically calculating in said postage meter device a fee for shipping said document using said weight and the fee table for the carrier having the identified carrier number, and printing a franking imprint on said envelope corresponding to the calculated fee; and conducting an accounting for said fee in said postage meter device for all carriers used by said cost center at which said personal computer is located, listed respectively by carrier.

87. A method as claimed in claim 86 comprising the additional steps of:

establishing a communication between the personal computer at which said document was prepared and said postage meter device;

transmitting the fee to said personal computer from said postage meter device for shipping each document prepared at said personal computer, upon a request from said personal computer to said postage meter machine; and maintaining a running total in said personal computer of all fees, separated according to respective carriers, for shipping documents produced at said personal computer.

88. A method for data processing in a mail shipping system comprising the steps of:

respectively allocating a carrier number to carriers available for shipping mail;

preparing a document at a personal computer;

printing out an address field for a recipient of said document and a mark identifying a carrier for shipping said document;

scanning said mark at a scanner;

from said scanning, identifying the carrier number of said carrier for shipping said document;

supplying said document in an envelope to a postage meter device, remote from said scanner;

automatically calculating a fee for shipping said document at a location remote from said postage meter device, using the identified carrier number and supplying the calculated fee to said postage meter device;

printing a franking imprint on said envelope corresponding to the calculated fee; and conducting an accounting for said fee in said postage meter device for said carrier for shipping said document.

89. A method as claimed in claim 88 comprising the additional steps of:

establishing a communication between the personal computer at which said document was prepared and said postage meter device;

transmitting the fee to said personal computer from said postage meter device for shipping each document prepared at said personal computer, upon a request from said personal computer to said postage meter device; and maintaining a running total in said personal computer of all fees, separated according to respective carriers, for shipping documents produced at said personal computer.

90. A data processing arrangement in a mail shipping system comprising:

scale means for weighing a document to be shipped and for emitting a weight signal identifying a weight of said document to be shipped;

a postage meter device containing printing means for printing a franking imprint on said document;

first actuation means for entering setting data for each of a plurality of different shipping carriers, said setting data comprising, for each shipping carrier, data for producing a print format unique to that shipping carrier and a carrier identifiction number unique to that shipping carrier;

memory means in said postage meter device and connected to said first actuation means for storing the respective setting data for each of said shipping carriers allocated by the carrier identification numbers respectively for said shipping carriers;

second actuation means for identifying one of said shipping carriers by the carrier identification number, for shipping said document;

a microprocessor in said postage meter device;

calculator means in communication with said second actuation means, said microprocessor and said scale means for, upon receiving said carrier identification number, calculating a shipping fee for shipping said document by said selected shipping carrier using said weight signal, and emitting a signal representing said shipping fee; and said microprocessor being supplied with said signal from said calculator means and retrieving said print format for the selected shipping carrier from said memory means, and causing said printing means to generate a franking imprint on said document embodying said shipping fee and said print format.

91. An arrangement as claimed in claim 90 wherein said scale means contains said calculation means and wherein said document has printed thereon cost center information designating one cost center among a plurality of cost centers, which produced said document, and carrier information designating one carrier, among a plurality of carriers to be used for shipping said document, and said arrangement further comprising:

said second actuation means comprising a first scanner of said scale means which reads said carrier information and supplies a signal identifying said one carrier to said calculator means in said scale means;

a second scanner which reads said cost center information and supplies a signal identifying said one cost center to said postage meter machine; and accounting means in said postage meter device for receiving said signal identifying said one cost center for conducting an accounting for said one cost center for said fee.

92. An arrangement for data processing in a mail shipping system comprising:

scale means for weighing a document to be shipped and for emitting a weight signal identifying a weight of said document, said document having carrier information printed thereon identifying a carrier, among a plurality of available carriers, to be used for shipping said document;

scanner means for scanning said document for identifying the carrier to be used for shipping said document and for emitting a signal representing said carrier to be used for shipping said document;

calculator means, supplied with said signal emitted by said scanner means, for calculating a fee required for shipping said document by said carrier to be used for shipping said document dependent on the weight of said document, said calculator means emitting a fee signal identifying said fee; and means, supplied with said fee signal emitted by said calculator means, for producing a franking imprint on said document embodying said fee and a print format uniquely associated with the carrier to be used for shipping said document.

93. An arrangement as claimed in claim 92 further comprising a postage meter device containing said means for producing a franking imprint, and wherein said scale means is disposed remote from said postage meter device and wherein said scale means contains said calculator means.

94. An arrangement as claimed in claim 92 wherein said scanner means comprises means for recognizing different formats of said carrier information.

95. An arrangement as claimed in claim 94 wherein at least one of said formats comprises a format regulated by a postal authority which specifies a position for information within said at least one of said formats, and said arrangement further comprising a personal computer comprising memory means for storing said position for information in said at least one of said formats for printing information on said document according to said at least one of said formats.

96. An arrangement as claimed in claim 92 further comprising a postage meter device containing said means for producing a franking imprint and means contained in said postage meter machine for processing information scanned by said scanner means.

97. An arrangement as claimed in claim 92 further comprising register means, supplied with a signal from said scanner means, for intermediately storing information scanned by said scanner means and for conducting a parallel-to-serial conversion of said information, said register means being connected to said means for producing a franking imprint.

98. An arrangement as claimed in claim 92 wherein said document has cost center information printed thereon identifying a cost center which produced said document, and further comprising means for identifying said cost information and for storing said cost center information.

99. An arrangement as claimed in claim 98 further comprising a postage meter device containing said means for producing a franking imprint, and wherein said scale means comprises a scale external to and remote from said postage meter device, and wherein said scanner means for said carrier information and said scanner means for said cost center information are coupled to said external scale.

100. An arrangement as claimed in claim 98 wherein each of said scanner means for identifying carrier information and said scanner means for identifying cost center information comprise an electronic image interpretation circuit.

101. A method for data processing in a mail shipping system having a postage meter device and a transport path leading to a printhead for printing postage, comprising the steps of:

printing a mark on a mailpiece, said mark including information identifying a carrier to be used for shipping said mailpiece;

causing said mailpiece to enter into said transport path to said printhead and detecting a presence of said mailpiece in said transport path;

upon detection of said mailpiece in said transport path, scanning said mark and automatically entering said information into said postage meter device;

automatically calling a stored print format for the carrier identified in said mark;

conducting an accounting in said postage meter device by modifying an account, accessible by said postage meter device, uniquely related to the carrier identified in said mark by an amount corresponding to a cost of shipping said mailpiece using the carrier identified from said mark; and producing a franking imprint on said mailpiece after conducting said accounting using said carrier-specific print format for the carrier identified from said mark.

102. A method as claimed in claim 101 wherein the step of printing at least one mark on a mailpiece comprises printing said mark on a label and adhesively attaching said label to said mailpiece, and wherein the step of scanning said mark comprises providing a dynamic scale in said transport path and scanning said mark at said dynamic scale.

103. A method as claimed in claim 101 wherein the step of printing at least one mark on a mailpiece comprises printing at least one mark in an address field on a mailpiece, and wherein the step of scanning said mark comprises scanning said address field, including scanning said mark in said address field.

104. A method as claimed in claim 101 wherein the step of printing at least one mark on a mailpiece comprises printing an address field on said mailpiece and printing said at least one mark on said mailpiece externally from said address field.

105. A method for data processing in a mail shipping system used by a plurality of independent cost centers, said shipping system having a postage meter device and a transport path leading to a printhead for printing postage, comprising the steps of:

printing a mark on a mailpiece, said mark including information identifying a cost center which produced said mailpiece;

causing said mailpiece to enter into said transport path to said printhead and detecting a presence of said mailpiece in said transport path;

upon detection of said mailpiece in said transport path, scanning said mark and automatically entering said information into said postage meter device;

conducting an accounting in said postage meter device by modifying an account, accessible by said postage meter device, uniquely related to the cost center identified in said mark by an amount corresponding to a cost of shipping said mailpiece; and producing a franking imprint on said mailpiece after conducting said accounting.

106. A method as claimed in claim 105 wherein the step of printing at least one mark on a mailpiece comprises printing said mark on a label and adhesively attaching said label to said mailpiece, and wherein the step of scanning said mark comprises providing a dynamic scale in said transport path and scanning said mark at said dynamic scale.

107. A method as claimed in claim 105 wherein the step of printing at least one mark on a mailpiece comprises printing at least one mark in an address field on a mailpiece, and wherein the step of scanning said mark comprises scanning said address field, including scanning said mark in said address field.

108. A method as claimed in claim 105 wherein the step of printing at least one mark on a mailpiece comprises printing an address field on said mailpiece and printing said at least one mark on said mailpiece externally from said address field.

109. A method for data processing in a mail shipping system used by a plurality of independent cost centers for respectively shipping documents using a selected one of a plurality of carriers, said mail shipping system having a postage meter device and a transport path leading to a printhead for printing postage, comprising the steps of:

printing at least one mark on a mailpiece, said mark including information identifying a carrier to be used for shipping said mailpiece and a cost center which produced said mailpiece;

causing said mailpiece to enter into said transport path to said printhead and detecting a presence of said mailpiece in said transport path;

upon detection of said mailpiece in said transport path, scanning said mark and automatically entering said information corresponding to the carrier and the cost center identified in said mark into said postage meter device;

automatically calling setting data for the carrier and cost center identified in said mark of said mailpiece;

conducting an accounting in said postage meter device by modifying an account, accessible by said postage meter device, uniquely related to the cost center identified in said mark by an amount corresponding to a cost of shipping said mailpiece using said carrier identified in said mark; and producing a franking imprint on said mailpiece, using said setting data, after conducting said accounting.

110. A method as claimed in claim 109 wherein the step of printing at least one mark on a mailpiece comprises printing said mark on a label and adhesively attaching said label to said mailpiece, and wherein the step of scanning said mark comprises providing a dynamic scale in said transport path and scanning said mark at said dynamic scale.

111. A method as claimed in claim 109 wherein the step of printing at least one mark on a mailpiece comprises printing at least one mark in an address field on a mailpiece, and wherein the step of scanning said mark comprises scanning said address field, including scanning said mark in said address field.

112. A method as claimed in claim 109 wherein the step of printing at least one mark on a mailpiece comprises printing an address field on said mailpiece and printing said at least one mark on said mailpiece externally from said address field.

113. A method for data processing in a mail shipping system used by a plurality of independent cost centers for respectively shipping documents using a selected one of a plurality of carriers, said mail shipping system having a postage meter device and a transport path leading to a printhead for printing postage, comprising the steps of:

printing at least one mark on a mailpiece, said mark including information identifying a carrier to be used for shipping said mail and a cost center which produced said mail;

causing said mailpiece to enter into said transport path to said printhead and detecting a presence of said mailpiece in said transport path;

upon detection of said mailpiece in said transport path, scanning said mark and automatically entering said information;

non-volatilely storing setting data in said postage meter device for each of said carriers and cost centers and automatically calling setting data for the carrier and cost center identified in said mark of said mailpiece and generating a print format for the carrier identified in said mark from said setting data;

allocating a predetermined carrier identifier uniquely to each carrier entering a carrier identifier into said postage meter device;

conducting an accounting in said postage meter device by modifying an account, accessible by said postage meter device, uniquely related to the cost center identified in said mark by an amount corresponding to a cost of shipping said mailpiece using said carrier identified in said mark; and producing a franking imprint on said mailpiece after conducting said accounting using said print format for the carrier identified in said mark.

114. A method as claimed in claim 113 wherein the step of printing at least one mark on a mailpiece comprises printing said mark on a label and adhesively attaching said label to said mailpiece, and wherein the step of scanning said mark comprises providing a dynamic scale in said transport path and scanning said mark at said dynamic scale.

115. A method as claimed in claim 113 wherein the step of printing at least one mark on a mailpiece comprises printing at least one mark in an address field on a mailpiece, and wherein the step of scanning said mark comprises scanning said address field, including scanning said mark in said address field.

116. A method as claimed in claim 113 wherein the step of printing at least one mark on a mailpiece comprises printing an address field on said mailpiece and printing said at least one mark on said mailpiece externally from said address field.

117. A method for data processing in a mail shipping system having a postage meter device and a transport path leading to a printhead for printing postage, comprising the steps of:

printing a mark on a mailpiece, said mark including information identifying a carrier to be used for shipping said mailpiece;

causing said mailpiece to enter into said transport path to said printhead and detecting a presence of said mailpiece in said transport path;

upon detection of said mailpiece in said transport path, scanning said mark and automatically entering said information into said postage meter device;

automatically calling a stored print format for the carrier identified in said mark;

conducting an accounting in a chipcard by modifying an account, accessible by said postage meter device, uniquely related to the carrier identified in said mark by an amount corresponding to a cost of shipping said mailpiece using the carrier identified from said mark; and producing a franking imprint on said mailpiece after conducting said accounting using said carrier-specific print format for the carrier identified from said mark.

118. A method as claimed in claim 117 wherein said postage meter device contains an accounting unit, and wherein the step of conducting an accounting in a chipcard by modifying an account comprises transferring a debited postage value from said chipcard into said accounting unit.

119. A method as claimed in claim 117 wherein the step of printing at least one mark on a mailpiece comprises printing said mark on a label and adhesively attaching said label to said mailpiece, and wherein the step of scanning said mark comprises providing a dynamic scale in said transport path and scanning said mark at said dynamic scale.

120. A method as claimed in claim 117 wherein the step of printing at least one mark on a mailpiece comprises printing at least one mark in an address field on a mailpiece, and wherein the step of scanning said mark comprises scanning said address field, including scanning said mark in said address field.

121. A method as claimed in claim 117 wherein the step of printing at least one mark on a mailpiece comprises printing an address field on said mailpiece and printing said at least one mark on said mailpiece externally from said address field.

122. A data processing arrangement in a mail shipping system, comprising:

a postage meter device having a transport path for postal items, a printhead for printing postage in a franking imprint on an item in said transport path, and a microprocessor which controls said printhead;

a scanner for scanning a mark on said item identifying a carrier for said item. said scanner being coupled to said microprocessor;

said postage meter device having a write/read unit for conducting a communication with a refilled value chipcard and said microprocessor, when a chipcard having a most recent value stored therein engages said write/read unit;

said microprocessor conducting an accounting in said value chipcard by modifying an account, by entering a carrier number into an accounting unit in a postage meter device, with a prepaid amount being maintained as an electronic balance in a balance account in said value chipcard and said microprocessor reducing said electronic balance in said value chipcard by a postage value to be printed in said franking imprint on said item; and a memory, accessible by said microprocessor having a print format stored therein, and said microprocessor automatically calling said print format, dependent at least on said carrier number, for controlling said printhead to print said franking imprint.

123. A data processing arrangement as claimed in claim 122 wherein said postage meter device has a modem and that wherein said processor communicates a data set for each entry together with cryptographic codes for allowing inspection of said accounting from a remote location via said modem.

124. A method for data processing in a mail shipping system having a postage meter device with a transport path leading thereto, comprising the steps of:

printing out a document having a mark thereon identifying a carrier to be used for shipping of said document;

causing said document to enter into said transport path of said postage meter device and detecting a presence of said document in said transport path;

upon detection of said document in said transport path, scanning said mark and automatically entering information corresponding to the carrier identified in said mark into said postage meter device;

entering and non-volatilely storing setting data into said postage meter device for generating a plurality of carrier-specific print formats respectively for said plurality of carriers;

conducting an accounting in said postage meterdevice by modifying an account, accessible by said postage meter device, uniquely related to the carrier identified in said mark by an amount corresponding to a cost of shipping said document using the carrier identified from said mark; and producing a franking imprint on said document after conducting said accounting using said carrier-specific print format for the carrier identified from said mark.

125. A method for data processing in a mail shipping system used by a plurality of independent cost centers, said shipping system having a postage meter device with a transport path leading thereto, comprising the steps of:

printing out a document having a mark thereon identifying a cost center which produced said document;

causing said document to enter into said transport path to said postage meter device and detecting a presence of said document in said transport path;

upon detection of said document in said transport path, scanning said mark and automatically entering information corresponding to the cost center identified in said mark into said postage meter device;

entering and non-volatilely storing setting data into said postage meter device for generating a plurality of specific print formats;

conducting an accounting in said postage meter device by modifying an account, accessible by said postage meter device, uniquely related to the cost center identified in said mark by an amount corresponding to a cost of shipping said document; and producing a franking imprint on said document after said accounting.

126. A method for processing data in a mail shipping system comprising the steps of:

(a) creating a document file in a document producing program in a personal computer;

(b) calling an input mask in said personal computer;

(c) entering and storing in said personal computer an address of a recipient of said document and a date of said document;

(d) selecting a carrier for shipping said document and storing said carrier in said personal computer;

(e) producing and storing contents of said document in said personal computer;

(f) printing out said document and providing said document with an envelope and printing said address of said recipient of said document on at least one of said document and said envelope;

(g) printing a mark on at least one of said document and said envelope, said mark identifying said carrier; and (h) inserting said document into said envelope.

* * * * *